(12) United States Patent
Tavares et al.

(10) Patent No.: US 8,306,846 B2
(45) Date of Patent: Nov. 6, 2012

(54) TRANSACTION LOCATION ANALYTICS SYSTEMS AND METHODS

(75) Inventors: Silvio Tavares, NE Atlanta, GA (US); Susan Fahy, Melville, NY (US); Dennis Carlson, NE Atlanta, GA (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 13/314,988

(22) Filed: Dec. 8, 2011

(65) Prior Publication Data

US 2012/0084117 A1   Apr. 5, 2012

Related U.S. Application Data

(63) Continuation-in-part of application No. 13/032,878, filed on Feb. 23, 2011, which is a continuation-in-part of application No. 12/758,397, filed on Apr. 12, 2010.

(51) Int. Cl.
G06Q 10/00 (2012.01)
G06Q 30/00 (2006.01)

(52) U.S. Cl. ...................................... 705/7.29
(58) Field of Classification Search .................. 705/7.29
See application file for complete search history.

(56) References Cited

U.S. PATENT DOCUMENTS

| | | | |
|---|---|---|---|
| 5,500,513 A | 3/1996 | Langhans et al. | |
| 6,151,582 A | 11/2000 | Huang et al. | |
| 6,633,851 B1 | 10/2003 | Engler et al. | |
| 6,839,682 B1 * | 1/2005 | Blume et al. | 705/7.31 |
| 7,328,169 B2 * | 2/2008 | Temares et al. | 705/7.33 |
| 7,451,134 B2 * | 11/2008 | Krakowiecki et al. | 1/1 |
| 7,792,697 B2 * | 9/2010 | Bhagchandani et al. | 705/14.52 |
| 7,853,469 B2 * | 12/2010 | Maitland et al. | 705/7.12 |
| 7,890,367 B2 * | 2/2011 | Senghore et al. | 705/14.28 |
| 7,937,286 B2 * | 5/2011 | Newman et al. | 705/7.31 |
| 8,027,891 B2 * | 9/2011 | Preston et al. | 705/30 |
| 8,255,268 B2 * | 8/2012 | Rane et al. | 705/7.33 |
| 2001/0016819 A1 | 8/2001 | Kolls | |
| 2002/0026348 A1 * | 2/2002 | Fowler et al. | 705/10 |
| 2002/0082920 A1 * | 6/2002 | Austin et al. | 705/14 |
| 2002/0116252 A1 | 8/2002 | Saito et al. | |
| 2004/0088221 A1 * | 5/2004 | Katz et al. | 705/14 |
| 2004/0225556 A1 | 11/2004 | Willen et al. | |
| 2004/0230472 A1 | 11/2004 | Venkat et al. | |
| 2005/0090911 A1 | 4/2005 | Ingargiola et al. | |

(Continued)

OTHER PUBLICATIONS

Fox, Edward J.; Montgomery, Alan L.; Lodish, Leonard M.; "Consumer Shopping and Spending Across Retail Formats". Jan. 2001.*

(Continued)

*Primary Examiner* — Peter Choi
(74) *Attorney, Agent, or Firm* — Kilpatrick Townsend & Stockton LLP

(57) ABSTRACT

One embodiment provides a method for evaluating transaction data to determine point of location usage. This could be, for example, to determine where customers are mostly likely to shop before or after shopping at a given merchant. For instance, the method could show the percentage of customers that shop at certain types of stores during a time period right before or after shopping at the merchant's location. As another example, the method could be used to determine when a merchant's customer makes a purchase at the merchant's store, then makes a purchase at a competing merchant's store within a specified time.

15 Claims, 55 Drawing Sheets

U.S. PATENT DOCUMENTS

| | | |
|---|---|---|
| 2006/0143072 A1* | 6/2006 | Herman et al. ............... 705/10 |
| 2006/0151598 A1* | 7/2006 | Chen et al. .................... 235/380 |
| 2007/0055597 A1* | 3/2007 | Patel et al. .................... 705/35 |
| 2007/0083430 A1 | 4/2007 | Summer |
| 2007/0100728 A1* | 5/2007 | Rotman et al. ............. 705/36 R |
| 2007/0179836 A1* | 8/2007 | Juang et al. .................... 705/10 |
| 2008/0033587 A1 | 2/2008 | Kurita et al. |
| 2008/0262900 A1 | 10/2008 | Duffy et al. |
| 2008/0270363 A1 | 10/2008 | Hunt et al. |
| 2009/0048884 A1* | 2/2009 | Olives et al. .................... 705/7 |
| 2009/0276293 A1* | 11/2009 | Zellner et al. ................... 705/10 |
| 2009/0299536 A1 | 12/2009 | Beekhuis |
| 2009/0327045 A1* | 12/2009 | Olives et al. .................... 705/10 |
| 2010/0287029 A1 | 11/2010 | Dodge et al. |
| 2011/0035278 A1 | 2/2011 | Fordyce, III et al. |
| 2011/0035280 A1 | 2/2011 | Fordyce, III et al. |
| 2011/0087519 A1 | 4/2011 | Fordyce, III et al. |
| 2011/0087546 A1 | 4/2011 | Fordyce, III et al. |
| 2011/0087547 A1 | 4/2011 | Amaro et al. |
| 2011/0087550 A1 | 4/2011 | Fordyce, III et al. |
| 2011/0093327 A1 | 4/2011 | Fordyce, III et al. |
| 2011/0093335 A1 | 4/2011 | Fordyce, III et al. |
| 2011/0251870 A1 | 10/2011 | Tavares et al. |
| 2011/0251907 A1 | 10/2011 | Tavares et al. |

OTHER PUBLICATIONS

Ahmed, Syed Riaz. "Applications of Data Mining in Retail Business". 2004. Proceedings of the International Conference on Information Technology: Coding and Coputing (ITCC'04).*

"SpendTrend—December Transaction Growth Was Healthy: Dec. 2009 Edition". Jan. 11, 2010. First Data Corporation. Dec. 2009 Edition. Version 011110.*

International Search Report and Written Opinion of PCT/US2011/032102 mailed on Oct. 25, 2011, 11 pages.

* cited by examiner

| MERCHANT OUTLET | DAY | | DAILY TOTAL |
|---|---|---|---|
| GAS STATION DALLAS | 1 | TRANSACTION | 4 |
| GAS STATION DALLAS | 1 | $ VOLUME | $138.89 |
| GAS STATION DALLAS | 2 | TRANSACTION | 4 |
| GAS STATION DALLAS | 2 | $ VOLUME | $106.38 |
| GAS STATION BOSTON | 1 | TRANSACTION | 4 |
| GAS STATION BOSTON | 1 | $ VOLUME | $147.7 |
| GAS STATION BOSTON | 2 | TRANSACTION | 4 |
| GAS STATION BOSTON | 2 | $ VOLUME | $135.22 |
| GENERAL MERCH DENVER | 1 | TRANSACTION | 5 |
| GENERAL MERCH DENVER | 1 | $ VOLUME | $160.24 |
| GENERAL MERCH DENVER | 2 | TRANSACTION | 5 |
| GENERAL MERCH DENVER | 2 | $ VOLUME | $129.24 |
| GENERAL MERCH ATLANTA | 1 | TRANSACTION | 5 |
| GENERAL MERCH ATLANTA | 1 | $ VOLUME | $247.58 |
| GENERAL MERCH ATLANTA | 2 | TRANSACTION | 5 |
| GENERAL MERCH ATLANTA | 2 | $ VOLUME | $145.58 |

FIG.10B

→ ACTIVATIONS BY INDUSTRY

ACTIVATION DOLLAR VOLUME GROWTH SLOWS TO 2.0%

DECEMBER DOLLAR VOLUME GROWTH IN ACTIVATIONS WAS 2.0%, A DECREASE FROM NOVEMBER'S STRONG GROWTH OF 8.6%. SPECIALTY RETAIL DOLLAR VOLUME GROWTH WAS -1.1% IN DECEMBER AFTER POSTING A 7.3% INCREASE IN NOVEMBER. CONSUMERS APPEAR TO HAVE PURCHASED THE BULK OF THEIR GIFT CARDS EARLY IN THE HOLIDAY SHOPPING SEASON.

|  | Q1 10 | Q2 10 | Q3 10 | NOV 10 | DEC 10 |
|---|---|---|---|---|---|
| TOTAL | 2.6% | 6.4% | 4.6% | 8.6% | 2.0% |
| SPECIALTY RETAIL | 8.4% | 12.1% | 13.1% | 7.3% | -1.1% |
| CASUAL DINING | 4.1% | 5.2% | 1.4% | 8.1% | 8.9% |
| QSR | 12.6% | 15.0% | 11.2% | 16.5% | 11.9% |

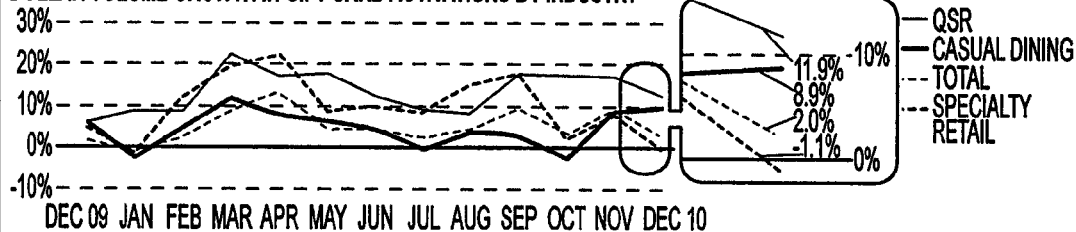

DOLLAR VOLUME GROWTH IN GIFT CARD ACTIVATIONS BY INDUSTRY

ACTIVATION TRANSACTION GROWTH SLOWS

OVERALL YEAR-OVER-YEAR TRANSACTION GROWTH WAS 2.1% IN DECEMBER, ENDING THREE CONSECUTIVE MONTHS OF DOUBLE-DIGIT INCREASES. SPECIALTY RETAILERS SAW ACTIVATION TRANSACTION GROWTH DECLINE -5.9%. THIS MARKED THE LOWEST YEAR-OVER-YEAR TRANSACTION GROWTH FOR SPECIALTY RETAIL SINCE JANUARY 2010.

|  | Q1 10 | Q2 10 | Q3 10 | NOV 10 | DEC 10 |
|---|---|---|---|---|---|
| TOTAL | 2.7% | 2.7% | 3.9% | 10.0% | 2.1% |
| SPECIALTY RETAIL | 8.3% | 2.7% | 6.2% | 4.4% | -5.9% |
| CASUAL DINING | 7.0% | 5.4% | 2.8% | 9.1% | 9.1% |
| QSR | 10.7% | 13.7% | 10.8% | 15.6% | 9.0% |

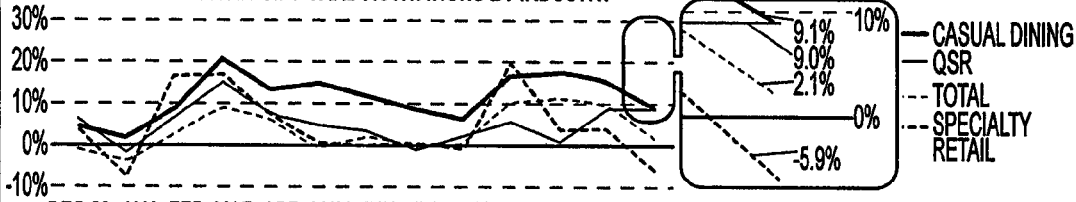

TRANSACTION GROWTH IN GIFT CARD ACTIVATIONS BY INDUSTRY

ACTIVATION AVERAGE TICKETS CONTINUE TO IMPROVE

THE AVERAGE TICKETS ON ACTIVATIONS WERE DOWN -0.1% IN DECEMBER, WHICH MARKS THE SECOND CONSECUTIVE MONTH OF IMPROVEMENT FROM OCTOBER'S LOW OF -8.0%. THE DEEP DISCOUNTING CONDUCTED BY MERCHANTS THIS HOLIDAY SEASON KEPT AVERAGE TICKET VALUES DOWN.

|  | Q1 10 | Q2 10 | Q3 10 | NOV 10 | DEC 10 | DEC 09 | DEC 10 |
|---|---|---|---|---|---|---|---|
| TOTAL | -0.1% | 3.6% | 0.7% | -1.3% | -0.1% | $29.81 | $29.79 |
| SPECIALTY RETAIL | 0.0% | 9.2% | 6.5% | 2.8% | 5.1% | $43.27 | $45.47 |
| CASUAL DINING | -2.7% | -0.2% | -1.4% | -0.9% | -0.2% | $28.58 | $28.52 |
| QSR | 1.6% | 1.2% | 0.3% | 0.7% | 2.7% | $13.68 | $14.06 |

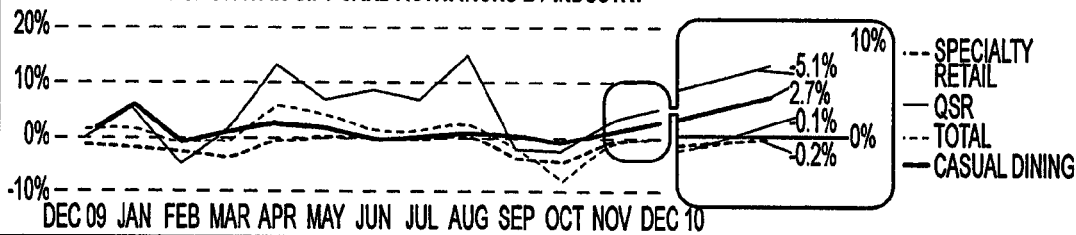

AVERAGE TICKET GROWTH IN GIFT CARD ACTIVATIONS BY INDUSTRY

FIG. 34

REDEMPTIONS BY INDUSTRY

REDEMPTION DOLLAR VOLUME GROWTH WAS 4.6%

DECEMBER'S DOLLAR VOLUME GROWTH OF REDEMPTIONS WAS 4.6%. THE DOLLAR VOLUME GROWTH OF REDEMPTIONS CONTINUED TO GROW BUT AT A SLOWER PACE. DISCOUNTING BY MERCHANTS AND BARGAIN SHOPPING BY CONSUMERS LED SPECIALTY RETAILERS TO POST NEGATIVE YEAR-OVER-YEAR DOLLAR VOLUME GROWTH OF REDEMPTIONS OF -1.5%.

|  | Q1 10 | Q2 10 | Q3 10 | NOV 10 | DEC 10 |
|---|---|---|---|---|---|
| TOTAL | 1.5% | 8.4% | 5.0% | 5.9% | (4.6%) |
| SPECIALTY RETAIL | 3.8% | 8.8% | 5.8% | -0.4% | (-1.5%) |
| CASUAL DINING | -0.1% | 2.9% | 2.3% | 3.0% | 7.8% |
| QSR | 7.% | 27.8% | 33.5% | 43.5% | 30.6% |

DOLLAR VOLUME GROWTH IN GIFT CARD REDEMPTIONS BY INDUSTRY

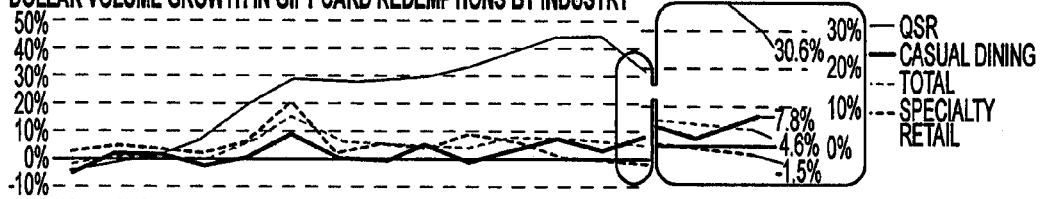

REDEMPTION TRANSACTION GROWTH WAS 9.1%

DECEMBER'S YEAR-OVER-YEAR TRANSACTION GROWTH WAS 9.1%, DOWN FROM NOVEMBER'S GROWTH OF 15.9%. TRANSACTION GROWTH SLOWED OVER THE COURSE OF THE MONTH AS SEVERE WINTER WEATHER PREVENTED CONSUMERS FROM REDEEMING GIFT CARDS LATE IN THE MONTH. THE CASUAL DINING SEGMENT POSTED GAINS AS CONSUMERS CHOSE TO DINE OUT MORE IN DECEMBER.

|  | Q1 10 | Q2 10 | Q3 10 | NOV 10 | DEC 10 |
|---|---|---|---|---|---|
| TOTAL | -0.7% | 9.9% | 12.0% | 15.9% | (9.1%) |
| SPECIALTY RETAIL | 1.0% | 2.0% | 0.7% | 1.8% | -3.7% |
| CASUAL DINING | -0.2% | 2.7% | 1.8% | 3.2% | 7.5% |
| QSR | 4.6% | 21.4% | 26.8% | 36.3% | 24.7% |

TRANSACTION GROWTH IN GIFT CARD REDEMPTIONS BY INDUSTRY

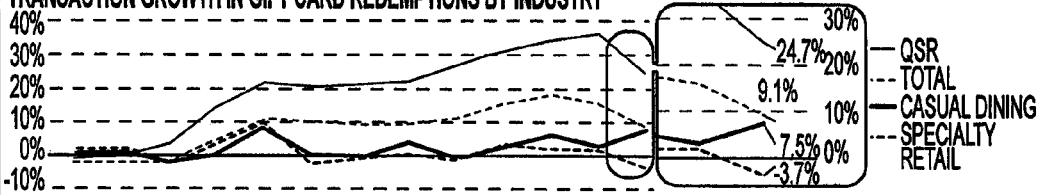

REDEMPTION AVERAGE TICKETS DECREASE -4.1%

IN DECEMBER, THE AVERAGE TICKET VALUE OF REDEMPTIONS WAS -4.1%. THIS WAS AN IMPROVEMENT FROM -9.2% GROWTH IN OCTOBER AND -8.6% IN NOVEMBER AS CONSUMERS BEGAN TO REDEEM GIFT CARDS RECEIVED DURING THE HOLIDAYS.

|  | Q1 10 | Q2 10 | Q3 10 | NOV 10 | DEC 10 | DEC 09 | DEC 10 |
|---|---|---|---|---|---|---|---|
| TOTAL | 2.3% | -1.3% | -6.2% | -8.6% | (-4.1%) | $19.02 | $18.23 |
| SPECIALTY RETAIL | 2.8% | 6.6% | 5.1% | -2.1% | 2.3% | $40.63 | -$41.57 |
| CASUAL DINING | 0.1% | 0.2% | 0.4% | -0.1% | 0.3% | $24.07 | $24.15 |
| QSR | 3.0% | 5.3% | 5.3% | 5.3% | 4.8% | -$4.72 | -$4.95 |

AVERAGE TICKET VALUE

AVERAGE TICKET GROWTH IN GIFT CARD REDEMPTIONS BY INDUSTRY

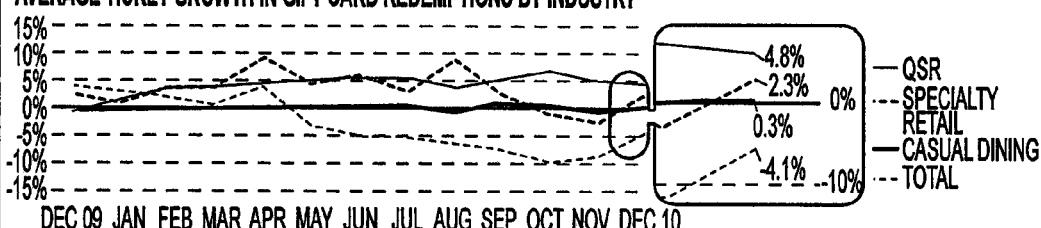

FIG. 35

→ RELOADS BY INDUSTRY

RELOAD DOLLAR VOLUME GROWTH WAS 27.1%

DECEMBER'S YEAR-OVER-YEAR DOLLAR VOLUME GROWTH OF RELOADS WAS 27.1%, THE HIGHEST GROWTH SINCE APRIL 2010. SPECIALTY RETAIL DOLLAR VOLUME GROWTH WAS 4.9%, DOWN FROM 11.3% IN NOVEMBER AND 26.0% IN OCTOBER, REFLECTING DEEP DISCOUNTING BY MERCHANTS AND A BARGAIN-CONSCIOUS CONSUMER.

|  | Q1 10 | Q2 10 | Q3 10 | NOV 10 | DEC 10 |
|---|---|---|---|---|---|
| TOTAL | 25.0% | 25.5% | 18.9% | 24.3% | 27.1% |
| SPECIALTY RETAIL | 20.6% | 10.4% | 7.7% | 11.3% | 4.9% |
| CASUAL DINING | -27.5% | -19.3% | -16.4% | -26.1% | 0.7% |
| QSR | 38.1% | 56.4% | 65.3% | 82.7% | 80.3% |

DOLLAR VOLUME GROWTH IN GIFT CARD RELOADS BY INDUSTRY

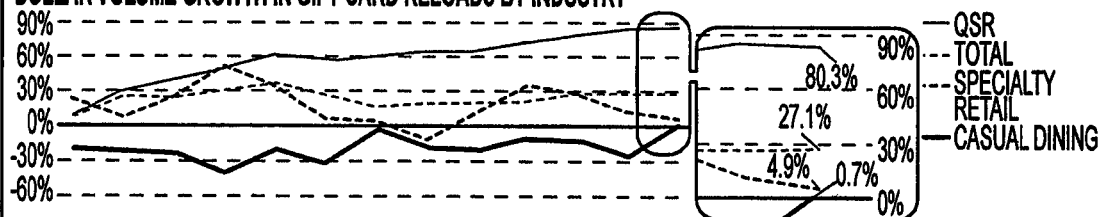

YEAR-OVER-YEAR RELOAD TRANSACTION GROWTH WAS 37.1%

IN DECEMBER, TRANSACTION GROWTH OF RELOADS WAS 37.1%, A SLIGHT DROP FROM NOVEMBER'S GROWTH OF 39.3%. QSR MERCHANTS OUTPERFORMED ALL OTHER CATEGORIES WITH 89.0% GROWTH AS BUDGET-CONSCIOUS CONSUMERS CONTINUED TO FREQUENT THESE MERCHANTS.

|  | Q1 10 | Q2 10 | Q3 10 | NOV 10 | DEC 10 |
|---|---|---|---|---|---|
| TOTAL | 21.7% | 28.3% | 29.6% | 39.3% | 37.1% |
| SPECIALTY RETAIL | 12.5% | 0.3% | -2.5% | -0.3% | -7.3% |
| CASUAL DINING | -13.3% | -0.9% | -9.0% | -8.9% | -8.9% |
| QSR | 45.6% | 67.6% | 79.7% | 101.0% | 89.0% |

TRANSACTION GROWTH IN GIFT CARD RELOADS BY INDUSTRY

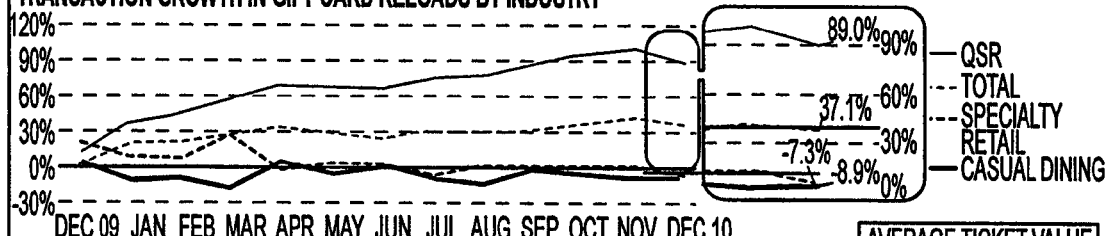

RELOAD AVERAGE TICKETS INCREASED COMPARED TO NOVEMBER

DECEMBER'S AVERAGE TICKET GROWTH OF RELOADS DECREASED -7.4%, AN IMPROVEMENT FROM NOVEMBER'S DECLINE OF -10.8%. AS THE HOLIDAY SEASON PROGRESSED, CONSUMERS RELOADED ADDITIONAL FUNDS TO EXISTING CARDS MORE FREQUENTLY.

|  | Q1 10 | Q2 10 | Q3 10 | NOV 10 | DEC 10 | DEC 09 | DEC 10 |
|---|---|---|---|---|---|---|---|
| TOTAL | 2.7% | -2.2% | -8.3% | -10.8% | -7.4% | $33.73 | $31.25 |
| SPECIALTY RETAIL | 7.1% | 10.1% | 10.5% | 11.7% | 13.1% | $43.13 | $48.79 |
| CASUAL DINING | -16.4% | -18.6% | -8.1% | -19.0% | 10.5% | $37.16 | $41.07 |
| QSR | -5.2% | -6.7% | -8.0% | -9.1% | -4.6% | $24.89 | $23.74 |

AVERAGE TICKET VALUE

AVERAGE TICKET GROWTH IN GIFT CARD RELOADS BY INDUSTRY

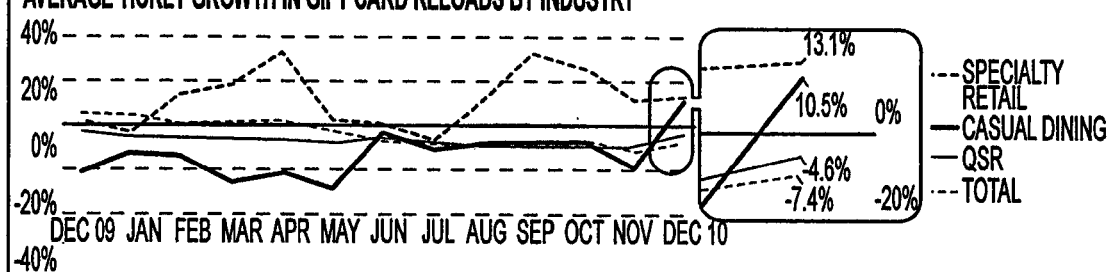

FIG.36

COMPETITOR SHOPPER

TO FIND OUT IF YOUR CUSTOMERS ARE ALSO SHOPPING AT YOUR COMPETITORS, COMPLETE THIS FORM

TIME FRAME FOR EVALUATION — 1306 ▽ DAYS FOLLOWING VISIT TO YOUR STORE
2
3
4

NUMBER OF CUSTOMERS WHO HAVE SHOPPED AT A COMPETITOR ☐

PERCENTAGE OF CUSTOMERS WHO HAVE SHOPPED AT A COMPETITOR ☐

AVERAGE AMOUNT SPENT
YOUR STORE $ ☐       COMPETITOR $ ☐

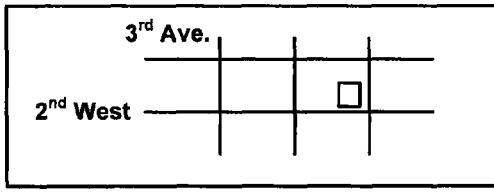

FIG. 48

The percentage of shoppers living within 10 miles is 85%.
The percentage of shoppers that live from 10 to 20 miles is 10%.
The percentage of shoppers that live more than 20 miles is 5%.
The average purchase for shoppers that live within 20 miles is $54.34.
The average distance from your store to those that live within 10 miles is 2.6 miles.
The average distance from your store for all shoppers is 5.9 miles.
The top 1% of shoppers by frequency live an average distance of 0.9 miles.
The top 1% of shoppers by purchase amount live an average distance of 6.5 miles.

FIG. 49

TRANSACTION LOCATION ANALYTICS SYSTEMS AND METHODS

CROSS-REFERENCES TO RELATED APPLICATIONS

This application is a continuation in part application and claims the benefit of copending U.S. patent application Ser. No. 13/032,878, filed Feb. 23, 2011, which is a continuation in part application and claims the benefit of copending U.S. patent application Ser. No. 12/758,397, filed Apr. 12, 2010, the complete disclosure of which is herein incorporated by reference.

FIELD

The present invention relates, in general, to market tracking and reporting and, more particularly, to market tracking and reporting using aggregated point-of-sale data.

BACKGROUND OF THE INVENTION

Market trends may result from many types and levels of factors. For example, markets may be affected by various macro- and micro-economic trends, seasonal trends, social trends, corporate trends, etc. Each of these trends may, in turn, be affected by many other types of trends. As such, it may be difficult to develop meaningful data about many markets without supplementing large amounts of diverse types of market data with extensive amounts of data mining, analysis, and assumptions.

Typically, public and private entities may indirectly obtain market data through interviews and/or other techniques. For example, a government employee may contact representative merchant locations to ask about overall performance for a given timeframe (e.g., the past month). Investors may then obtain and analyze this indirect market information in making investment decisions.

These and other techniques, however, may provide limited market information. For example, interviewed merchants or merchant locations may provide inaccurate information, may not actually be representative of the market, etc. Further, delays in obtaining these types of market data may be undesirable for investors and/or other stakeholders.

BRIEF SUMMARY OF THE INVENTION

Among other things, systems and methods are described for tracking and/or reporting market trend data according to point-of-sale (POS) data.

In one embodiment, a method is provided for evaluating transaction data to determine point of location usage. This could be, for example, to determine where customers are mostly likely to shop before or after shopping at a given merchant. For instance, the method could show the percentage of customers that shop at certain types of stores (such as, for example, hardware stores, restaurants, etc) during a time period right before or after shopping at the merchant's location. As another example, the method could be used to determine when a merchant's customer makes a purchase at the merchant's store, then makes a purchase at a competing merchant's store within a specified time.

According to the method, a host computer system receives from at least one POS device a plurality of POS datasets for a plurality of transactions. Each POS dataset comprises a merchant identifier, an account identifier, a transaction amount, and a time of day for the transaction. The merchant identifiers are associated with merchant classifications according to market categories. The host computer system evaluates the datasets for transactions involving the same account identifiers over a defined time to determine when and where the same account identifiers were used. In some cases, the comparison could further include whether the transactions involved the same or different merchant classifications during the defined time. A report is generated showing results of the evaluation. In this way, the report may show where customers are shopping prior to or following shopping with a given merchant. In some cases, the report may show when customers are shopping at competing merchants. This may be performed, for example, by evaluating the datasets for transactions that were used in connection with two different merchant identifiers having the same merchant classification so that the report shows when customers shop at both the given merchant as well as one or more competing merchants within the defined time.

In one aspect, an average amount spent at each merchant is calculated for all transactions in the report where account numbers that were used with two different merchant identifiers having the same merchant classification occurred during the defined time. The report may further indicate for each merchant a total number of instances where account numbers that were used in connection with two different merchant identifiers having the same merchant classification occurred during the defined time.

The invention further provides a system for evaluating transaction data to determine point of location usage. The system comprises a host computer system having a memory and at least one processor for performing a set of instructions. These instructions include evaluating a plurality of POS datasets for a plurality of transactions received from at least one POS device. Each POS dataset comprises a merchant identifier, an account identifier, a transaction amount, and a time of day for the transaction. The merchant identifiers are associated with merchant classifications according to market categories. The instructions further include evaluating the datasets for transactions involving the same account identifiers over a defined time to determine when the same account identifiers were used and with which merchant identifiers. The system may generate a report showing results of the evaluation, including when account identifiers are used with a given merchant as well as other merchants within the defined time. In some cases, the system evaluates the datasets to categorize by merchant classifications, and the report shows, for the other merchants, where account identifiers were used according to merchant classifications. In other cases, the set of instructions evaluates the datasets for transactions that were used in connection with two different merchant identifiers having the same merchant classification. In this way, the report shows when customers shop at both the given merchant as well as one or more competing merchants within the defined time.

In a further embodiment, the invention provides an exemplary method for evaluating transaction data to determine shopping patterns. This could be, for example, to show how many of a merchant's customers live near the merchant's store. According to the method, a host computer system receives from at least one POS device a plurality of POS datasets for a plurality of transactions. Each POS dataset comprises a merchant identifier, an account identifier, and a transaction amount. The POS datasets are evaluated to determine a merchant location for the purchases. Also, account holder residential address information is associated with the account data. A distance from the residential address information relative to the merchant location is calculated, and a report is generated showing the results of the calculation.

In one aspect, the report indicates a percentage of total transactions that occurred within a certain distance from the account holder's residential address relative to the merchant location. In a further aspect, the report indicates a percentage of total transactions that occurred outside a certain distance from the account holder's residential address relative to the merchant location. As another option, the report may indicate an average distance from the account holder's residential address to the merchant location for the plurality of transactions.

In a further embodiment, the invention provides a system for evaluating transaction data to determine shopping patterns. The system includes a host computer system having a memory and at least one processor for performing a set of instructions. These instructions include evaluating a plurality of POS datasets for a plurality of transactions received from at least one POS device. Each POS dataset comprises a merchant identifier, an account identifier, and a transaction amount. The POS datasets are evaluated to determine a merchant location for the purchases. Also, account holder residential address information is associated with the account data. The instructions further calculate a distance from the residential address information relative to the merchant location and generate a report showing the results of the calculation.

The report may indicate a percentage of total transactions that occurred within a certain distance from the account holder's residential address relative to the merchant location. Also, the report may indicate a percentage of total transactions that occurred outside a certain distance from the account holder's residential address relative to the merchant location. Further, the report may indicate an average distance from the account holder's residential address to the merchant location for the plurality of transactions.

As an alternative to determining the distance of a customer for a merchant's store, other reports showing location relative to other locations may be provided as well. For example, a report could be produced showing how close merchant locations are relative to other points of interest. For instance, some may wish to know how close certain merchants are to a commuter stop, such as a bus or railway station, or an airport. Further, reports could be generated showing how many of a certain merchant's customers live near the same commuter stop. As an example, the report may say that a certain number of people who have shopped at a certain merchant within the last year live within a certain distance of a commuter stop. Other information may also be provided, such as income levels, spending habits or the like.

In one embodiment, market trend reports may be generated by aggregating POS datasets from a plurality of POS terminals. Each POS terminal is associated with terminal data that can be used to identify a merchant associated with a transaction. Each POS terminal is also configured to collect transaction data as a function of transactions effectuated via the POS terminal. The POS dataset for each of the POS terminals can be defined in terms of the terminal data and the transaction data. Requests may be received to generate a market trend report corresponding to a given market. A market dataset is identified from the aggregated POS data, and market trend data is generated from the market dataset. Further, graphical report data can be output as a function of the market trend data and is usable by a user device to display a market trend report.

As an example, a merchant may desire to understand the status of a market within a given geographical region. As such, a report may be produced using POS data showing growth rates within the specified region. This can further be narrowed in terms of industry, such as by using MCC Codes. This permits a merchant to view the number of merchants within a region along with growth figures, such as dollar volume growth, average ticket growth, transaction growth, and the like.

In one aspect, the graphical report data permits the display of a growth comparison comprising the growth of the given market as compared to a previous time, such as a growth comparison from one moth of the year to the same month of the following year. In another aspect, the graphical report data permits the display of the growth comparison over a certain amount of time using a line graph. In this way a display of multiple months (as compared to previous months) may be displayed in a single graph.

The given market may comprise one or more industries, and the market dataset may be identified by mapping the merchant identifier to a certain industry. The given market could also comprise one or more geographical regions, and the market dataset may be identified by determining a geographical region where the POS terminals are located, such as, for example, by zip code. The graphical report data may also permit a numeric display of a growth percentage at a snapshot in time. This numeric display may be superimposed over a map of the geographic region. In a further aspect, the given market may comprise one or more payment instrument types, and the market dataset may be identified by a payment type identifier. A variety of payment instrument types may be used, such as credit payment instruments, debit payment instruments, open loop prepaid payment instruments, closed loop prepaid payment instruments, mobile payment instruments, e-commerce payment instruments and the like.

The graphical report data may also permit a numeric display at a snapshot in time of a growth percentage. This display may be superimposed over a line graph of the growth, such as when moving a pointer over the line graph. In some cases, a user may request to see only certain industries. The graphical report data may be modified to show the selected industries.

In some embodiments, the user may request to see the growth of certain industries by geographical region. The graphical report data may be modified to show the industry growth by geographical region. In other embodiments, the user may wish to see only certain payment instrument types, and the graphical report data may be modified to show the selected payment instrument types.

In another aspect, the user may wish to see a certain type of growth comparison, such as the dollar volume of growth, average ticket item growth or growth in the number of transactions. A graphical report data may be output to display the requested type of growth comparison.

In another option, the graphical report data permits the display of a growth comparison for a given merchant. The growth comparison comprises the growth of the given market for the given merchant as compared to a previous time. Optionally, the graphical report data further permits the display of the growth comparison for the given merchant along with a growth comparison for an aggregation of similarly situated merchants. Conveniently, this may be provided as part of a regular statement that is send to a merchant.

Another feature is the ability to include macroeconomic data that is relevant to the market trend report. A correlation is made between a trend event and the macroeconomic data, and the graphical report data describes this correlation.

In certain embodiments, the reports relate to closed-loop pre-paid payment instruments. In such cases, the report may show activations of the pre-paid instruments, such as by displaying activations by industry or geographical region. Further, activations may be shown by dollar volume of growth, average ticket item growth or by growth in the number of transactions. Reports may also be generated to show redemptions or reloads associated with the pre-paid instruments.

The invention further provides an exemplary system for market reporting suing point-of-sale (POS) data. The system includes an aggregation subsystem that is communicatively coupled with a POS network comprising a plurality of POS terminals. The aggregation subsystem is configured to aggregate POS datasets from the POS terminals. Each POS terminal is associated with terminal data that in turn is associated with a merchant identifier. Each POS terminal is configured to collect transaction data as a function of transactions effectuated via the POS terminal. The POS dataset for each of the POS terminals comprises the terminal data and the transaction data.

The system further comprises a data storage subsystem that is communicatively coupled with the aggregation subsystem and is configured to store the aggregated POS data from the POS terminals. A trend processing subsystem is communicatively coupled with the POS data store and is configured to generate a market trend for a market. This is done by identifying a market dataset from the aggregated POS data, and generating market trend data from the market dataset. A reporting subsystem is communicatively coupled with the trend processing subsystem and is configured to output graphical report data as a function of the market trend data in response to the reporting request.

Embodiments use actual aggregated data (e.g., transaction and terminal data) from a large number of POS terminals to generate macro-level trends for merchants, merchant types, geographical regions, markets, market segments, etc. For example, POS datasets are aggregated from a number of POS terminals, each located at a merchant outlet location, such that each POS dataset includes location data and transaction data for its respective POS terminal. A reporting request is received for a market trend report corresponding to a designated market over a designated timeframe. A market dataset is identified from the portion of the aggregated POS data corresponding to the designated timeframe and market. Unreliable portions of the data may be discarded. Market trend data is then calculated as a function of the reliable portion of the market dataset, and graphical report data is output as a function of the market trend data in response to the reporting request.

In one set of embodiments, a system is provided for market reporting according to point-of-sale (POS) data. The system includes an aggregation subsystem, a data storage subsystem, a trend processing subsystem, and a reporting subsystem. The aggregation subsystem is in communication with a POS network having a number of POS terminals, and is configured to aggregate POS datasets from the POS terminals in the POS network. Each POS terminal is disposed at a merchant associated with terminal data indicating at least one of a number of merchant identifiers and at least one of a number of merchant classifiers, and each is configured to collect transaction data as a function of transactions effectuated via the POS terminal. The POS dataset for each of the POS terminals includes the terminal data and the transaction data for the respective POS terminal.

The data storage subsystem is in communication with the aggregation subsystem and is configured to store the aggregated POS data from one of the POS terminals in the POS network. The trend processing subsystem is in communication with the POS data store and is configured to generate a market trend for a market over a timeframe by: identifying a market dataset from the aggregated POS data, the market dataset including the POS datasets corresponding to the timeframe and to POS terminals having terminal data indicating a merchant classifier corresponding to the market; calculating a reliable portion of the market dataset as a function of the POS datasets in the market dataset; and generating the market trend as a function of the reliable portion of the market dataset. The reporting subsystem is in communication with the trend processing subsystem and is configured to output graphical report data as a function of the market trend generated by the trend processing system. The graphical report data is configured to be displayed on a user device.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIGS. 10A-10D illustrate an example of an illustrative data flow, according to one embodiment.

FIG. 34 illustrates a market trend report showing activations of closed loop prepaid payment instruments by industry.

FIG. 35 illustrates a market report showing redemptions by industry for closed loop prepaid transaction instruments.

FIG. 36 illustrates a market report that shows reloads by industry for closed loop prepaid payment instruments.

FIG. 46 illustrates a graphical report showing the percentage of customers shop at competing merchants over time.

FIG. 48 illustrates a screen display that permits entry of data to determine the distance of customers' residences relative to the merchant's store.

FIG. 49 illustrates a report that is generated showing customer statistics.

DETAILED DESCRIPTION OF THE INVENTION

Figure 1:
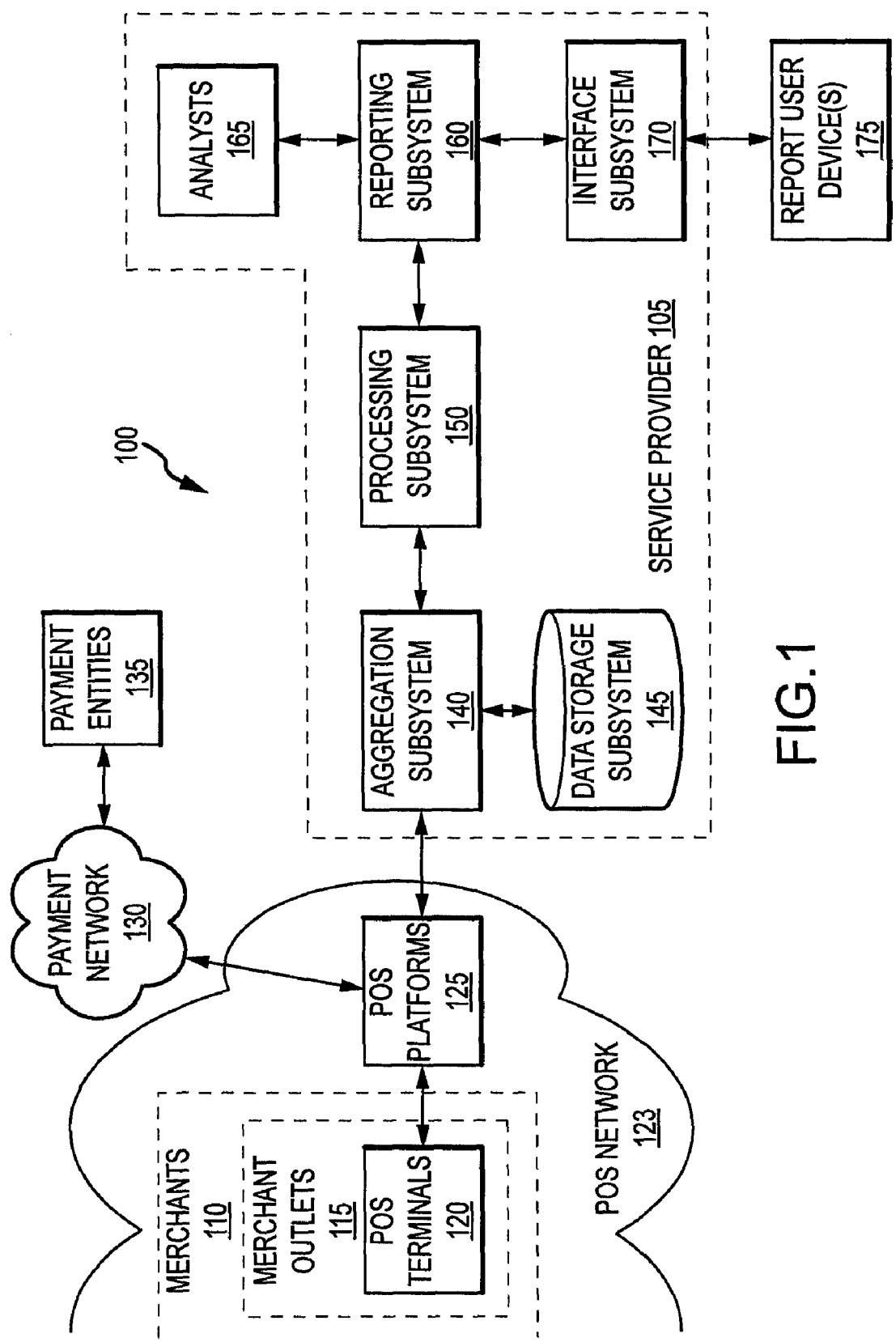
FIG. 1 shows a block diagram of an illustrative market network, according to various embodiments.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

It is well appreciated by investors, consumers, corporate officers, and other market participants that understanding various states and trends of markets can prove extremely valuable. It is also well appreciated by market participants that it may be difficult, or even impossible, to get a complete and accurate picture of many markets. For example, many market trends typically result from a large number of factors having varying types and magnitudes of effects on the market at issue. Further, many of these factors depend on data that may be difficult or impossible to obtain, including, for example, certain types of proprietary data, data from diverse and often-unreliable sources, etc.

In one typical example, market trends are generated by collecting data from a number of indirect sources. Public and private agencies may contact representative merchant locations to ask about overall performance for a given timeframe (e.g., the past month), various market reporters may gather rumors, speculation, and snippets of data from multiple sources, etc. Investors and analysts may then cull this indirect market information to make educated guesses about current and future market positions.

Notably, many typical techniques for gathering market data may provide limited and/or undesirable results. For example, interviews, rumors, and speculation all have a potential of generating inaccurate information, information that is not representative of the market (e.g., information restricted to a subset of market participants, to a particular geographic region, etc.), etc. Additionally, much of these types of information can only be gathered retrospectively (e.g., a merchant location may only be able to accurately answer questions about its performance for a month after the books have been closed for the month). As such, there may be delays in obtaining these data, which may be undesirable for investors and/or other stakeholders.

Among other things, embodiments described herein exploit actual transaction data aggregated from point-of-sale (POS) terminals to generate and report market trend data. In some embodiments, data from very large numbers of POS terminals are used to generate complete and accurate market trend data in a substantially timely fashion, for example in comparison to using interviews and/or other indirect techniques.

Turning first to FIG. 1, a block diagram of an illustrative market network 100 is shown, according to various embodiments. As illustrated, a service provider 105 is in communication with a number of POS terminals 120 that are in further communication with a payment network 130. Transactions are effectuated via the POS terminals 120 (e.g., using payment cards and/or other known forms of payment). In some embodiments, payment entities 135 interact with the payment network 130, for example, to perform various authorization and/or other functions relating to the transactions. Data from the transactions may be aggregated by the service provider 105 for use in generating market report data. In some embodiments, one or more report user devices 175 are in communication with the service provider 105, for example, to exploit the generated market report data.

Use of POS terminals 120 in effectuating transactions is well known in the art. As such, and for the sake of clarity, specific operations of POS terminals 120, POS networks 123, payment networks 130, payment entities 135, etc. will not be fully described herein. Rather, these and related terms and phrases should be broadly construed to include any transaction facilitating devices, systems, and techniques that are useable in the context of the various embodiments described herein.

For example, as used herein, POS terminals 120 may include cash registers, and any other alternative and/or peripheral devices or systems, including hardware and/or software, for effectuating transactions between a merchant and a consumer. POS platforms 125, as used herein, include any hardware and/or software for facilitating communications between one or more POS terminals 120 and the payment network 130 and/or service provider 105. In one embodiment, the POS platforms 125 include proprietary platforms, such as merchant platforms offered by First Data Corporation. In some embodiments, one or more interfaces are included with the POS terminals 120 and/or the POS platforms 125 to facilitate use by end consumers (e.g., cardholders, payors, etc.), salespersons, etc. The POS network 123, as used herein, is intended to broadly include any type of physical or virtual network, including one or more communications networks, corporate networks, etc. For example, a large number of globally distributed POS terminals 120 may, in some embodiments, be considered as part of a global POS network 123, even where some or all of the POS terminals 120 in the POS network 123 may not be in communication with one another.

As used herein, "POS terminals" are intended to include both physical terminals located at brick and mortar locations as well as virtual terminals (some type of computer system) capable of receiving and processing transaction requests. For example, financial transactions occurring other than at brick and mortar locations can include Internet transactions (typically involving a merchant web site or other payment portal, such as PayPal), mobile transactions made using a mobile device or phone, and the like. For these transactions, payment information is transmitted over some type of network to a computer system that is capable of receiving such transactions and then processing them to complete the financial transaction. It will be appreciated, however, that some transactions using mobile devices (such as mobile phones, iPads, and the like) can be made by directly or indirectly interfacing with POS terminals located in brick and mortar locations as well.

The POS terminals located at brick and mortar locations can capture transaction data in a number of ways, including by the use of payment cards with magnetic stripes, smart chips, RF transponders (RFID chips) or the like. The POS terminals can also read transaction information from non-traditional "cards", such as when reading information from checks or other negotiable instruments, such as by reading MICR lines, by the use of OCR scanners, by manually keying in data, or the like. Further, various communication channels can be used to transmit data from the payment vehicle to the POS terminal, such as by Bluetooth, cellular, RF, and the like. These configurations permit payments to be made using a variety of payment vehicles, including by credit cards, debit cards, checks or other negotiable instruments, ACH transaction, prepaid cards or accounts, stored value cards or accounts, and the like. In each of these, the appropriate information will be captured from the transaction at the POS terminal so that reports may be produced as described herein.

Hence, when receiving the transaction data, the POS terminals capture data pertinent to conducting a transaction, such as the amount of the transaction, the payment instrument or vehicle, the time of the transaction, and the like. The POS terminals also provide information on the location of the POS device (or location of the merchant—by physical address, web site or the like) as described hereinafter.

As illustrated, some or all of the POS terminals 120 may be located at (e.g., inside, on the property of, in close proximity to, etc.) a merchant outlet 115. The merchant outlet 115 may be the only one, or one of many, locations of a particular merchant 110. For example, each merchant outlet 115 may be a physical store location, a franchise location, a branch office, virtual presence, etc. of a merchant 110. Of course, where the merchant 110 has only a single presence, the merchant outlet 115 and the respective merchant 110 may be one and the same.

Embodiments of the POS terminals 120 are configured to be associated with certain types of information and to collect certain types of information. For example, each POS terminal 120 may collect and/or be associated with terminal information and transaction information, as described more fully below. The transaction and terminal information may be sent to the POS platforms 125 for various types of processing. For example, some or all of the information may be sent to the payment network 130 for authorization by one or more payment entities 135 (e.g., issuing banks, payment card companies, etc.), and/or the information may be sent to the service provider 105.

Functions of the service provider 105 may be carried out by one or more subsystems. In various embodiments, components of the subsystems are implemented, in whole or in part, in hardware. Thus, they may include one or more Application Specific Integrated Circuits (ASICs) adapted to perform a subset of the applicable functions in hardware. Alternatively, the functions may be performed by one or more other processing units (or cores), on one or more integrated circuits (ICs). In other embodiments, other types of integrated circuits may be used (e.g., Structured/Platform ASICs, Field Programmable Gate Arrays (FPGAs), and other Semi-Custom ICs), which may be programmed. Each may also be implemented, in whole or in part, with instructions embodied in a computer-readable medium, formatted to be executed by one or more general or application specific controllers.

In some embodiments, data from all the POS terminals 120 is received and aggregated by an aggregation subsystem 140. The aggregation subsystem 140 generates and stores aggregated POS datasets in a data storage subsystem 145. Embodiments of the data storage subsystem 145 may include any useful type of data storage. For example, the data storage subsystem 145 may include servers, hard disks, etc. Further, the aggregated data may be stored using any useful types of security, data structure, etc. In one embodiment, the aggregated data is stored as an associative database to facilitate various types of data processing functions (e.g., mining, filtering, sorting, etc.).

In some embodiments, as described more fully below, the aggregated data may be processed by a processing subsystem 150. Embodiments of the processing subsystem 150 are configured to generate various types of market trend and/or other data for use by a reporting subsystem 160. Embodiments of the reporting system 160 use the data generated by the processing subsystem 150 to generate one or more types of market reports. In some embodiments, additional information is used to generate reports, including data received from one or more analysts 165 and/or other data sources.

The service provider 105 may further include an interface subsystem 170 to facilitate interaction with and/or delivery of reporting data generated by the reporting system. In some embodiments, one or more report user devices 175 interface with the service provider via the interface subsystem 170. For example, the report user devices 175 may request certain reports, receive report data for viewing, etc.

Figure 2:
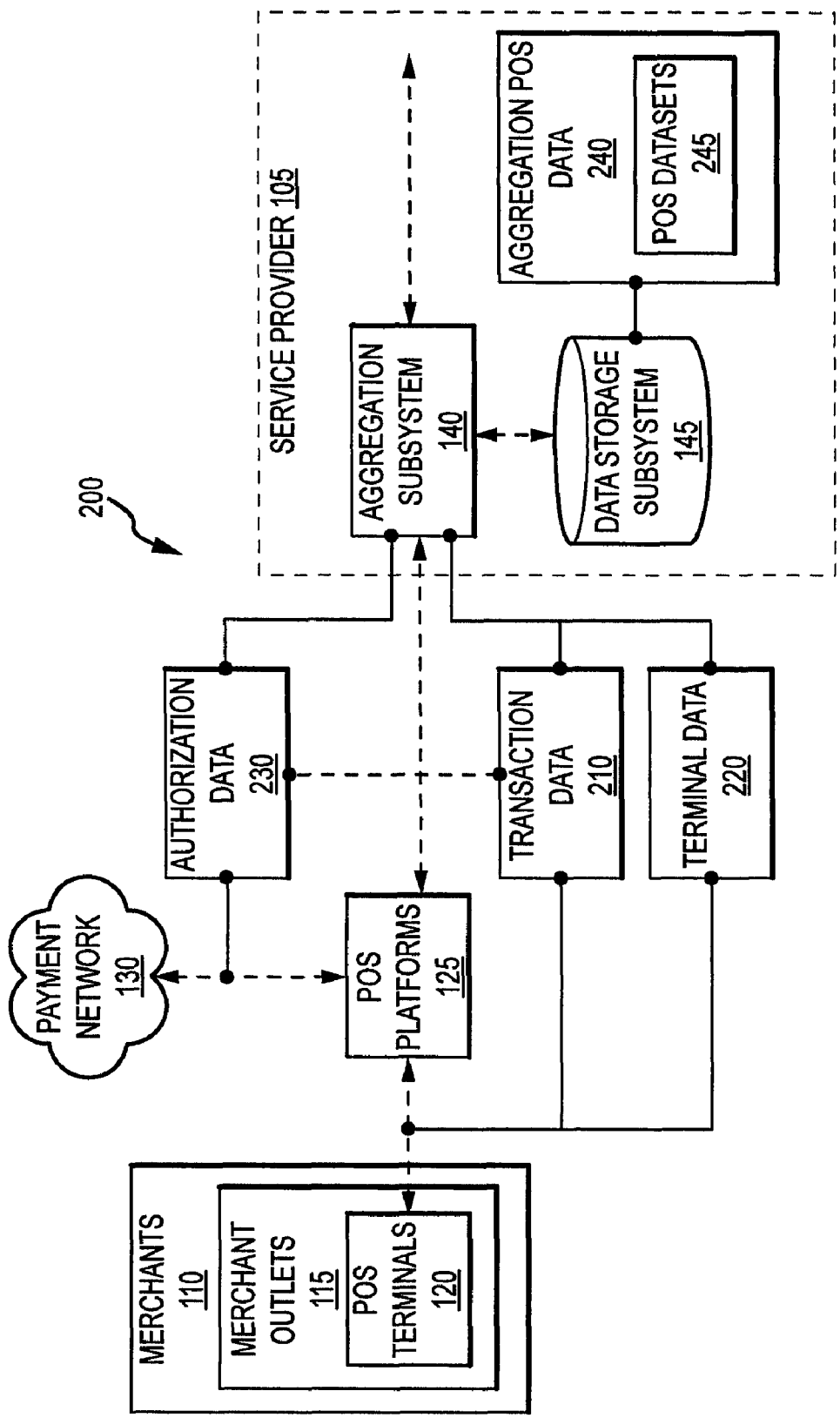
FIG. 2 shows a data flow diagram in the context of a first portion of a market network, according to various embodiments.
Figure 3:
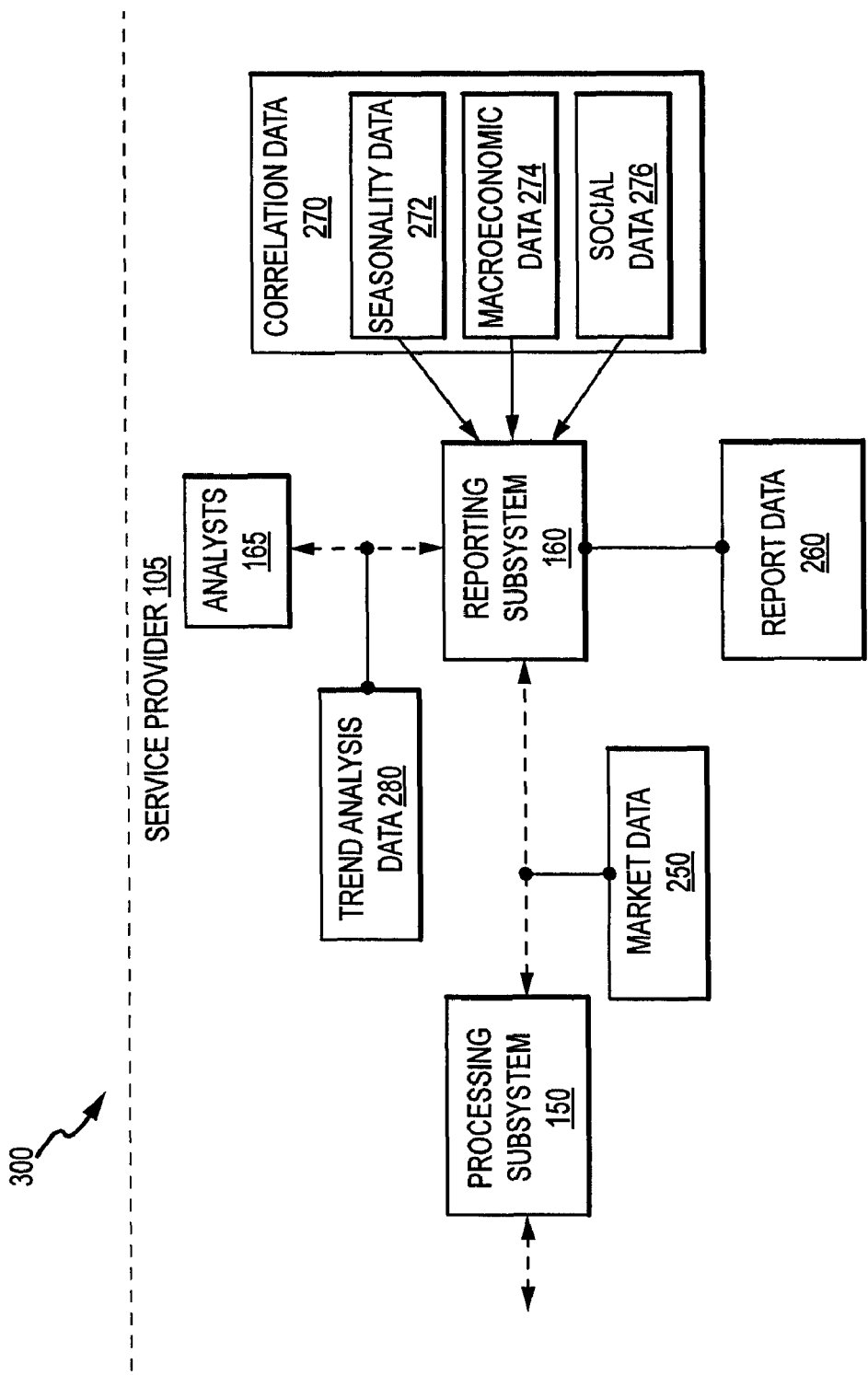
FIG. 3 shows a data flow diagram in the context of a second portion of a market network, according to various embodiments.
Figure 4:
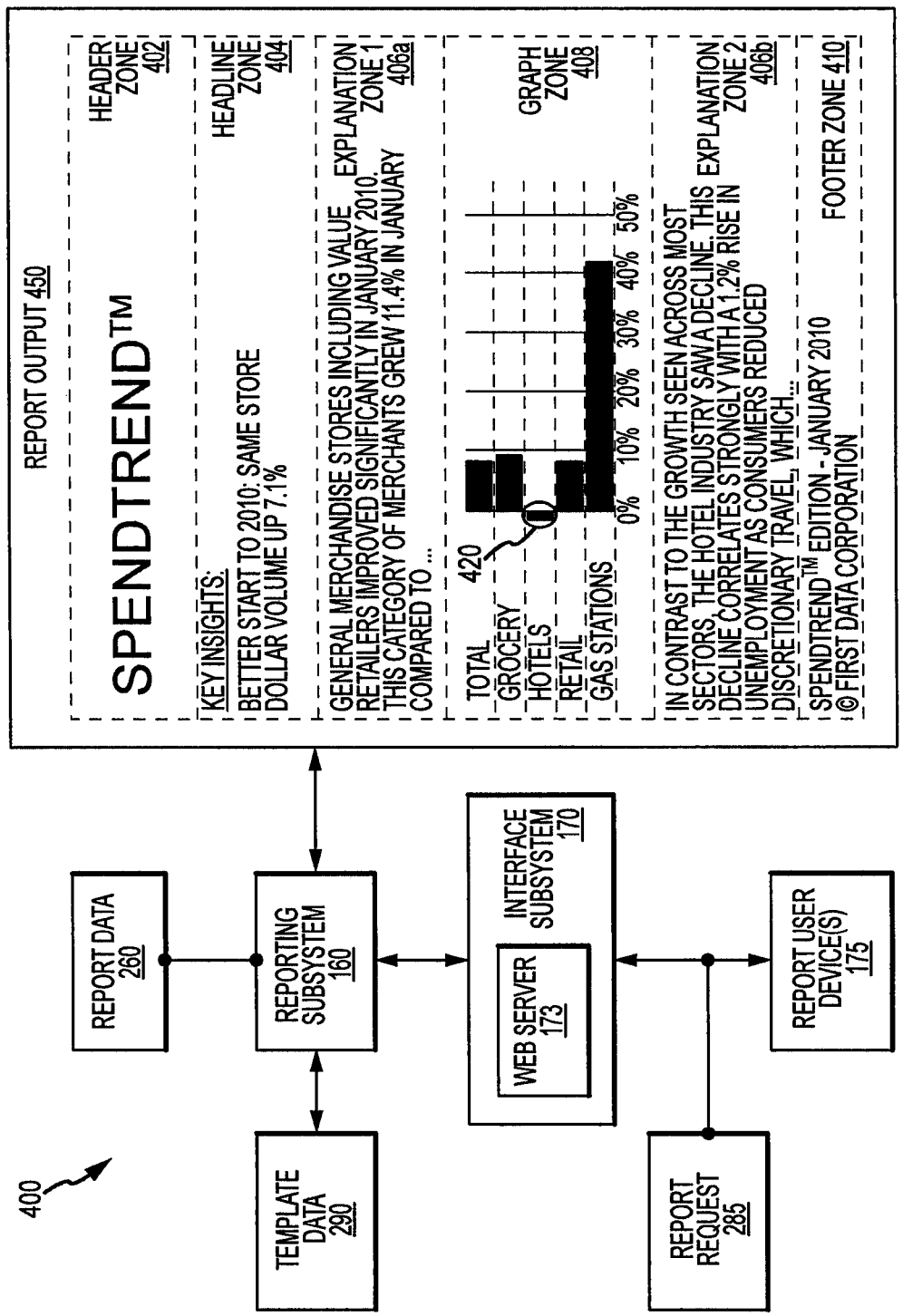
FIG. 4 shows a data flow diagram in the context of a third portion of a market network, according to various embodiments.

The functionality of various components of the market network 100, including the various subsystems of the service provider 105, will be described more fully below. For example, FIGS. 2-4 illustrate some embodiments of data flow through market networks, like the market network 100 of FIG. 1, each focusing on a portion of the data flow for the sake of clarity. Turning first to FIG. 2, a data flow diagram 200 is shown in the context of a first portion of a market network, according to various embodiments.

Embodiments of the data flow diagram 200 focus on generation and aggregation of POS data. As in a portion of the market network 100 of FIG. 1, a service provider 105 is in communication with a number of POS terminals 120 that are in further communication with a payment network 130. Embodiments of the POS terminals 120 are disposed at (e.g., located in or near) merchants 110 or merchant outlets 115. Transactions are effectuated via the POS terminals 120. Data from the transactions may be aggregated by an aggregation subsystem 140 of the service provider 105, which may be stored in a data storage subsystem 145.

Embodiments of the POS terminals 120 are configured to be associated with certain types of information and to collect certain types of information. While each POS terminal 120 may collect and/or be associated with many different types of information, some typical types of information can be classified into two general categories: transaction data 210 and terminal data 220. The terminal data 220 may include information relating to (e.g., identifiers corresponding to) the merchant 110 and/or particular merchant outlet 115 where the POS terminal 120 is located, network information (e.g., Internet protocol (IP) address, security protocols, etc.), configuration information (e.g., types of payment instruments accepted, software version, etc.), and/or any other information relating to the POS terminal 120 and not specifically to any transaction effectuated via the POS terminal 120.

It is worth noting that the terminal data 220 may indicate various characteristics of the POS terminals 120 in various ways. For example, various types of merchant classifiers may be used. In one embodiment, a merchant classifier code (MCC) defined by a government standard is used to identify each merchant. In other embodiments, a proprietary code may be used. Further, in some embodiments, each merchant is identified by a single classifier, even where the merchant operates in multiple markets. For example, a megastore may sell groceries, general merchandise, gasoline, insurance services, etc., but the merchant may be classified only using a "grocery" classification. In an alternate embodiment, the megastore may be classified using multiple classifiers. In still another embodiment, the megastore may be classified by both a single classifier (e.g., a default classifier, or a classifier chosen to comply with a particular standard) and by one or more other classifiers (e.g., according to proprietary classification systems).

The transaction data 210, on the contrary, may include any type of information relating to one or more transactions effectuated via the POS terminal 120. For example, the transaction data 210 may include timestamp information (e.g., a date and time, or time range, of one or more transactions), transaction value, fee and/or discount information, product category and/or description information, demographic information (e.g., relating to the payor), etc.

The transaction data 210 that is collected by POS terminal 120 may depend on the particular payment instrument used to effectuate a payment. For example, when paying by credit or debit card, the track two data is typically read using a magnetic stripe reader. Also, the amount of the purchase is entered, typically electronically from a cash register. For Internet transactions, the amount may be generated from the merchant's web site or a payment processing company. For negotiable instruments, the MICR line is typically read using the POS terminal 120. Other information, such as the amount of the check, may also be entered, either by manually keying in the information, electronically by the cash register, from a web site or the like. For closed-loop prepared cards, such as traditional magnetic strip gift cards, the account number is typically read from the magnetic stripe and the amount of the transaction is received by manual key in, from a cash register, from a web site or the like. Transactions from mobile devices or from the Internet typically include data similar to traditional payment forms, as such transactions usually stem from electronic wallets that typically include information similar to their physical counterparts. However, these transactions also include data indicating that the transaction originated from a mobile device or the interne and can be used in generating market reports.

Not all the transaction data received at the POS terminal 120 may be needed in order to generate the market reports. As such, a parsing processes may be used to extract only the relevant data needed to produce the reports. This parsing can occur at various locations, including but not limited to the POS platforms 125, the service provider 105, aggregation subsystems, or the like.

The transaction data 210 and terminal data 220 may be sent to the POS platforms 125 for various types of processing. In certain embodiments, some or all of the transaction data 210 may be sent from the POS platforms 125 to the payment network 130 for authorization. For example, transactions may be authorized, denied, canceled, etc. In some embodiments, the authorization process generates authorization data 230 that may or may not be included in the transaction data 210. In some embodiments, the transaction data 210, terminal data 220, and/or authorization data 230 are sent from the POS platforms 125 to the service provider 105. In various embodiments, information may be communicated to the service provider 105 periodically (e.g., every night), as a result of a trigger event (e.g., after a particular magnitude change in an economic indicator or social event), on demand (e.g., on request by the service provider 105), etc.

In some embodiments, the various types of data are sent to the aggregation subsystem 140 using standard formats and/or protocols. In other embodiments, the aggregation subsystem 140 is configured to process (e.g., parse) the data into a usable and/or desired format. The data may then be stored in the data storage subsystem 145 as aggregated POS data 240. In some embodiments, the aggregated POS data 240 is a collection of POS datasets 245. It is worth noting that the aggregated POS data 240 may be arranged in any useful way, for example, as an associative database, as a flat file, as sets of POS datasets 245, in encrypted or unencrypted form, in compressed or uncompressed form, etc.

Embodiments may then use the aggregated POS data 240 to generate market data. FIG. 3 shows a data flow diagram 300 in the context of a second portion of a market network, according to various embodiments. In some embodiments, the context of FIG. 3 includes various subsystems of the service provider 105. For example, as illustrated in the data flow diagram 200 of FIG. 2, aggregated POS data 240 may be generated by the aggregation subsystem 140 and stored in the data storage subsystem 145. This aggregated POS data 240 may then be used by other subsystems of the service provider 105 for further processing.

In some embodiments, the processing subsystem 150 uses the aggregated POS data 240 (e.g., either directly from the data storage subsystem 145 or via the aggregation subsystem 140) to generate market data 250. For example, the aggregated POS data 240 may include merchant type flags, merchant identifiers, merchant outlet identifiers, transaction amounts, numbers of transactions, payment types used, transaction types (e.g., sale, cash advance, return, etc.), transaction authorizations (e.g., authorize, decline, etc.), timestamps, etc. As used herein, the market data 250 may include any types of data useful in generating market analyses and/or reports that can be extracted and/or derived from the aggregated POS data 240.

In some cases, a type of mapping may be used in order to be useful for a given market, such as trends by industry, geography, card type and the like. For instance, data from the POS terminal may reveal the identify of a given merchant. This merchant may then be classified into a specific industry, such as fast food, so that a trend report may be produced by industry. A similar approach can be used when determining trends by geography, such as by knowing the zip code of the merchant or other geographic identifier originally gleaned from the POS terminal. For card types, the transaction data can be evaluate to determine what payment instrument was used in the transaction. As described above, not all data collected at the POS terminals need be used to generate the reports. This may be done for both POS terminals located in physical stores as well as virtual POS terminals used with e-commerce and mobile transactions.

Given these and/or other types of aggregated POS data 240, the market data 250 may include extracted or classified data, such as data extracted for a particular time period, data extracted for all records having the same store identifier, data classified by merchant type, data classified by location (e.g., merchant region, geographic region, etc.), data classified by dollar volume, data classified by average ticket price, etc. The market data 250 may additionally or alternately include trend data, such as data trends over a particular time period or compared to a baseline. The trends may look at time periods, payment types, merchants, merchant categories, geography, transaction volumes, ticket values, or any other useful (e.g., and derivable) characteristics of the aggregated POS data 240.

In some embodiments, the market data 250 is used by a reporting subsystem 160 of the service provider 105. Embodiments of the reporting subsystem 160 use the market data 250 to generate report data 260. The report data 260 may typically include data desired for generation of a market report, which may, for example, include data to support graphical representations of trends (e.g., for generation of bar graphs, pie charts, line graphs, spreadsheets, etc.), indications of events (e.g., for highlighting data, circling data, flagging data, etc.), etc.

While certain embodiments of the reporting subsystem 160 generate reporting data 260 only according to market data 250, other embodiments may use additional data. In some embodiments, the reporting subsystem 160 is configured to interface with one or more analysts 165 (e.g., human or machine). The analysts 165 may generate trend analysis data 280. For example, the trend analysis data 280 may include explanations, headlines, annotations, etc., for example, for adding value to an end user of the report data 260.

In some embodiments, the reporting subsystem 160 is in communication with one or more sources of correlation data 270. The correlation data 270 may include any type of data that could be useful in identifying correlations with and/or explanations of the market data 250. For example, embodiments of the correlation data 270 include seasonality data 272, macroeconomic data 274, and/or social data 276.

Embodiments of the seasonality data 272 may include information relating to time of year, number of workdays, number of weekends in a month, season, holidays, etc. For example, Jan. revenue may correlate at least in part to the number of weekends in Jan. each year. Embodiments of macroeconomic data 274 may include information relating to gross domestic product, personal bankruptcy, unemployment, total consumer debt, etc. For example, an increase in unemployment in a geographic region may correlate to an increase in fast food sales for that region. It is worth noting that the term "macroeconomic" is used herein only to distinguish from economic transaction data for a particular POS terminal 120. It will be appreciated that certain data, which may technically be classified as "microeconomic" in nature may be included in the macroeconomic data 274, such as economic trends relating to a particular subset of consumers, to particular externalities or market failures, to a particular merchant outlet or branch office, etc. Embodiments of social data 276 may include information relating to particular social trends, fads, military incursions, regulatory issues, political issues, etc. For example, a beef scare relating to a grocery store in a particular week may correlate to a drop in revenue for that grocery merchant for that week.

It will be appreciated that many other types of correlation data 270 are possible and may be received and/or derived from many types of sources. The correlation data 270 may also be collected periodically, based on historical data that was gathered or generated previously, etc. It will be further appreciated that the correlation data may be used by the analysts 165 in generating trend analysis data 280. For example, an analyst 165 may identify a correlation between the market data 250 and certain correlation data 270. The analyst 165 may then write up an explanation of the correlation, identify the correlation, do more research, etc. Other types and uses of correlation data 270, trend analysis data 280, and/or other data is described more fully below.

The report data 260 generated by the reporting subsystem 160 may be used in a number of different ways. Some of these ways are described with reference to FIG. 4. FIG. 4 shows a data flow diagram 400 in the context of a third portion of a market network, according to various embodiments. In some embodiments, the reporting subsystem 160 generates the report data 260 according to embodiments described with reference to FIG. 3. The report data 260 may then be used to generate one or more types of reports.

In some embodiments, the reporting subsystem 160 is in communication with an interface subsystem 170. Embodiments of the interface subsystem 170 are configured to provide an interface between the reporting subsystem 160 (and/or other subsystems of the service provider 105) and one or more consumers of the report data 260. For example, one or more end consumers may interact with the interface subsystem 170 via one or more report user devices 175. In various embodiments, the report user devices 175 may include any type of device capable of providing the desired report data 260 to the end consumer. For example, the report user devices 175 may include desktop and laptop computers, smart phones, personal digital assistants, e-readers, etc.

In some embodiments, the report user devices 175 interact with the interface subsystem 170 over a network (e.g., the Internet). These interactions may be facilitated in certain embodiments by a web server 173 in the interface subsystem 170. Some embodiments of the interface subsystem 170 may further include interface elements for various functions, such as authorization (e.g., login elements, encryption elements, etc.), graphical user interface handling, query handling, etc.

Embodiments of the interface subsystem 170 are used to facilitate provision of a report output 450 (e.g., a graphical report product) to one or more report user devices 175. In certain embodiments, the report user devices 175 can provide report requests 285 to the reporting subsystem 160 via the interface subsystem 170. For example, the report requests 285 may include one or more queries and/or other information for generating a report from the report data 260. Alternately, the report requests 285 may be issued after a report output 450 has already been generated, for example, to filter, refine, update, reformat, or otherwise affect the report output 450. In certain embodiments, report outputs 400 are generated without allowing for any report requests 285 before or after the report generation. Further, in some embodiments, report outputs 400 are generated according to automatically generated report requests 285. For example, a subscriber of a reporting service may have certain preferences (e.g., selected preferences, preferences based on the subscriber's portfolio, etc.), which may be used to decide what information is presented in a report output 450 and/or in what form.

In some embodiments, the report output 450 is also affected by template data 290. Depending on the type of output, the template data 290 may include any useful formatting or presentation information. For example, the template data 290 may include a style sheet, font information, margin information, graphics, etc. In certain embodiments, the template data 290 defines certain zones on all or part of the report output 450. Each zone may be dependent on other zones or independent, it may be automatically filled with report data or left open for manual input, or used in any other useful way.

In the illustrated embodiment of FIG. 4, the report output 450 includes 6 zones: a header zone 402, a headline zone 404, a first explanation zone 406a, a graph zone 408, a second explanation zone 406b, and a footer zone 410. These zones are intended only for illustration and should not be construed as limiting in any way. The header zone 402 and the footer zone 410 may include header and footer information, respectively. For example, the report output 450 may include a page header with logos, etc., copyright notices, edition information, etc. The headline zone 404 is illustrated to include a headline for the page. For example, the headline may point out a key insight illustrated by the other report data 260 shown on the page. The first explanation zone 406a is illustrated to include a general explanation to support the headline shown in the headline zone 404. For example, the first explanation zone 406a may include additional data and details relating to the key insight, trends, etc., and may provide an introduction to other information on the page. The graph zone 408 may include a graphical representation of a certain portion of the market data 250 (e.g., data relating to the key insight). The second explanation zone 406b is illustrated to explain and further support data from the graph zone 408, the first explanation zone 406a, etc.

In the example illustrated, market data 250 from Jan. 2010 illustrates that same store dollar volumes are up 7.1-percent, as noted in the headline zone 404. The first explanation zone 406a, second explanation zone 406b, and graph zone 408 support this headline. For example, the bar graph in the graph zone 408 shows dollar volume growth for January 2010. As shown, grocery and retail are up around ten-percent, hotels are down around two-percent, and gas stations are up over forty-percent.

It is worth noting that the data in various embodiments may be focused on same store performance. As used herein, "same store" data generally refers to data aggregated from either an identical set of POS terminals 120 or from a statistically insignificant change in a sample set. For example, as discussed above, the market data 250 is derived using actual data from actual transactions effectuated via actual POS terminals 120. As such, real-world changes in the number of POS terminals 120 may have a noticeable effect on generated data if not properly accounted for.

Suppose, for example, that thirty new merchant outlets 115 open for a particular merchant 110 over a single year, and each merchant outlet 115 has an average of four POS terminals 120. The aggregated POS data 240 may show a large increase in dollar volume over that time period. For certain market reports, that information may be useful. For example, certain investors may be interested in the overall growth of that particular merchant's 110 dollar volume over the timeframe. For other market reports, however, it may be desirable to have an "apples-to-apples" comparison from one timeframe to another. For example, the overall growth may provide little or no information about representative growth of particular stores, of particular markets, etc.

As such, it may be desirable to generate reports based on a "same store" analysis. For example, it may be desirable to generate market data for substantially the same store sample set over two different timeframes. Notably, this and/or other functionality may include removal of irrelevant and/or unreliable data (e.g., or identification of relevant and/or reliable data. As such, certain embodiments generate a reliable portion of the market data 250 for use in generating the report data 260.

In one embodiment, when the aggregated POS data 240 shows insufficient data over the timeframe of interest (e.g., a particular POS terminal 120 has only been collecting transaction data 210 for a portion of the timeframe), the data may be removed from the analytical dataset. In another embodiment, statistical analyses may be performed to determine whether to use certain data. For example, market data 250 may be generated with and without certain data, and the differences may be analyzed to determine whether they are significant. Where the differences are significant, the data may be discarded and/or further analysis may be performed to determine why the difference is significant (e.g., and whether that significant difference would be worth reporting as part of the report data 260).

Notably, the report output 450 may further include various types of indications. In one embodiment, when data is discarded, it may still be included in the report data 260 and indicated as such. For example, a line of a spreadsheet may be struck through, or an asterisk may be included, to indicate that insufficient data was available. In other embodiments, indications are used to highlight or otherwise indicate trend events.

As used herein, trend events generally include any data point, data range, trend result, etc. that is identified as being potentially of interest. For example, as discussed above, various types of trend analysis data 280 and/or correlation data 270 may be used to identify correlations and other trend events. Trend events may be indicated in any useful way. For example, as illustrated in FIG. 4, a trend event indicator 420 is shown on the graph in the graph zone 408. The trend event indicator 420 is illustrated as a circle around the portion of the graph showing negative growth for the hotel industry. Of course, any type of indicator may be used, for example, including a color, shading, typeface, font, flags, highlighting, text, icons, etc.

While not indicated, other reporting and display techniques may be used to enhance the look, feel, usefulness, etc. of the report output 450. In one embodiment, the report output 450 is configured to be displayed through a web browser or similar interface using a report user device 175. A user may interact with the report output 450 using menus, buttons, links, and/or other navigation elements. The navigation may allow the user, for example, to jump between sections of the report output 450, to show or hide elements (e.g., the second explanation zone 406*b*), to dynamically process (e.g., filter, sort, etc.) charted data, to reformat the page layout, etc.

Figure 5:
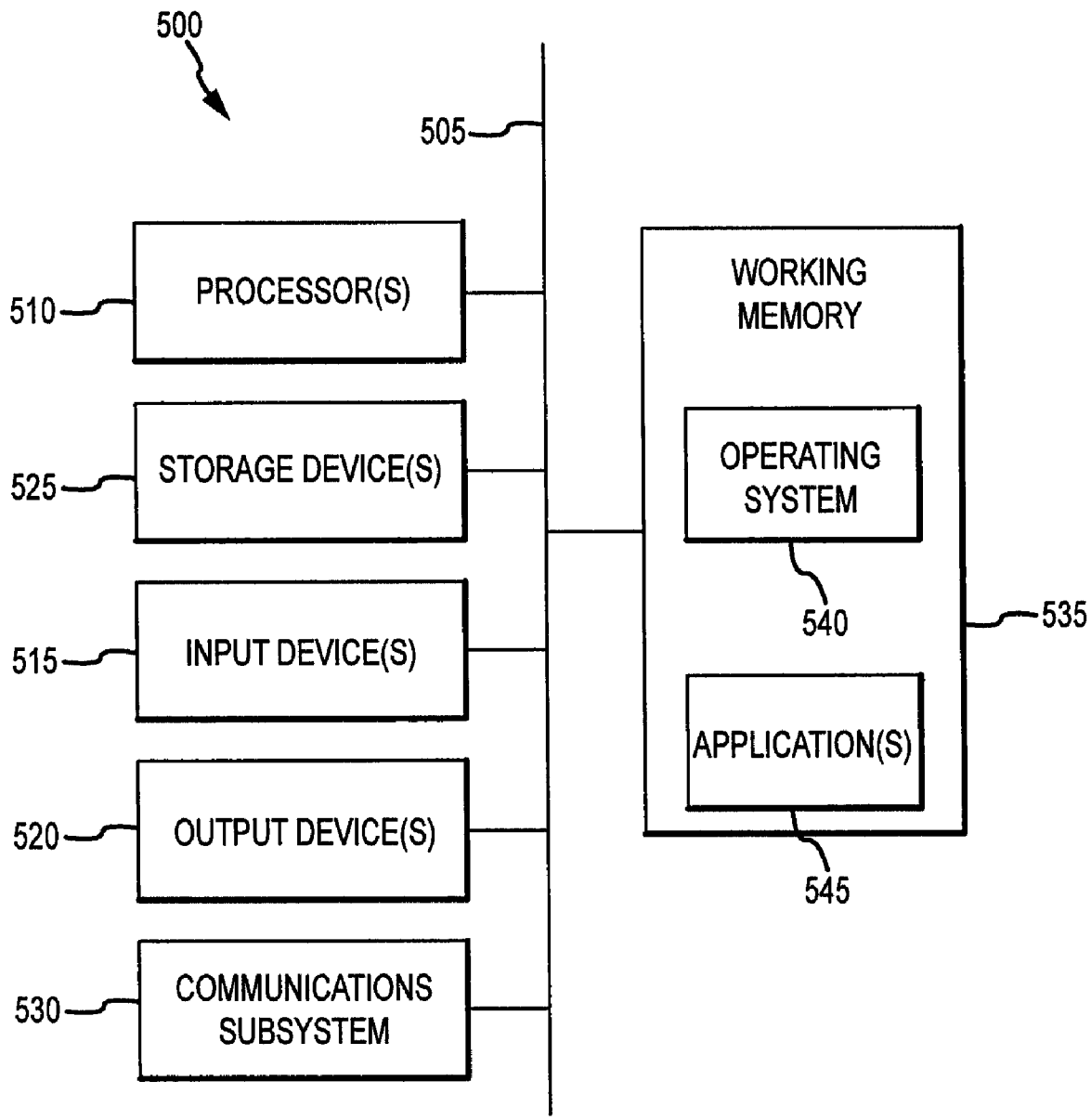
FIG. 5 shows an illustrative computational system for performing functionality to facilitate implementation of embodiments described herein.

As discussed above, the various subsystems of the service provider 105 may be implemented in hardware and/or software. In some embodiments, one or more computational systems are used, having instructions stored in memory that can be executed to cause processors and/or other components to perform certain methods (e.g., by implementing functionality of one or more of the subsystems). FIG. 5 shows an illustrative computational system 500 for performing functionality to facilitate implementation of embodiments described herein. For example, components of the computational system 500 may be used to implement functionality of one or more subsystems of the service provider 105. It should be noted that FIG. 4 is meant only to provide a generalized illustration of various components, any or all of which may be utilized as appropriate. FIG. 5, therefore, broadly illustrates how individual system elements may be implemented in a relatively separated or relatively more integrated manner.

The computational system 500 is shown to include hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computational system 500 may further include (and/or be in communication with) one or more storage devices 525, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 500 might also include a communications subsystem 530, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 530 may permit data to be exchanged with a network (such as the network described below, to name one example), and/or any other devices described herein. In many embodiments, the computational system 500 will further include a working memory 535, which can include a RAM or ROM device, as described above.

The computational system 500 also can include software elements, shown as being currently located within the working memory 535, including an operating system 540 and/or other code, such as one or more application programs 545, which may include computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 525 described above.

In some cases, the storage medium might be incorporated within the computational system 500 or in communication with the computational system 500. In other embodiments, the storage medium might be separate from a computational system 500 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 500 and/or might take the form of source and/or installable code, which, upon compilation and/or installation on the computational system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs the computational system 500 to perform methods of the invention. According to a set of embodiments, some or all of the procedures of such methods are performed by the computational system 500 in response to processor 510 executing one or more sequences of one or more instructions (which might be incorporated into the operating system 540 and/or other code, such as an application program 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer readable medium", as used herein, refer to any medium that participates in providing data that causes a machine to operate in a specific fashion. In an embodiment implemented using the computational system 500, various machine-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 525. Volatile media includes, without limitation, dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 500. The communications subsystem 530 (and/or components thereof) generally will receive the signals, and the bus 505 then might carry the signals (and/or the data, instructions, etc., carried by the signals) to the working memory 535, from which the processor(s) 505 retrieves and executes the instructions. The instructions received by the working memory 535 may optionally be stored on a storage device 525 either before or after execution by the processor(s) 510.

It will be appreciated that the systems described with reference to FIGS. 1-5, including the computational system 500 of FIG. 5, may be used to implement a number of methods. Some of these methods are discussed with reference to FIGS. 6-9. For the sake of clarity, embodiments of the methods may be discussed with reference to the illustrative system components of FIGS. 1-5. It will be appreciated that these descriptions should not be construed as limiting the scope of the methods or of the components described with reference to the methods.

Figure 6:
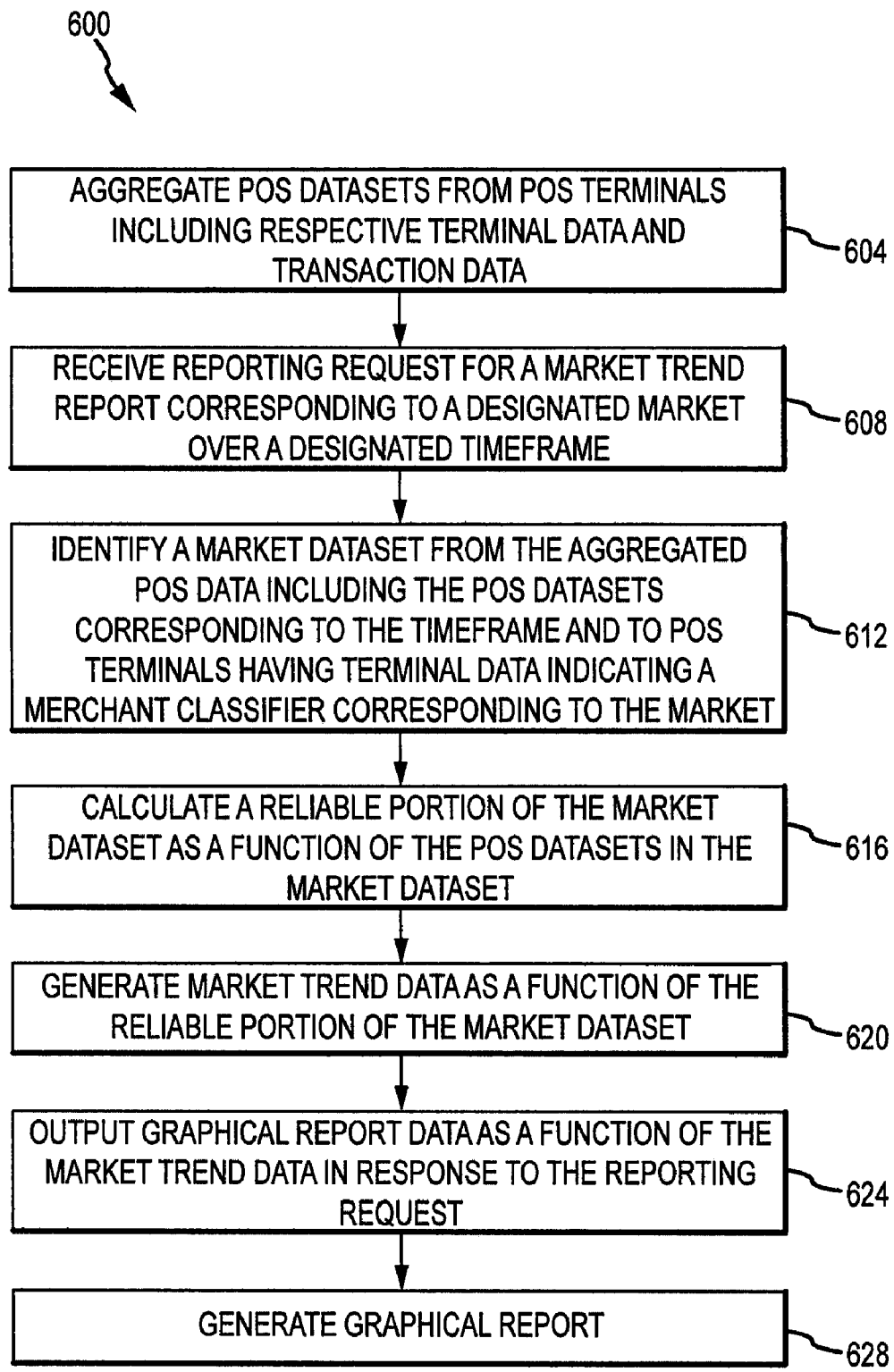
FIG. 6 shows a flow diagram illustrating a method for generating a graphical report, according to various embodiments.

FIG. 6 shows a flow diagram illustrating a method 600 for generating a graphical report, according to various embodiments. The method 600 begins at block 604 by aggregating POS datasets from POS terminals. For example, the aggregation subsystem 140 of the service provider 105 may be used to generate aggregated POS data 240 from a number of POS terminals 120. The aggregated POS data 240 may include transaction data 210, terminal data 220, and/or authorization data 230.

In some embodiments, at block 608, a request is received for a market trend report. The requested market trend report may correspond to a designated timeframe, a designated market, and/or any other designations. For example, the requested report may designate the hotels market over the past twelve months. Alternately, the requested report may designate all markets for the northwest region of the United States over the past sixty days. In various embodiments, the request may originate from a user using a report user device 175 via an interface subsystem 170, via a computer-generated request for updating a website or generating a periodic mailing, etc.

At block 612, a market dataset may be identified or generated from the aggregated POS data 240, for example, according to the request received in block 608. In some embodiments, market data 250 is generated from the aggregated POS data 240 including the POS datasets 245 corresponding to the designated timeframe(s) and to POS terminals 120 having terminal data 220 indicating a merchant classifier corresponding to the designated market(s).

As discussed above, it may be desirable to use only a reliable portion of the market dataset identified or generated in block 612. For example, POS datasets 245 from POS terminals 120 having transaction data 210 for only a portion of the timeframe may be ignored or treated differently (e.g., displayed with special indications and not used in calculating certain trends). At block 616, a reliable portion of the market dataset may be calculated as a function of the POS datasets in the market dataset. For example, only same store data, only data having a statistically insignificant variability from a baseline, etc. may be included in the reliable portion.

At block 620, market trend data may be generated as a function of the reliable portion of the market dataset. In some embodiments, additional data is generated and/or collected, such as correlation data 270, trend analysis data 280, template data 290, etc. Graphical report data may then be generated and output at block 624 as a function of the market trend data (e.g., in response to the reporting request received in block 608). In some embodiments, the graphical report data is used to generate a graphical report at block 628.

It will be appreciated that various modifications may be made to the method 600 without departing from the scope of embodiments. Also, various embodiments of sub-processes may be used to implement certain process blocks of the method 600. Embodiments of some of these sub-processes are described with reference to FIGS. 7-9.

Figure 7A:
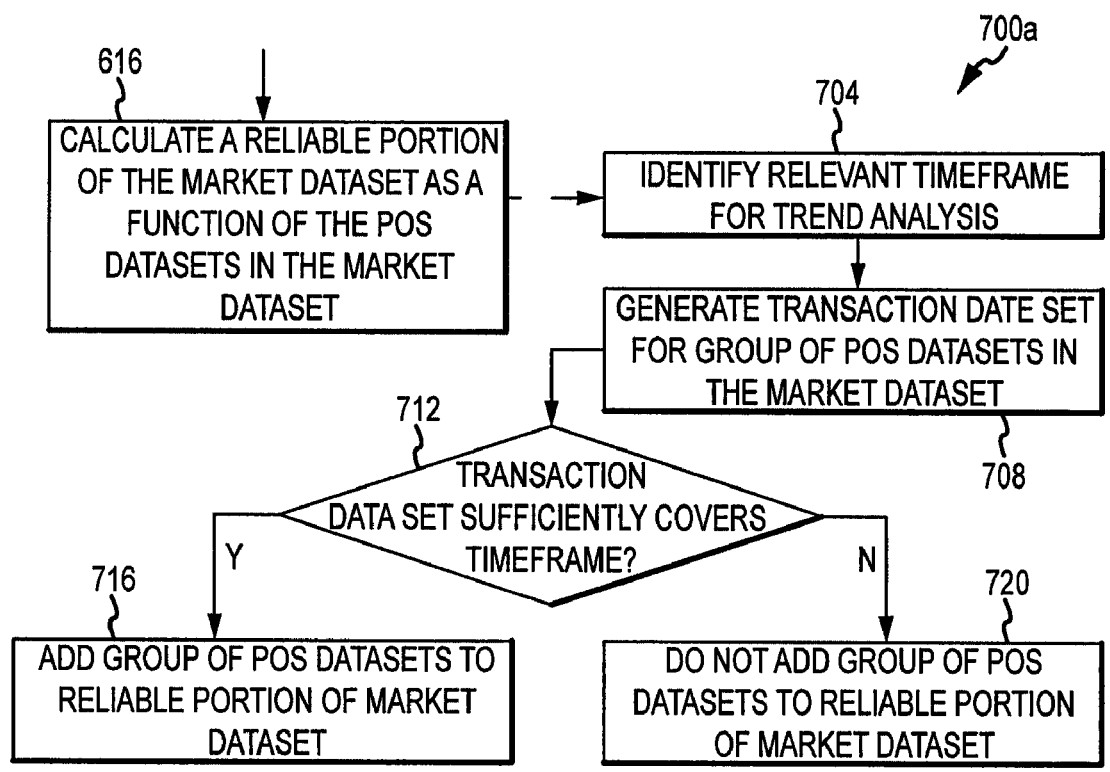
FIGS. 7A and 7B show flow diagrams of two illustrative methods for calculating a reliable portion of the market dataset, according to various embodiments.
Figure 7B:
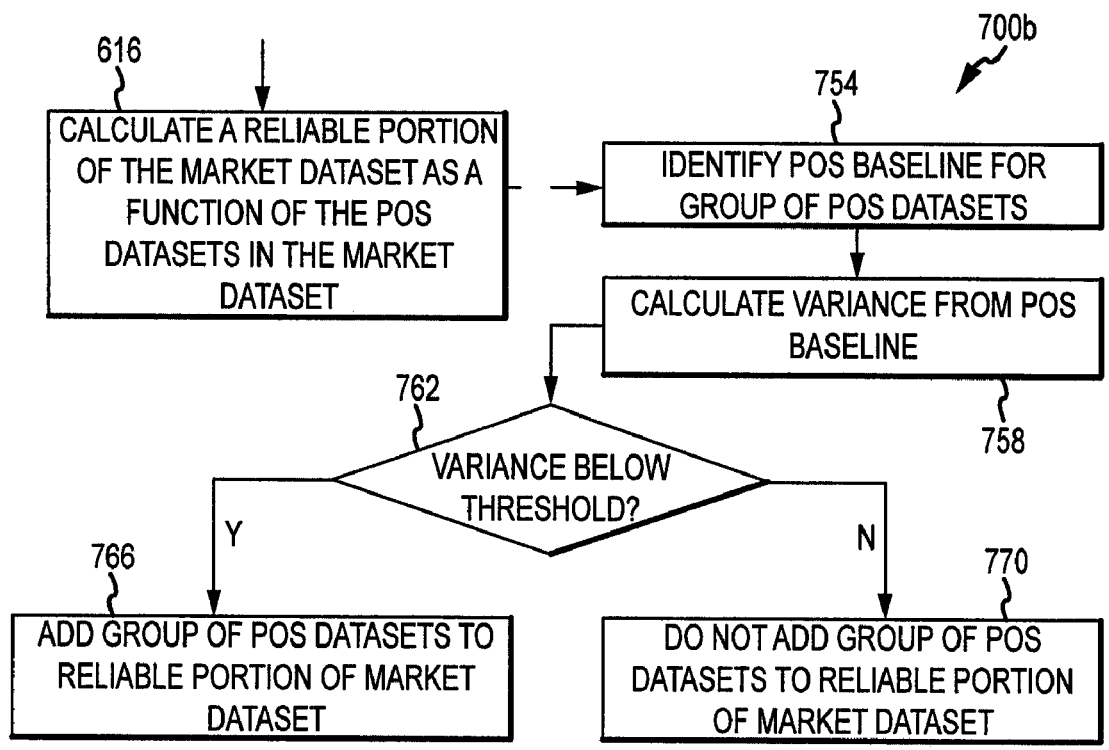

FIGS. 7A and 7B show flow diagrams of two illustrative methods 700 for calculating a reliable portion of the market dataset, according to various embodiments. Embodiments of the method 700a of FIG. 7A begin, as one embodiment of block 616 of the method 600 of FIG. 6, at block 704 by identifying a relevant timeframe for analysis. At block 708, the market data 250 (e.g., or POS datasets 245 that are used as part of the market data 250) are evaluated to determine a transaction date set. The transaction date set indicates the set of transaction dates (e.g., a date range, transactions per date, etc.) covered by the transactions included in the market data 250.

At block 712, a determination may be made as to whether the transaction date set sufficiently covers the timeframe of interest. In one embodiment, the transaction date set is evaluated only to see if data is available from the beginning and the end of the time frame. In other embodiments, techniques are used to determine if enough transaction data 210 is available for all or part of the timeframe. For example, it may be desirable to only treat the data as reliable when a certain average transaction density is seen across the entire timeframe.

If it is determined at block 712 that the transaction date set sufficiently covers the timeframe of interest, the corresponding POS datasets 245 (e.g., or data derived from the respective POS datasets 245) may be added to (e.g., or may not be removed from) the reliable portion of the market data 250 at block 716. If it is determined at block 712 that the transaction date set does not sufficiently cover the timeframe of interest, the corresponding POS datasets 245 (e.g., or data derived from the respective POS datasets 245) may not be added to (e.g., or may be removed from) the reliable portion of the market data 250 at block 720.

Embodiments of the method 700b of FIG. 7B begin, as another embodiment of block 616 of the method 600 of FIG. 6, at block 754 by identifying a POS baseline for a group of POS datasets 245. For example, if certain POS terminals 120 were used in certain merchant outlets 115 in Jan. 2009, data from those POS terminals 120 may be used as the baseline for a same store report for Jan. 2010. At block 758, a statistical variation (e.g., an amount of variation) may be calculated between the POS baseline and the market data 250. For example, it may be determined that a certain amount of change is allowed from the baseline without considering the new data unreliable.

At block 762, a determination may be made as to whether the amount of variation is below a certain allowable threshold. If it is determined at block 762 that the amount of variation is below the threshold, the corresponding POS datasets 245 (e.g., or data derived from the respective POS datasets 245) may be added to (e.g., or may not be removed from) the reliable portion of the market data 250 at block 766. If it is determined at block 762 that the amount of variation is below the threshold, the corresponding POS datasets 245 (e.g., or data derived from the respective POS datasets 245) may not be added to (e.g., or may be removed from) the reliable portion of the market data 250 at block 770.

Figure 8:
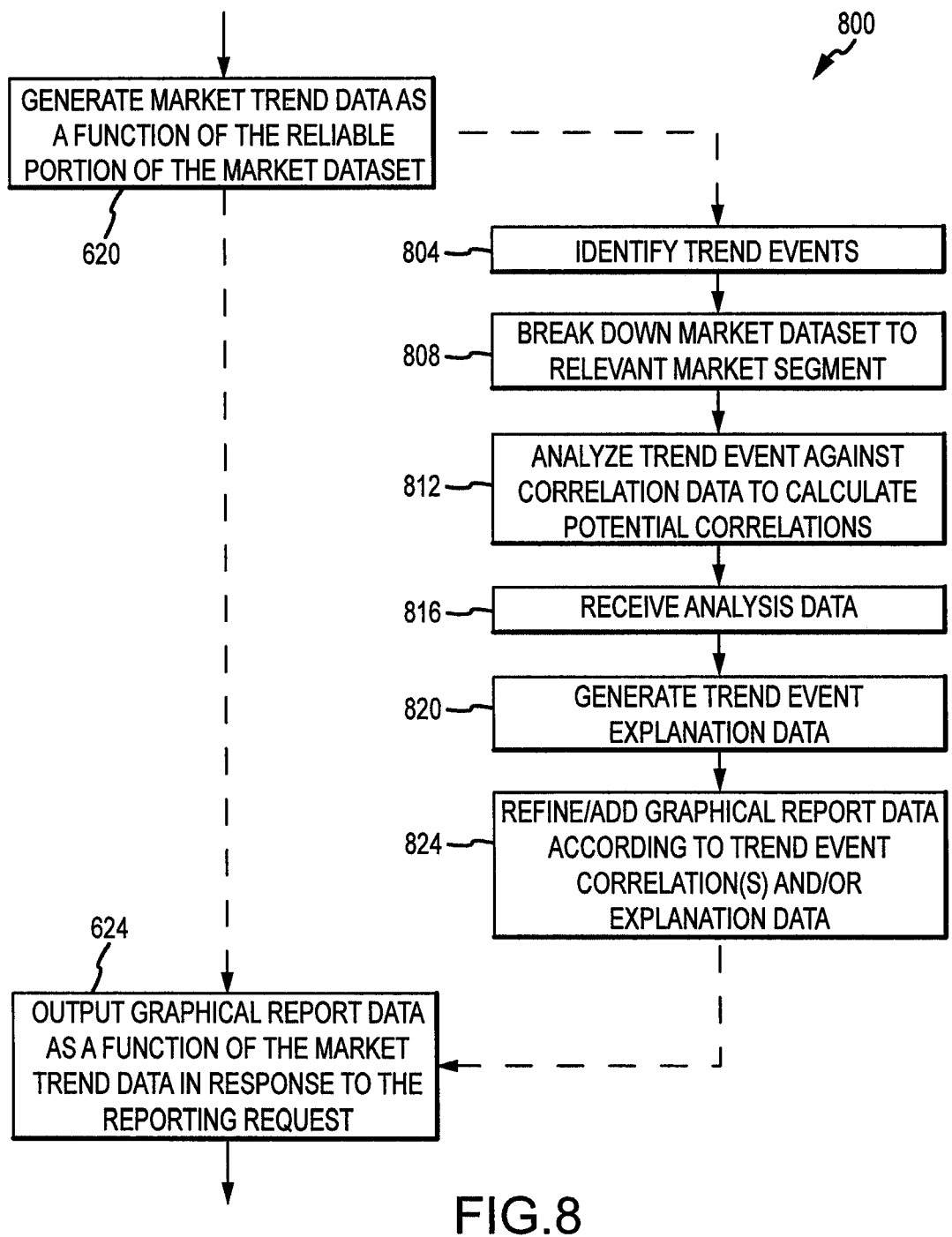
FIG. 8 shows a flow diagram of an illustrative method for generating market trend data, according to various embodiments.

Once the reliable portion of the market data 250 has been generated (e.g., by one of the methods 700 of FIG. 7A or 7B, or by some other method), it may be desirable to generate market trend data accordingly. FIG. 8 shows a flow diagram of an illustrative method 800 for generating market trend data (e.g., report data 260), according to various embodiments. Embodiments of the method 800 begin at block 804, as one embodiment of block 620 of the method 600 of FIG. 6, by identifying one or more trend events, as described above.

At block 808, the one or more trend events may be analyzed according to relevant market data 250 (or relevant data from the reliable portion of the market data 250). In one embodiment, the market data 250 is broken down by market segment for a relevant timeframe. For example, the reliable portion of the market data 250 may be filtered such that only merchants in the gasoline classification are analyzed. In certain embodiments, breaking down the market data 250 may include identifying relevant trend events from block 804 and their corresponding market data 250 from block 808.

The trend events identified in block 804 may then be analyzed against correlation data 270 (e.g., and/or any other useful types of data) in block 812 to calculate (e.g., and/or otherwise identify) potential correlations. For example, a statistically significant correlation may be found between a rise in same store average ticket value for merchants in a region and a rise in median home prices for the same region. In some embodiments, other data, like trend analysis data 280, may be received at block 816. The correlation data 270, trend analysis data 280, identified trend events, identified correlations, etc. may be used in block 820 to generate trend explanations. For example, the trend explanations may include auto-generated text, text supplied by analysts 165, etc.

It is worth noting that trend explanations may include a market driver analysis. For example, after identifying a trend event in block 804, a human or machine-implemented analyst may determine whether the trend event is legitimate (e.g., not simply evidence of an anomaly, mismatch, mathematical error, data error, etc.). The breakdown of the data in block 808 may include breaking down the data by market and then by merchant to determine what contributory effect each merchant may have on a trend or a particular trend event. The contributory effect of the particular merchant may be used to help explain trends, trend events, etc.

For example, suppose fast food sales show a small decline in March. A market driver analysis shows that a fast food chain called Burger Hut had a statistically large contributory impact on the trend event. Correlation data 270 indicates that Burger Hut was involved in a meat scare during a week in March, and aggregated POS data 240 supports a precipitous drop in sales for that week across Burger Hut merchant outlets 115. The data may justify a trend explanation stating that the small decline for the industry should be ignored, as the major contributing factor was a single meat scare for a single merchant, which has since been resolved.

Some or all of the data used in and generated by block 820 may then be used to affect graphical report data 260 in block 824. For example, the graphical report data 260 may be updated, refined, supplemented, etc. according to the trend event correlations, trend explanations, etc. The graphical report data 260 may then be output, for example, according to block 624 of the method 600 of FIG. 6.

Figure 9:
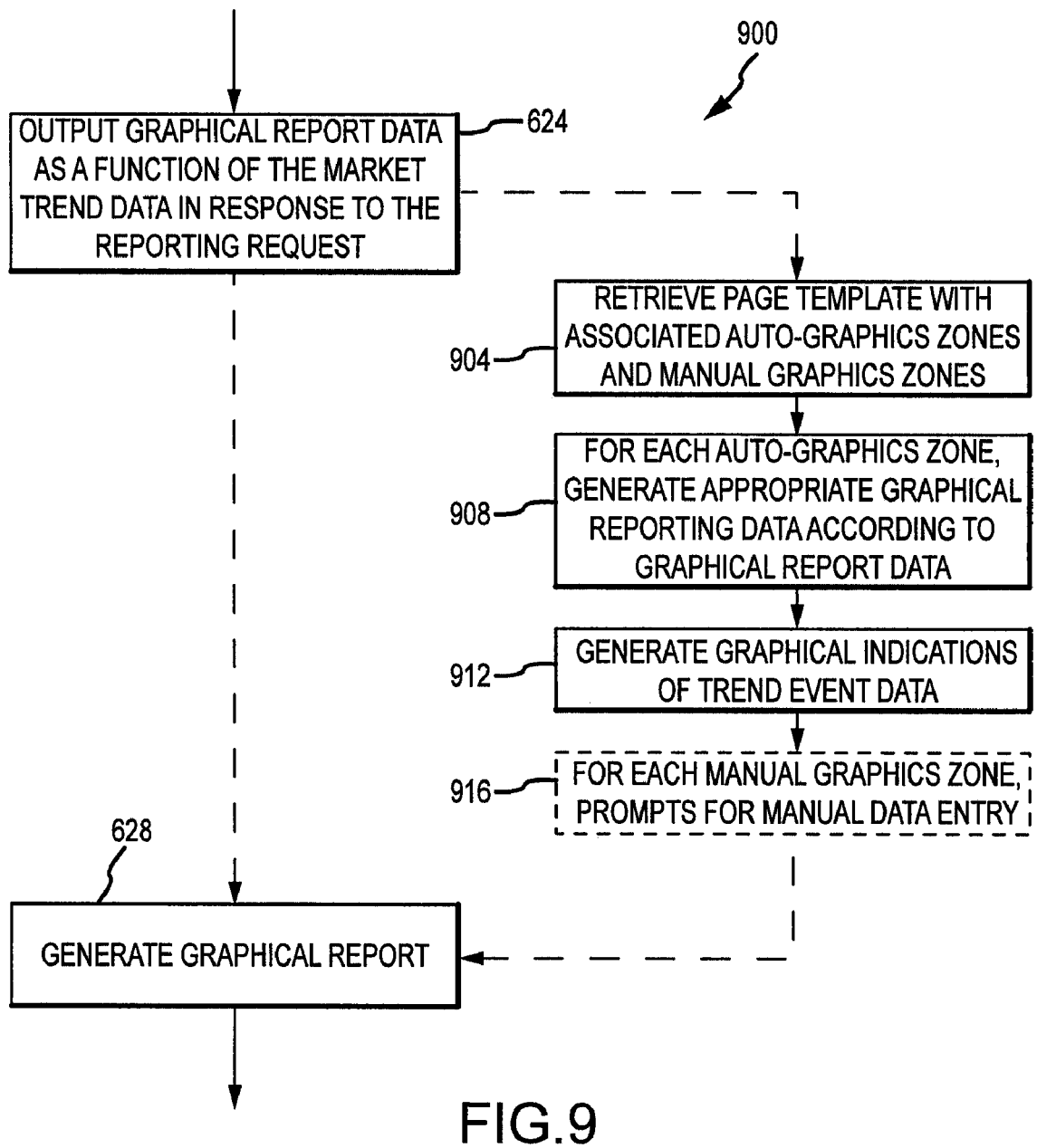
FIG. 9 shows a flow diagram of an illustrative method for outputting graphical report data, according to various embodiments.

In various embodiments, the graphical report data 260 is output according to the method 900 shown in FIG. 9. Embodiments of the method 900 begin at block 904, as one embodiment of block 624 of the method 600 of FIG. 6, by retrieving template data 290, as described above. In some embodiments, the template data 290 includes various types of zones. For example, auto-graphics zones may be used to automatically place (e.g., format, position, generate, etc.) content (e.g., text, graphics, embedded objects, etc.). Manual graphics zones may be used for manual placement of content. For example, manual placement zones may include prompts for manual input, spaces left for entry of text by analysts 165, etc. Of course, other types of zones and elements of a template are possible. For example, some templates may allow content to be manually added to auto-graphics zones, etc.

At block 908, appropriate graphical reporting data may be generated for each auto-graphics zone according to graphical report data. Graphical indications of trend event data (e.g., highlighting, icons, coloration, circles, etc.) may then be generated and/or placed at block 912. In some embodiments, at block 916, the method 900 may prompt a reporter (e.g., an analyst, etc.) for manual data entry into some or all of the manual graphics zones, where appropriate. As discussed above, in some embodiments, the graphical report data 260 may then be used to generate a graphical report, for example, according to block 628 of the method 600 of FIG. 6. For example, the report may be generated as a webpage, as a PDF document for communication over newswires, as an email, as a paper mailing, etc.

It will be appreciated that many different types of market data 250, report data 260, report outputs 400, etc. can be generated using embodiments, such as those described above. For added clarity, FIGS. 10A-10D illustrate an example of an illustrative data flow according to one embodiment. Beginning with FIG. 10A, an illustrative portion of transaction data 210 is shown.

The transaction data 210 is illustrated as a portion of a spreadsheet 1000 that includes some of the data for four merchant outlets 115 (e.g., which may correspond to four or more POS terminals 120). In particular, the data shows a Dallas-based outlet of a gas station retailer, a Boston-based outlet of a gas station retailer, a Denver-based outlet of a general merchandise retailer, and an Atlanta-based outlet of a general merchandise retailer. For each merchant outlet 115, a list of transactions and their respective dollar values are shown over a two-day timeframe.

The gas station retailer data flow is shown to proceed via arrow 1005a, and the general merchandise retailer data flow is shown to proceed via arrow 1005b. For example, at the end of each day, the indicated transactions and their respective transaction data 210 may be cleared through the POS platforms 125, payment networks 130, etc. A periodic batch process may cause the transaction data 210 to be sent to the aggregation subsystem 140 of the service provider 105 (e.g., overnight each night).

Figure 10A:
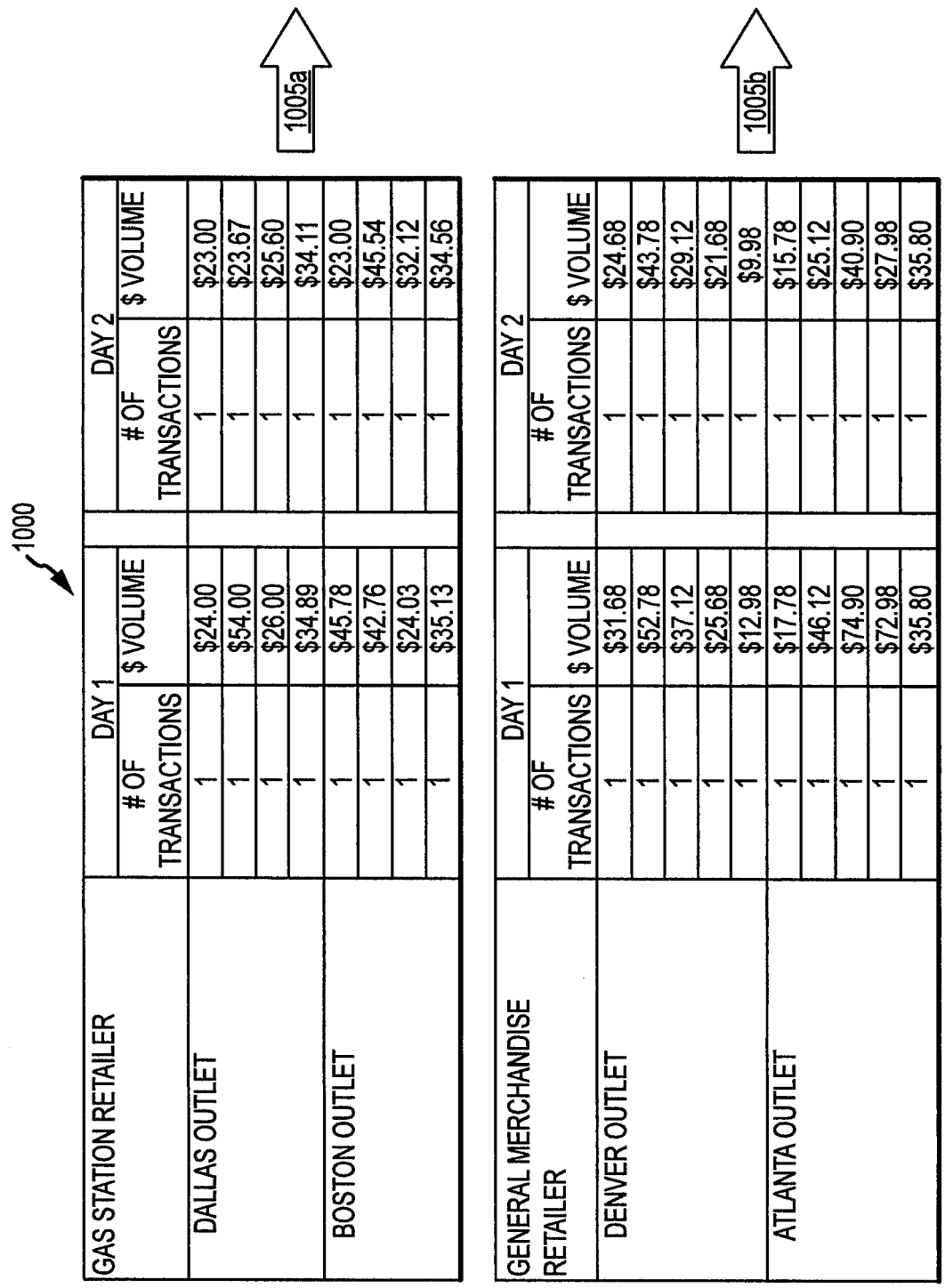

Turning to FIG. 10B, a spreadsheet 1010 is shown illustrating aggregated POS data 240 corresponding to the transaction data 210 in FIG. 10A, according to one embodiment. As described above, aggregation of the data by the aggregation subsystem 140 may include collecting the data and/or performing additional related processing. As illustrated, the transaction data 210 may be summed nightly (e.g., then monthly, by timeframe, etc., if desired). For example, the Dallas-based gas station retailer's POS terminal(s) 120 cleared four transactions totaling $138.89 on the first day of the timeframe.

Figure 10C:
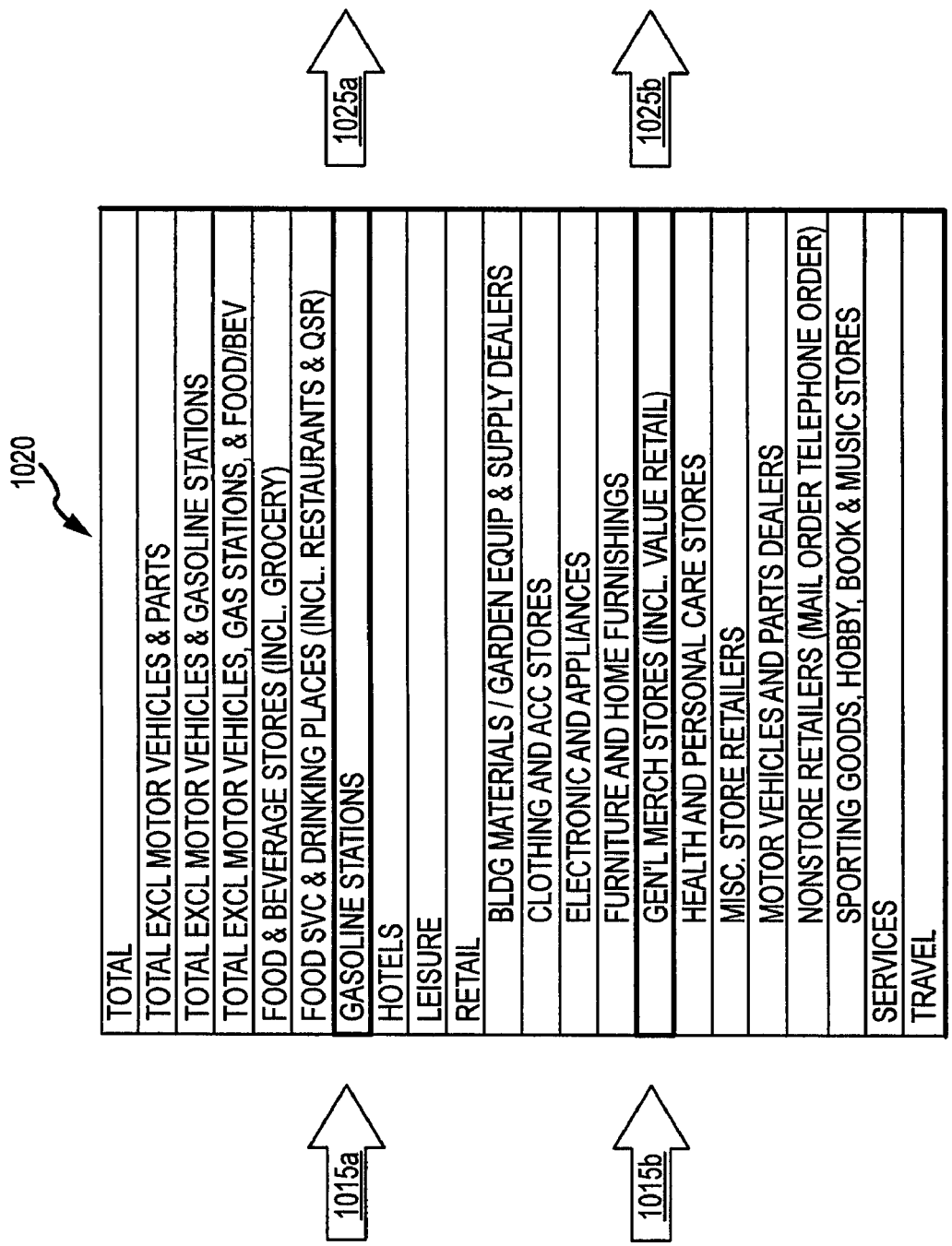

The aggregated gas station retailer data flow is shown to proceed via arrow 1015a, and the aggregated general merchandise retailer data flow is shown to proceed via arrow 1015b. The aggregated data may then be used (e.g., by the processing subsystem 150) to generate market data 250. For example, FIG. 10C shows a portion of market data 250 extracted from the aggregated data of FIG. 10B, according to one embodiment.

For example, the processing subsystem 150 may compile and analyze same store sales data, as described above, to generate relevant market data 250. The market data 250 may then include data for supporting summaries, trend generation and analysis, etc. for all the POS data (e.g., transaction data 210 and terminal data 220) by a variety of metrics, including, for example, by industry, region, state, card type, merchant, etc. The market data 250 may further indicate growth rates from a current timeframe (e.g., month) compared to a corresponding timeframe (e.g., the same month in a prior year) for average ticket, sales, transactions, etc. for each of the metrics.

Figure 10D:
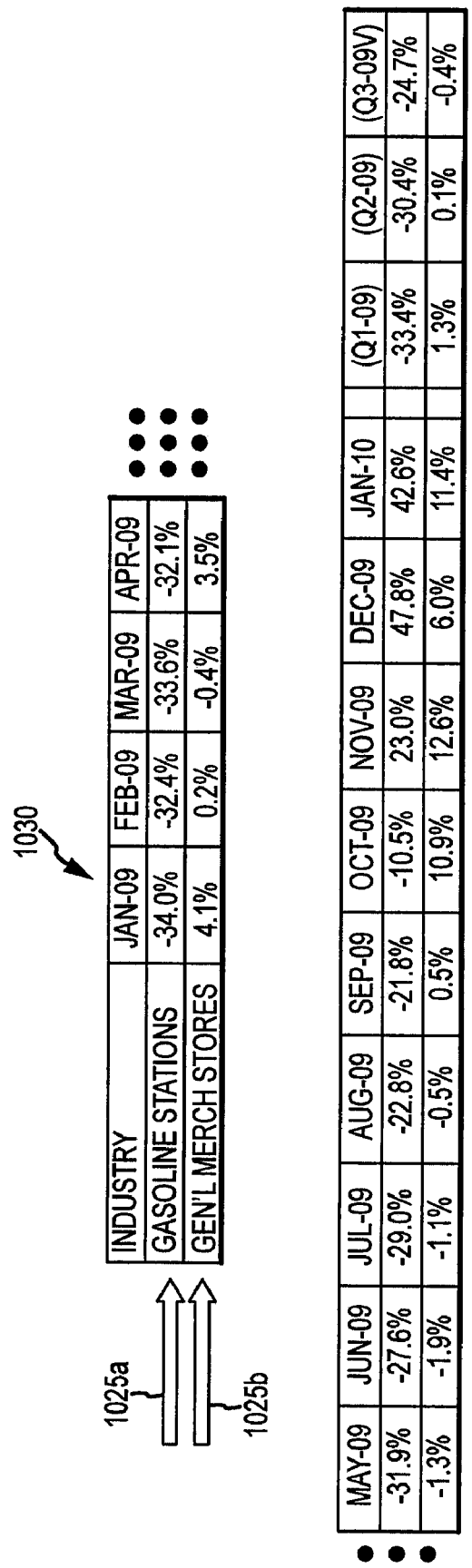

The entries for the gas station and general merchandise retailers are highlighted, and their data flows are shown to proceed according to arrows 1025. As described above, the market data 250 may be used to generate various types of report data 260. FIG. 10D shows a portion of report data 260 generated according to the market data 250 of FIG. 10C, according to one embodiment.

As illustrated, one row of the market data corresponds to the gasoline station industry, and another row corresponds to the general merchandise stores industry. Notably, the data was generated using data from only a few sample stores in the industries, and only from their actual POS terminal 120 outputs. According to the illustrative embodiment, the sales data for each of those industries, according to their respective POS terminal 120 sample sets and respective aggregated POS data 240, is compared between each month and the corresponding month from the prior year (e.g., the "Jan. 09" column indicates growth data comparing Jan. 2009 to Jan. 2008). A 13-month trending for sales is shown, with growth rates calculated as the difference between a current month value and a same month prior year value, divided by the difference between the same month prior year value. Examples of growth rates are below. Data may also be shown by quarter (as shown), with transactions and average ticket by region, state, industry, card type, etc., and/or in any other useful way.

The various market trend reports may be provided in a variety of ways. For example, the systems herein may be employed to physically print the reports and mail them to customers. Alternatively, the reports may be electronic in form and electronically transmitted to a client, such as by email. Another option is to provide a customer with the ability to log on to a website and then allow the customer to view the reports online. In some cases, options may be provided to permit the customer to tailor the market trend reports by varying certain criteria. Some example The various market trend reports that are electronically accessible via the Internet or similar portals of how this may be accomplished are set forth in the following description and figures. Further, the data used in generating such reports may be produced using any of the techniques described herein. Merely by way of example, the growth reports may be generated in terms of same store growth over a specified time period as previously described.

Figure 11:
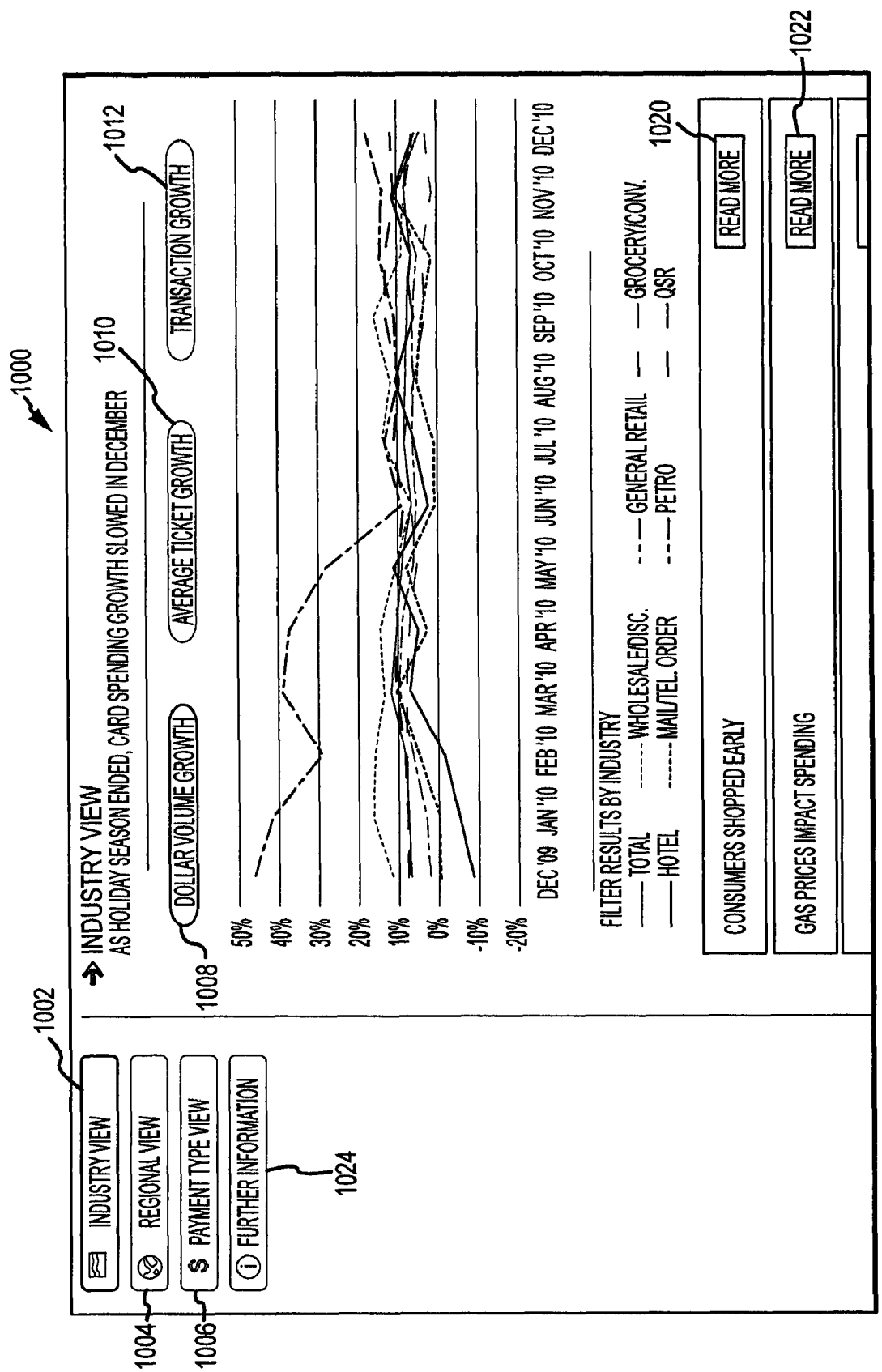
FIG. 11 illustrates a display screen showing the dollar volume growth of certain industries according to the invention.

Although not shown, when accessing the market trend reports through a web portal, the customer will typically be presented with a login screen where the customer must provide appropriate credentials in order to log in to the system and generate the reports. Once the customer has received access, a wide variety of reports may be generated. By way of example, FIG. 11 illustrates a display screen 1000 where market trend reports can be generated by industry, geography and payment type. Further, the market trend reports may illustrate dollar volume growth, average ticket growth or transaction growth. As previously described, these are typically cast in terms of same store growth as compared to a previous point in time, such as the previous year. To generate these reports, display screen 1000 includes a variety of buttons or icons that may be selected with a pointing device, such as mouse, to produce the report. For example, display screen 1000 includes an industry view button 1002, a regional view button 1004, and a payment type view button 1006. Also, a dollar volume growth button 1008 is provided along with an average ticket growth button 1010 and transaction growth button 1012. In FIG. 11, industry view button 1002 has been selected along with the dollar volume growth button 1008. Accordingly, a line graph is produced showing the dollar volume growth for certain months as a percentage relative to the same month of the previous year.

Figure 12:
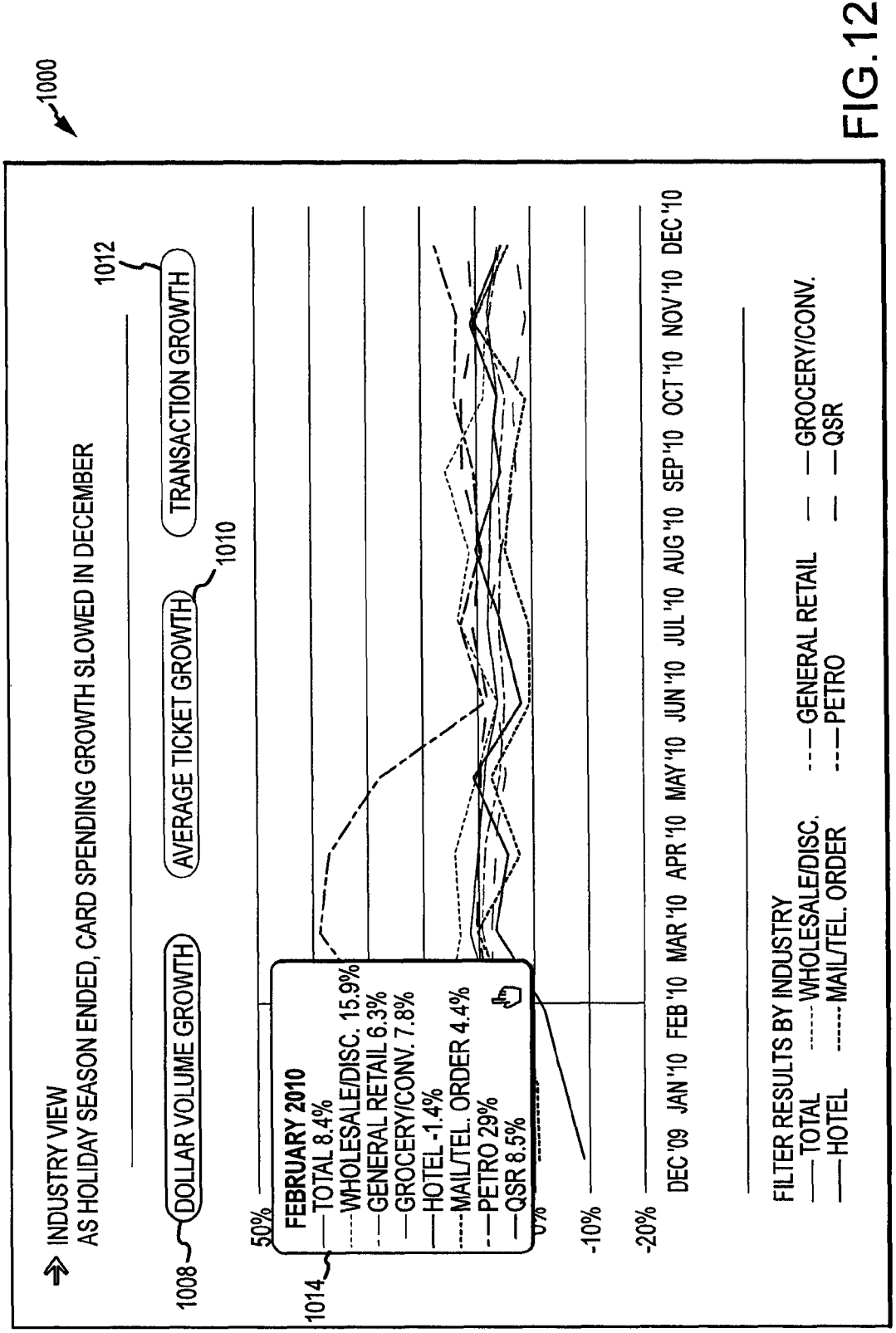
FIG. 12 illustrates the display screen of FIG. 11 with a superimposed snapshot of numeric growth percentages.

As illustrated in FIG. 12, a pointing device may be moved over the line graph to a particular month in order to superimpose a display 1014 which shows a snapshot of the percentages by industry for a given month. For example, as shown in FIG. 12, when the pointing device is moved over Feb. 2010, display 1014 illustrates the percentage growth for a total of all industries as well as the specific industries of wholesale/discount, general retail, grocery/convenience, hotel, mail/telephone order, petroleum, and QSR. The dollar volume growth percentages are for same store comparisons with Feb. 2009.

Figure 12A:
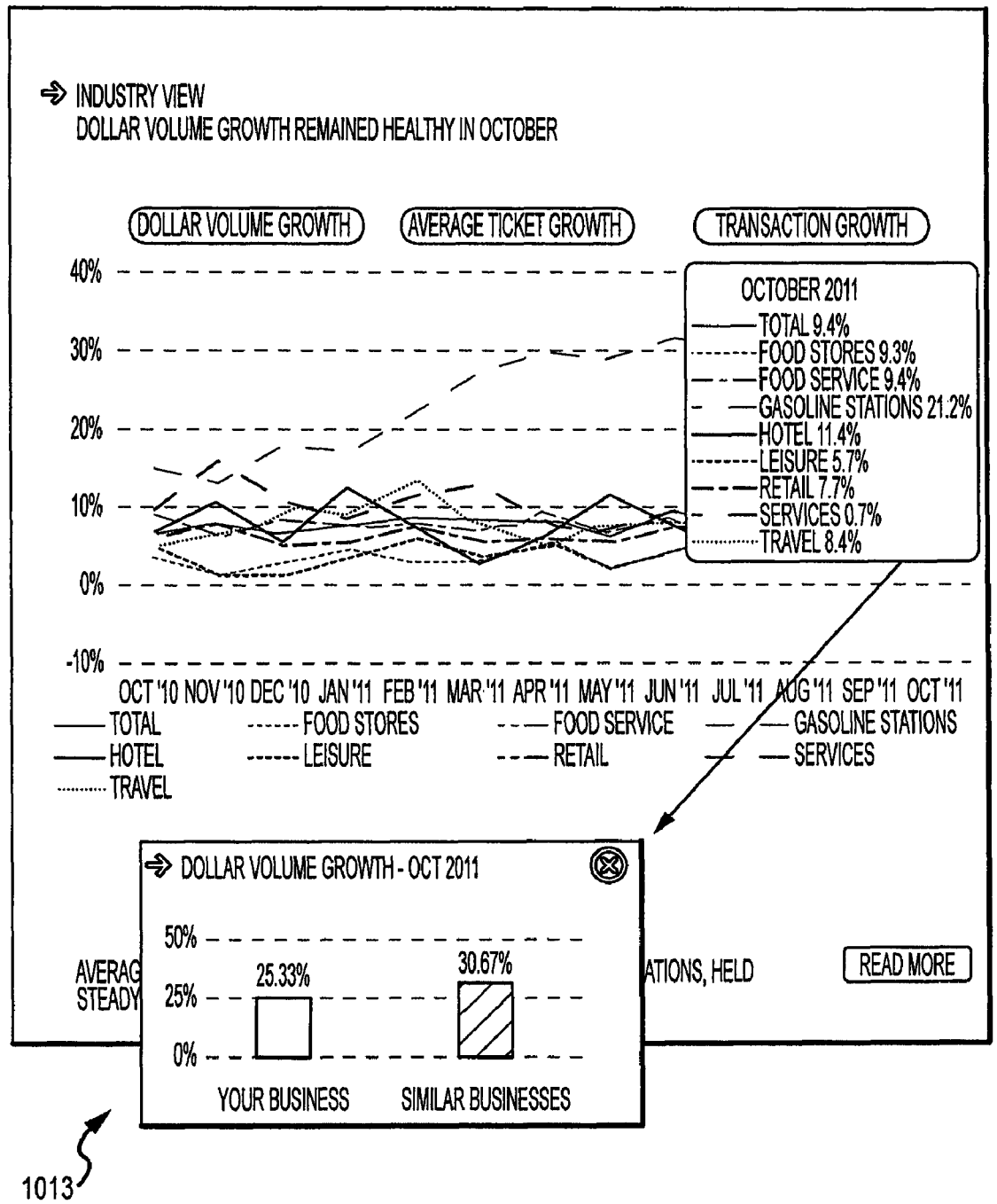
FIG. 12A illustrates a display screen showing dollar volume growth of certain industries, with a superimposed snapshot of numeric growth percentages, as well as dollar volume growth of a merchant compared to similar businesses of the merchant.

In some cases, the merchant may also be able to view a display showing a comparison of the merchant's business compared with those of similarly situated merchants, typically within a defined geographic region. These types of reports may be generated in a variety of ways, including by a web report after the merchant logs into a report web site, other electronic report, paper report, or the like. The comparisons may include categories such as year over year dollar volume growth, average ticket growth, average transaction growth, or any of the other variables described herein. One specific example of year over year dollar volume growth is shown in FIG. 12A. FIG. 12A illustrates a display 1011 that is similar to the display 1014 of FIG. 12. A window 1013 is superimposed and shows the dollar volume growth of the merchant's business for October 2011 as compared to the dollar volume growth of similar businesses. To produce display 1011, the host system will know the merchant's identifier (such as when the merchant logs into the system). By knowing the merchant, the merchant's data can be retrieved to provide a comparison between the merchant and the merchant's industry.

Figure 12B:
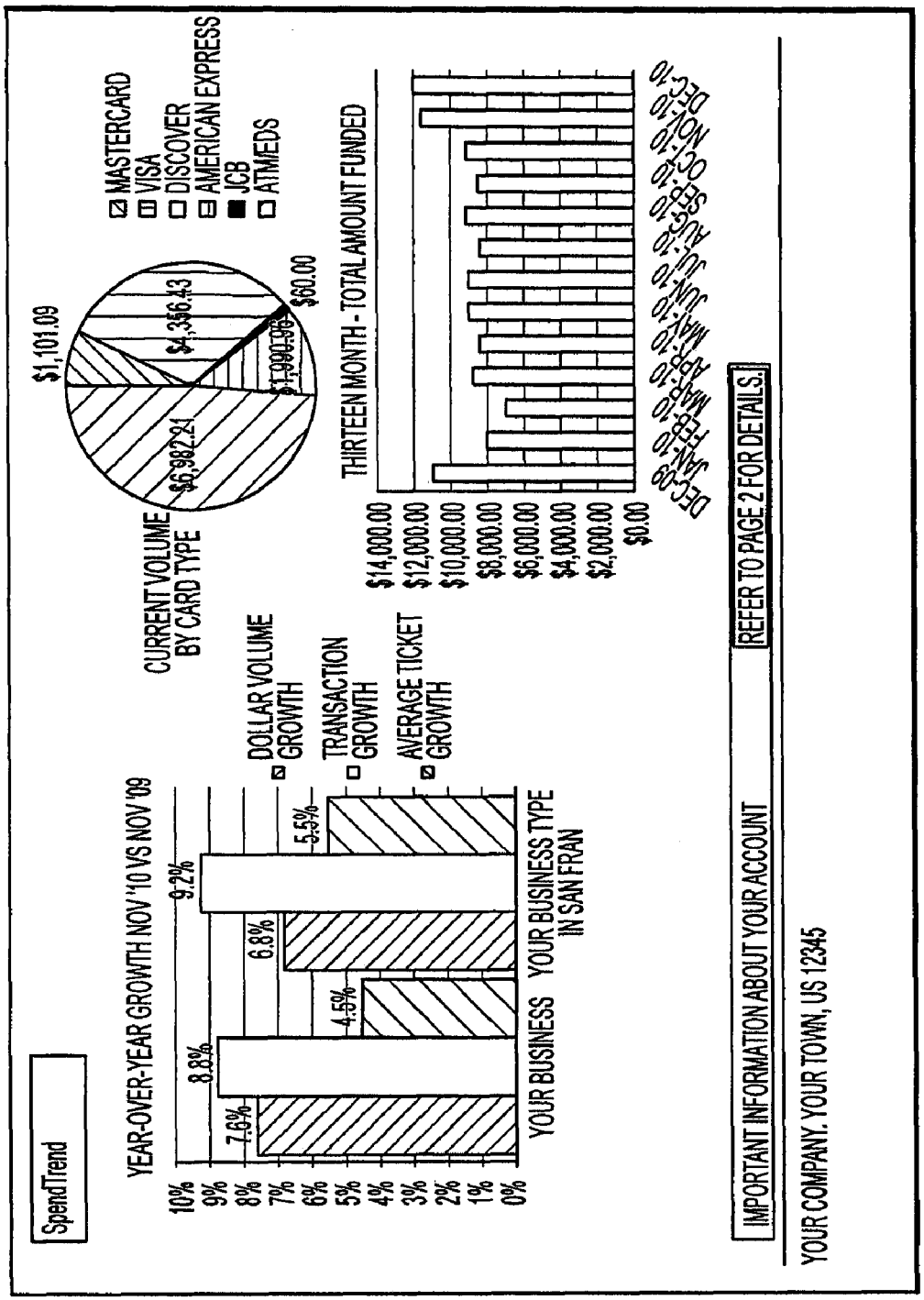
FIG. 12B illustrates a report showing year over year growth of a merchant's business as well as similar merchants within a geographic region.

A similar report may be produce and provided with the merchant's monthly report of card transactions, either in paper or electronically. For example, FIG. 12B illustrates a report 1015 showing a comparison between the year over year growth for the merchant as well as similarly situated businesses in the same city or other defined region. As report 1015 is part of the merchant's monthly statement from the processor, other data can be provided, such as transaction volume by card type, total amount funded to the merchant's bank, third party transactions, charge backs, adjustments, fees and the like. The growth comparison can also be defined by region, such as within the same zip code, city, state or group of states. Further, other categories, such as average ticket growth, average transaction volume, and the like (similar to other embodiments) may also be shown. This permits a merchant to see how the merchant's business is doing compared to similarly situation merchants. The report of FIG. 12B could be provided electronically, in paper form, or the like.

Figure 13:
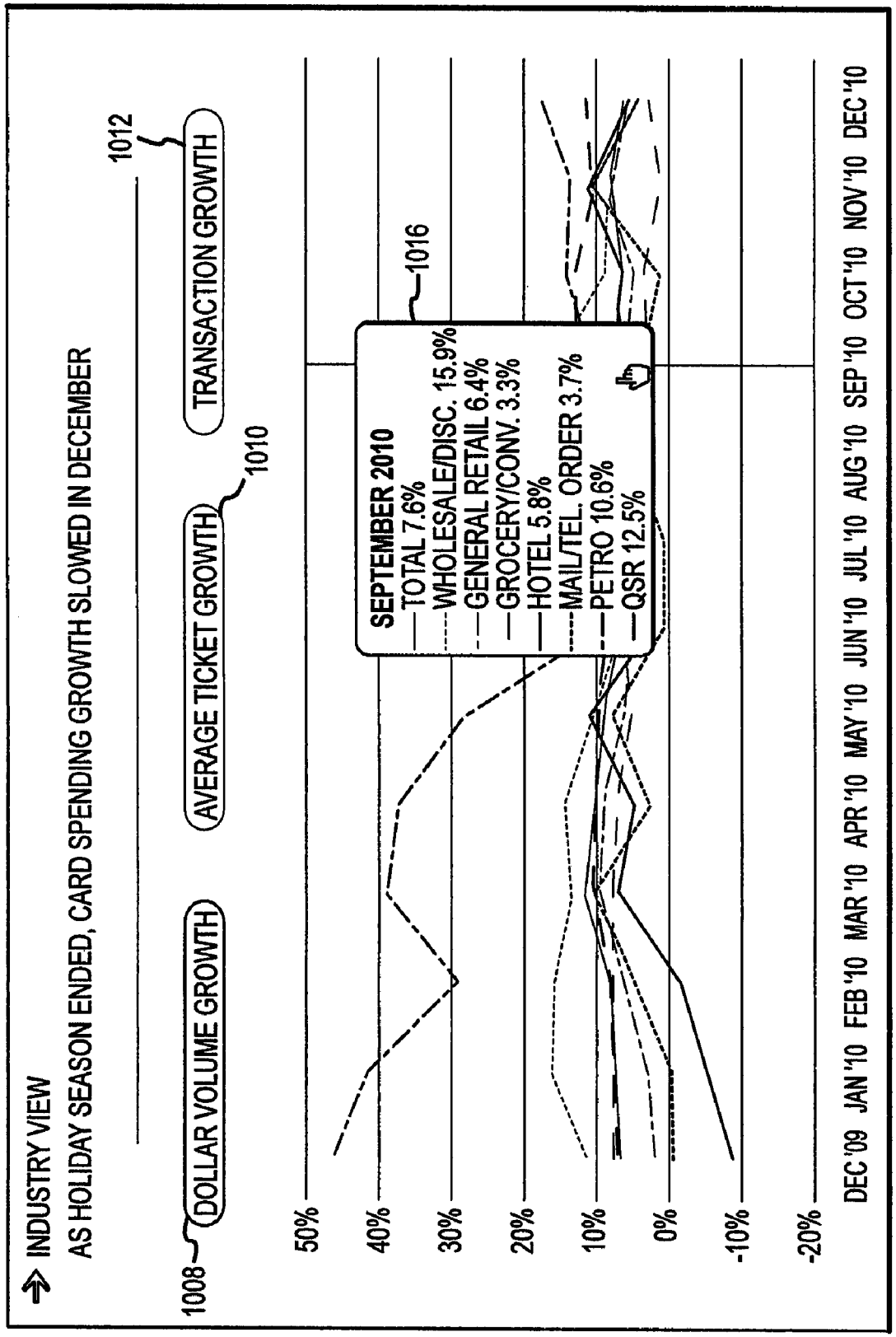
FIG. 13 illustrates the display screen of FIG. 11 showing another snapshot of certain growth percentages at another point in time.
Figure 14:
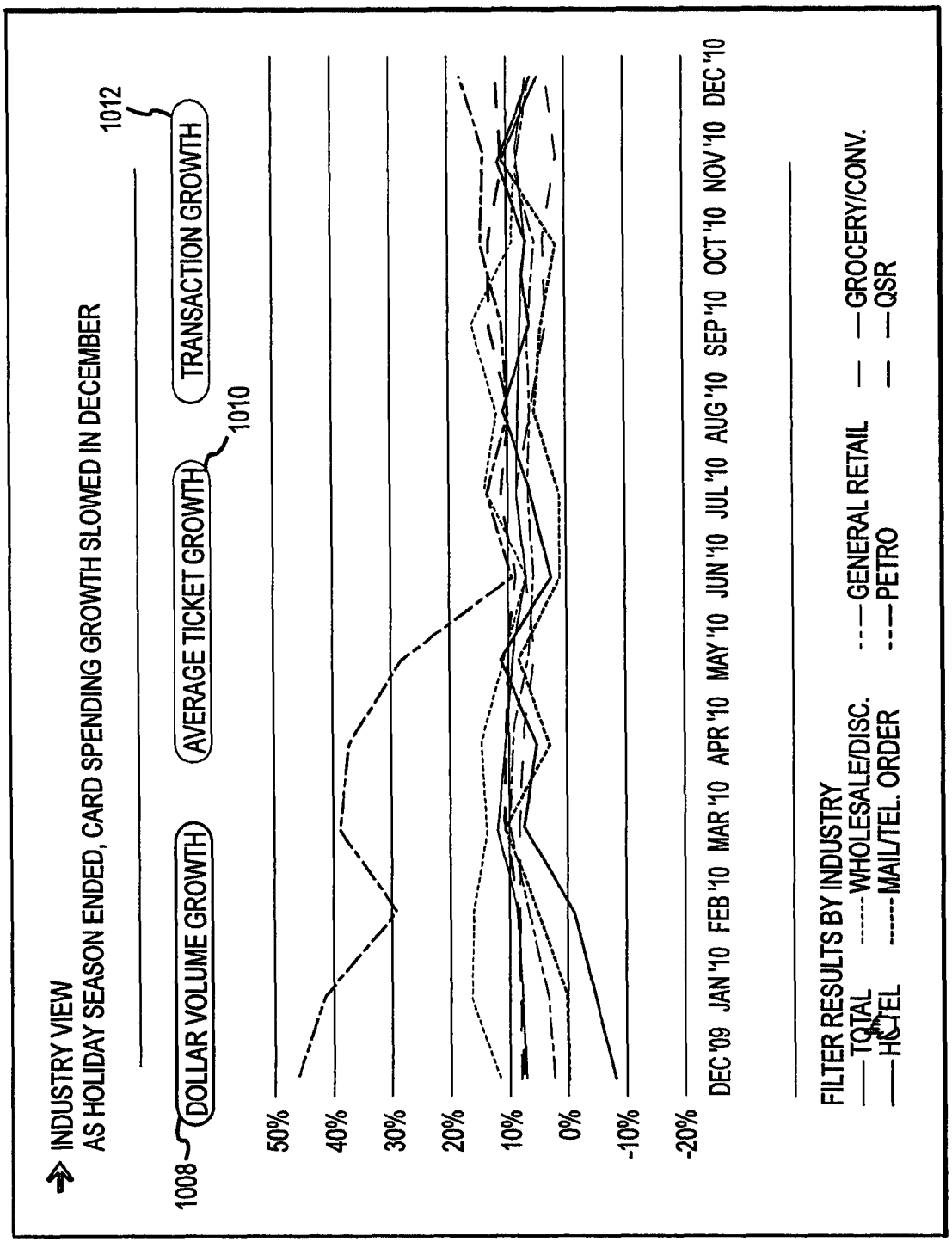
FIG. 14 illustrates the display screen of FIG. 11 with a "total" category being filtered from the display screen.

As shown in FIG. 13, the pointing device may be moved to another month, such as Sep. 2010, to produce another display 1016 showing dollar volume growth by industry for Sep. 2010. The bottom of display screen 1000 also includes a listing of the various industries and allows these industries to be filtered from the report by moving the pointing device over one of the industries and selecting that industry to remove it from the report. For example, FIG. 14 illustrates the resulting display when the total percentage has been filtered from the report. This process could be repeated for any of the industries so that as many or as few industries as is desired may be depicted on display screen 1000.

Figure 15:
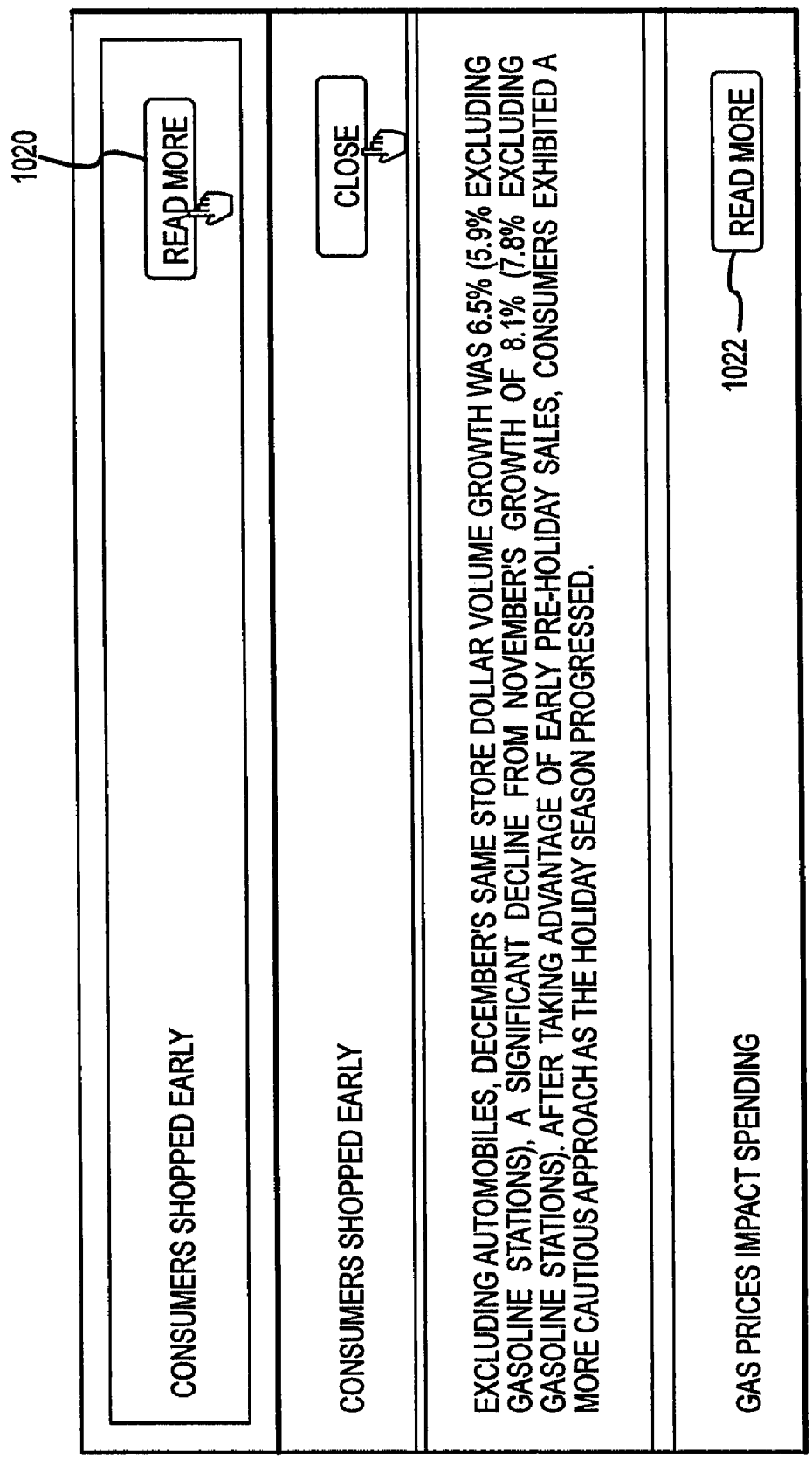
FIG. 15 illustrates the display screen of FIG. 11 when a "read more" icon is selected to provide additional information as to why customers shopped early.

Display screen 1000 of FIG. 11 also includes explanation buttons 1020 and 1022. These may be selected to produce additional information explaining the displayed data. For example, in FIG. 15 button 1020 has been selected to produce an explanation as to why customers may have shopped early. As shown, the Dec. same store dollar volume growth was less than November's growth. This reveals that customers may have taken advantage of early pre-holiday sales then taken a more cautious approach as the holiday season progressed. Display screen 1000 may also include a further information button 1024 which may be selected by a pointing device in order to produce further information explaining each of the reports.

Figure 16:
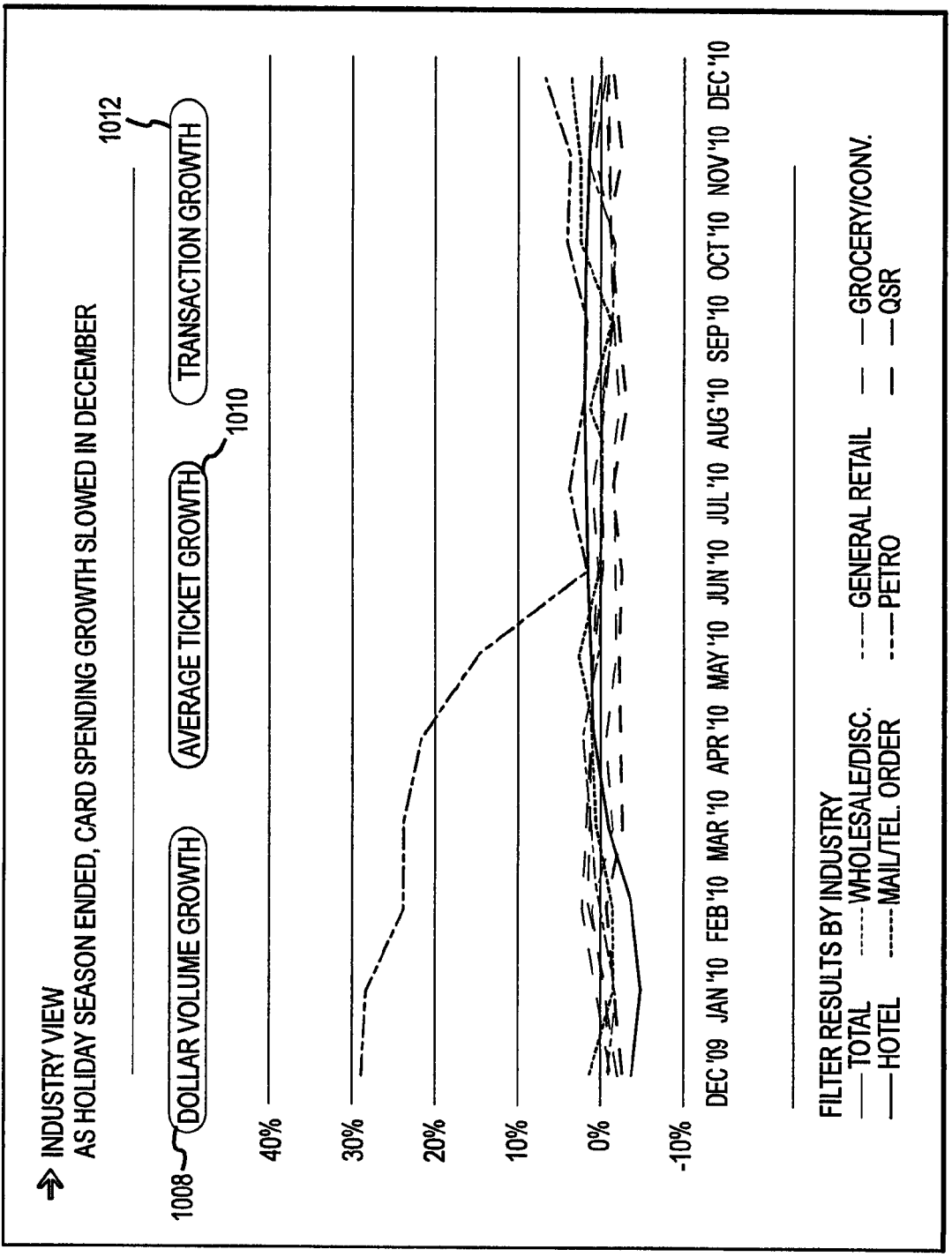
FIG. 16 illustrates a display screen of average ticket growth by industry according to the invention.
Figure 17:
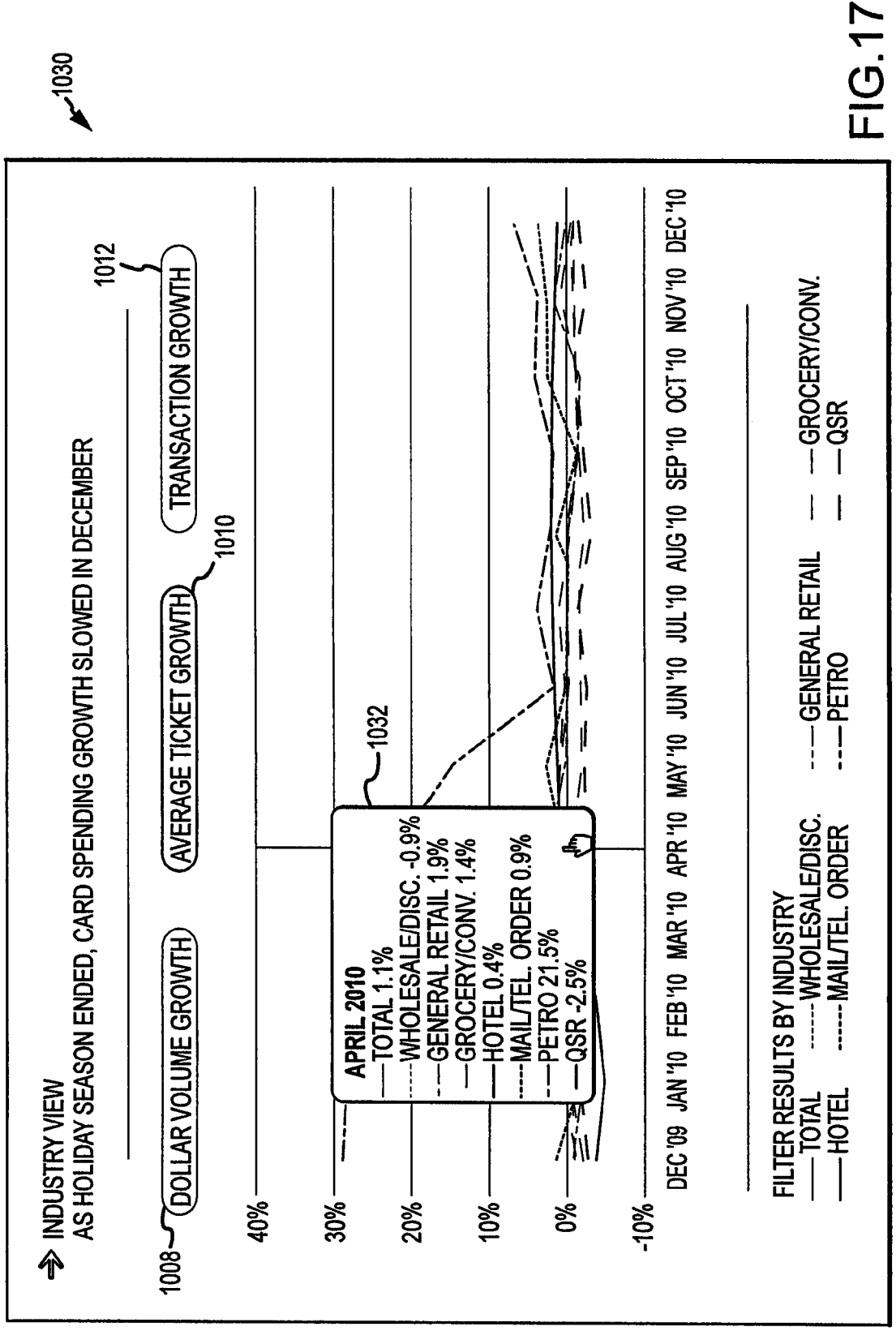
FIG. 17 illustrates the display screen of FIG. 16 with a superimposed snapshot of certain numeric growth percentages.

FIG. 16 illustrates a display screen 1030 that is produced when the average ticket growth button 1010 is selected. Various lines are displayed showing same store average ticket growth by industry. By a moving a pointing device over the line graph, a display 1032 may be produced to display the average ticket growth for a given month corresponding to the location of the pointing device. Display 1032 is superimposed over the line graph to provide a numeric display of the growth percentages for that given month.

Figure 18:
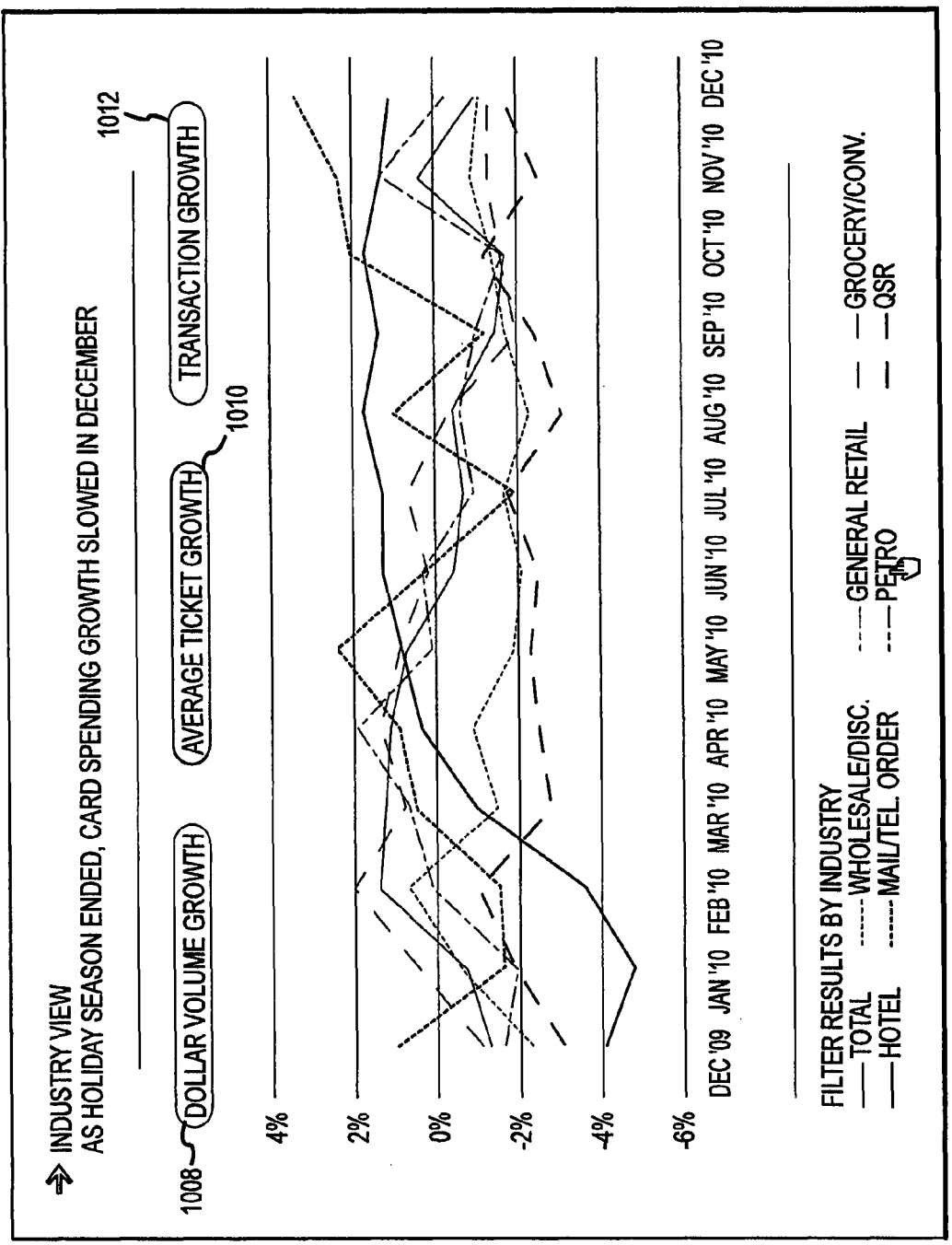
FIG. 18 illustrates the display screen of FIG. 16 when one of the industries is filtered.
Figure 19:
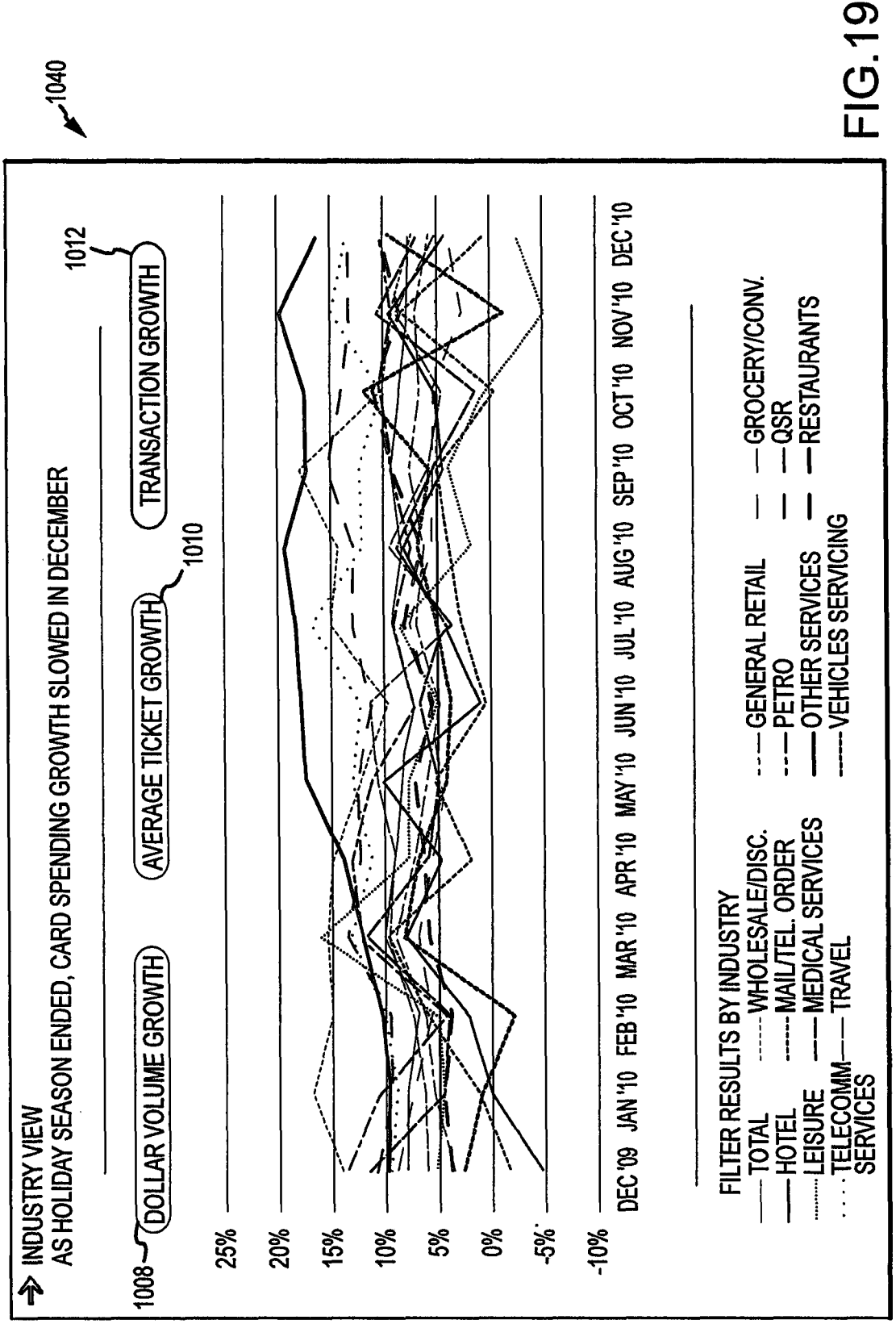
FIG. 19 is a display screen illustrating transaction growth by industry.
Figure 20:
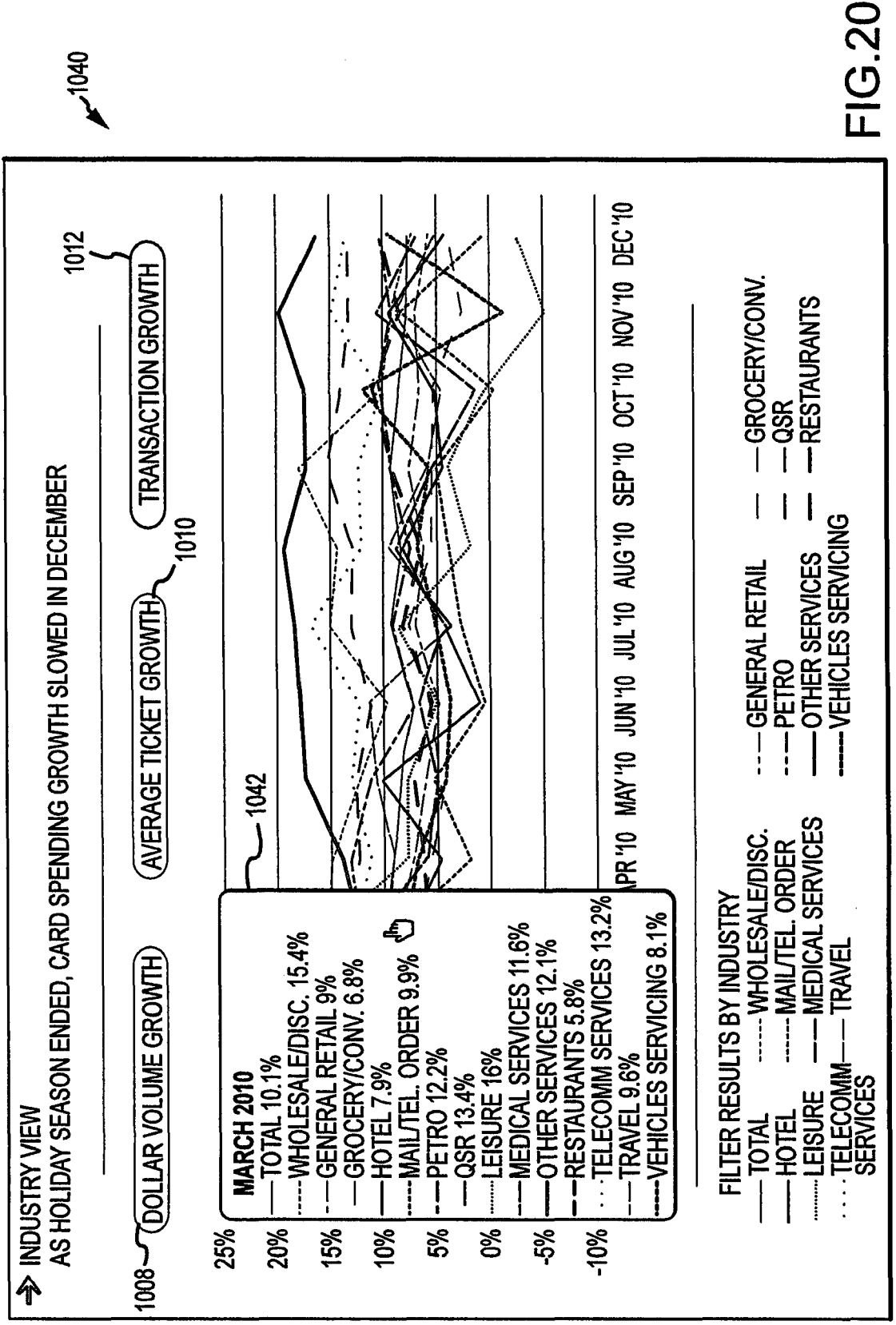
FIG. 20 illustrates the display screen if FIG. 19 with a superimposed snapshot of certain numeric percentages.
Figure 21:
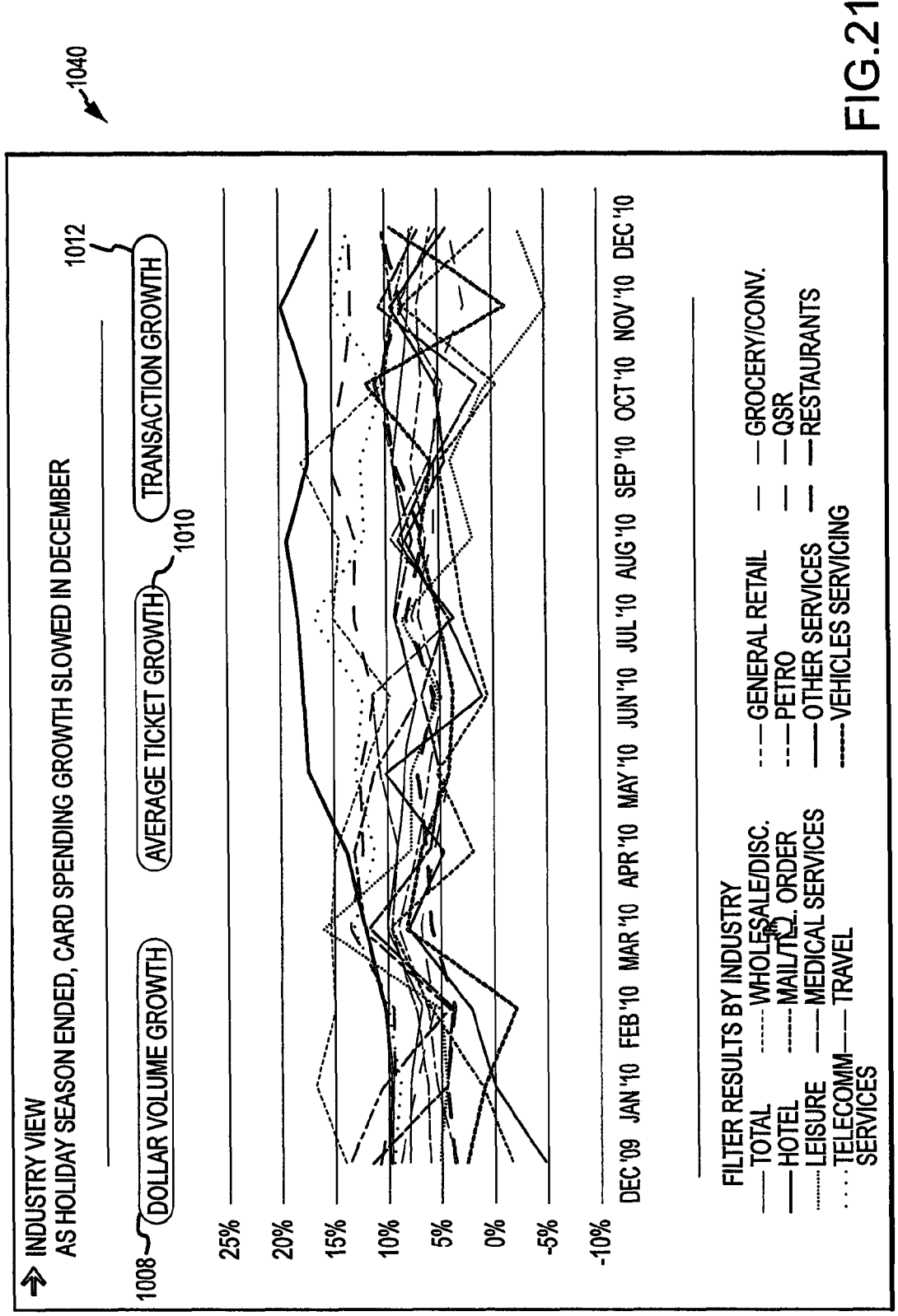
FIG. 21 illustrates the display screen of FIG. 19 with one of the industries filtered from the report.

FIG. 18 illustrates the ability to filter by industry. In FIG. 18, the petroleum industry is deselected and the graph is resealed to more clearly display the average ticket growth of the other industries. As many or as few of the industry icons may be selected or deselected in order to display the desired industries on the graph. FIG. 19 illustrates a display screen 1040 that is produced when the transaction growth button 1012 is selected. In this case, a line graph is produced showing the same store transaction growth by industry. This is based on the number of transactions that occurred within the same store as compared to a previous point of time. FIG. 20 illustrates a display 1042 that is produced when a pointing device is moved over the line graph to numerically display the transaction growth for a given month. As illustrated in FIG. 21, the report may be filtered by industry by selecting or deselecting one of the industry icons at the bottom of display screen 1040. As shown in FIG. 21, the wholesale/discounter industry has been removed from the market trend report.

Figure 22:
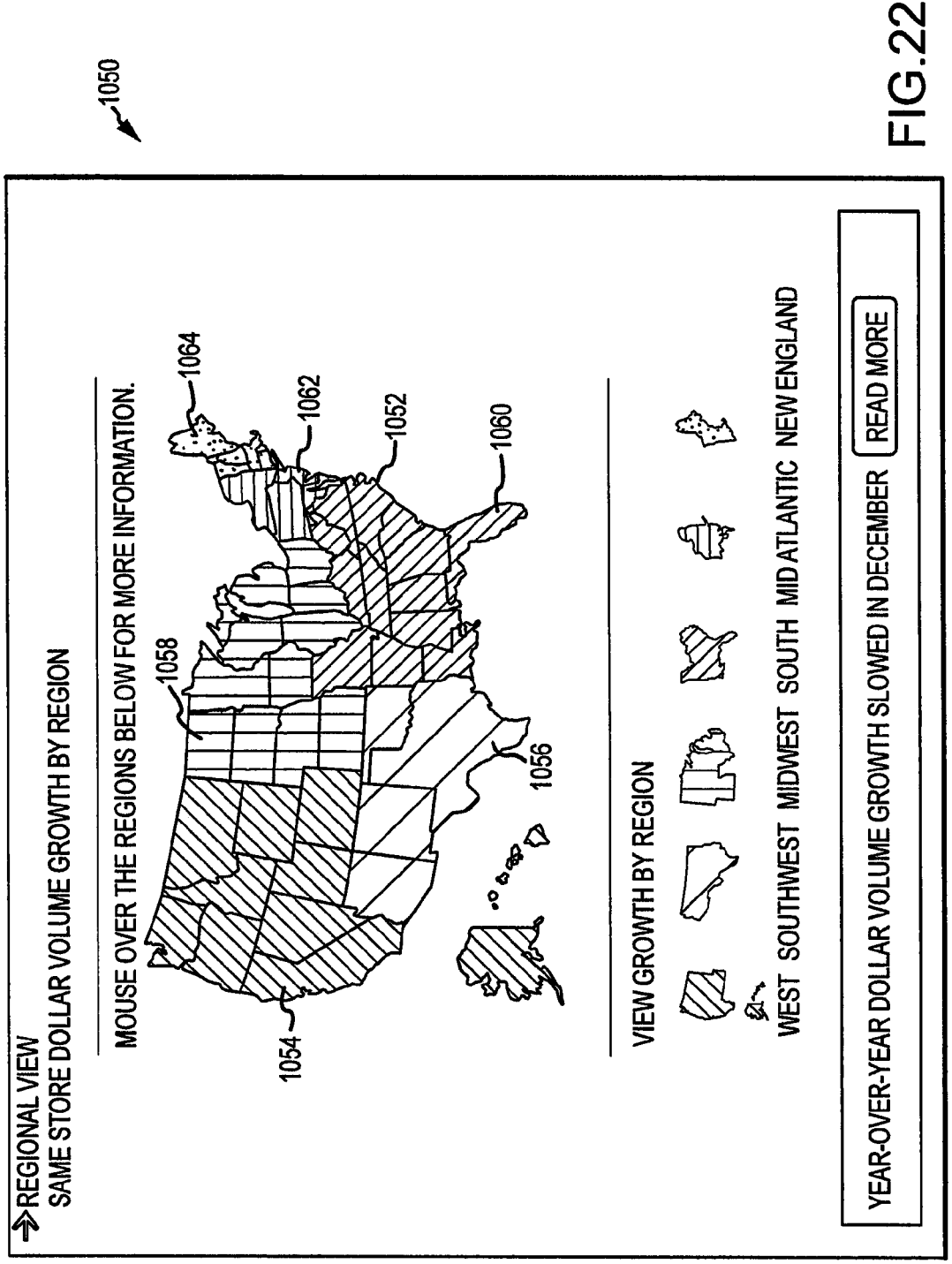
FIG. 22 is a display screen illustrating same store volume growth by region.
Figure 23:
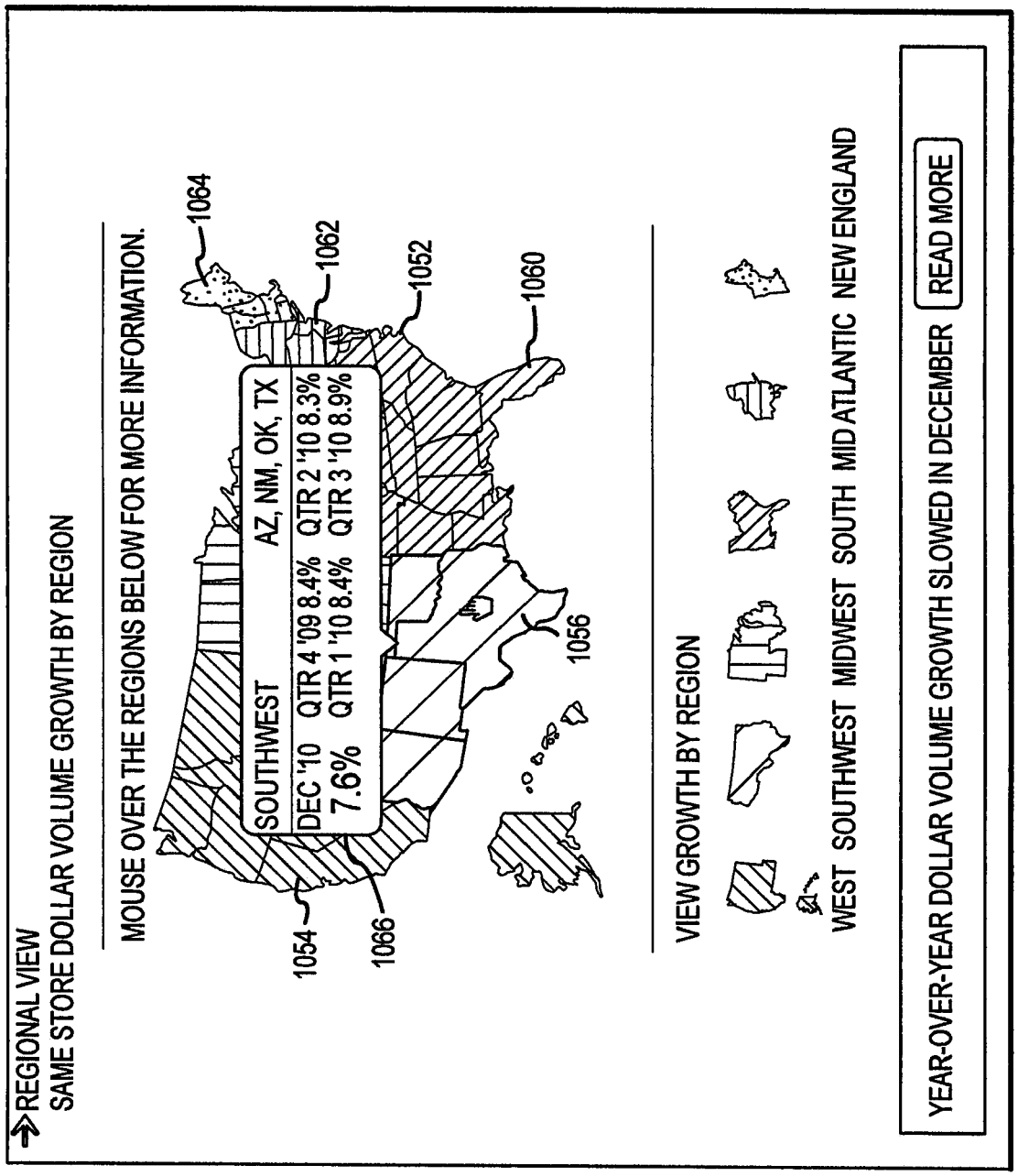
FIG. 23 illustrates the display screen of FIG. 22 when a pointer device is moved over one of the regions to show the volume grown percentages.
Figure 24:
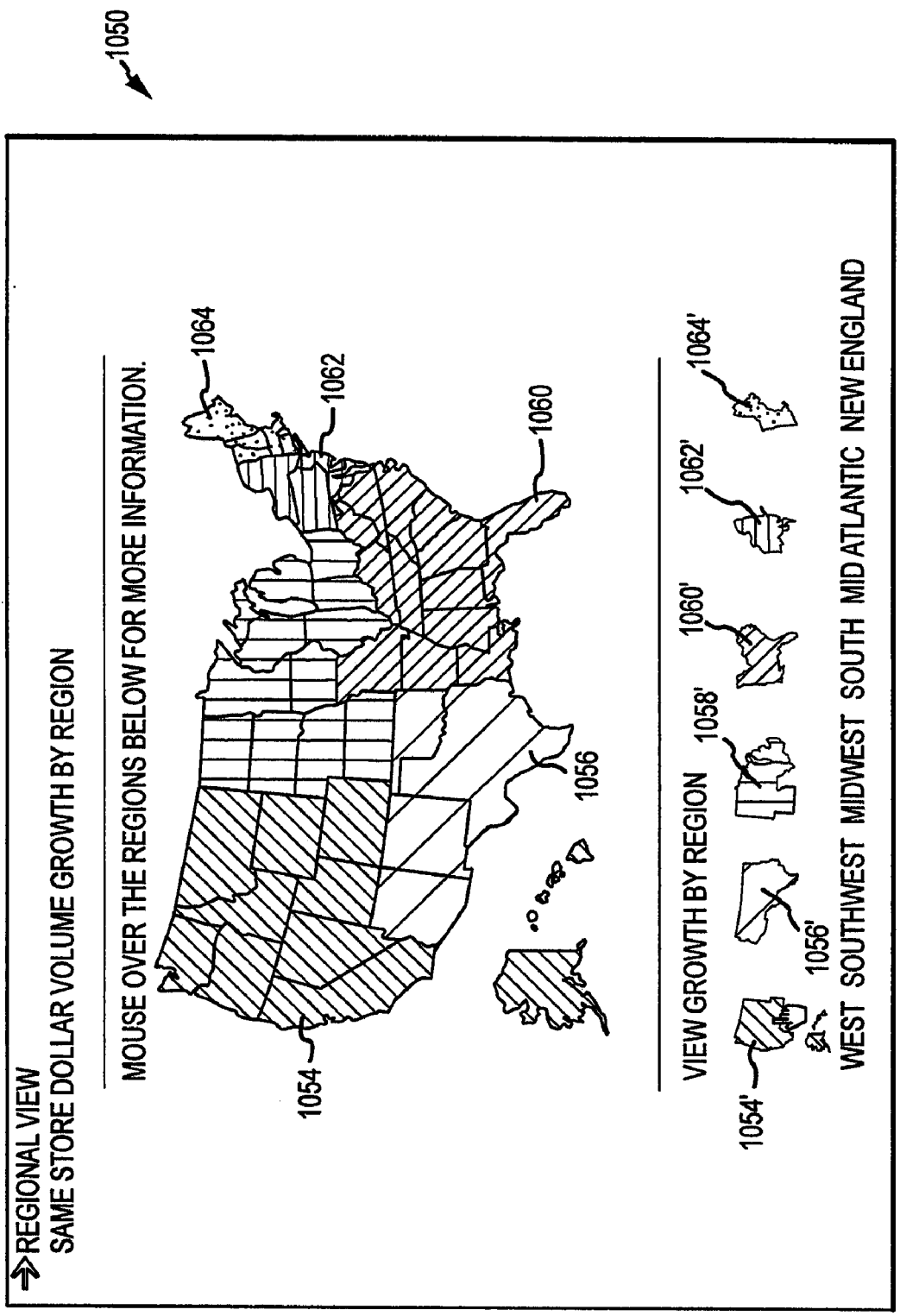
FIG. 24 illustrates the display screen of FIG. 22 when a pointer is moved over an icon representing growth by region.

FIG. 22 illustrates a display screen 1050 that is produced when regional view button 1004 of display screen 1000 (see FIG. 11) is selected. Display screen 1050 illustrates a map 1052 of the United States. This is segmented into a West region 1054, a Southwest region 1056, a Midwest region 1058, a South region 1060, a mid-Atlantic region 1062 and a New England region 1064. However, it will be appreciated that other regions could be defined. As illustrated in FIG. 23, the pointing device may be moved over one of the regions in order to produce a display 1066 which shows the same store dollar volume growth for that particular region. In the example of FIG. 23, the pointing device is moved over Southwest region 1056 and display 1066 illustrates same store dollar volume growth for the Southwest for December 2010 as well as for the fourth quarter of 2009, quarter one of 2010, quarter two of 2010 and quarter three of 2010. In a similar manner, displays could also be presented showing average ticket growth or transaction growth. As illustrated in FIG. 24, the bottom of display screen 1054 includes various buttons that correspond to the various regions 1054-1064 and for convenience of illustration use these same reference numerals filed by a "'". In FIG. 24, the West region button 1054' button is selected to produce a display screen 1070 as illustrated in FIG. 25.

Figure 25:
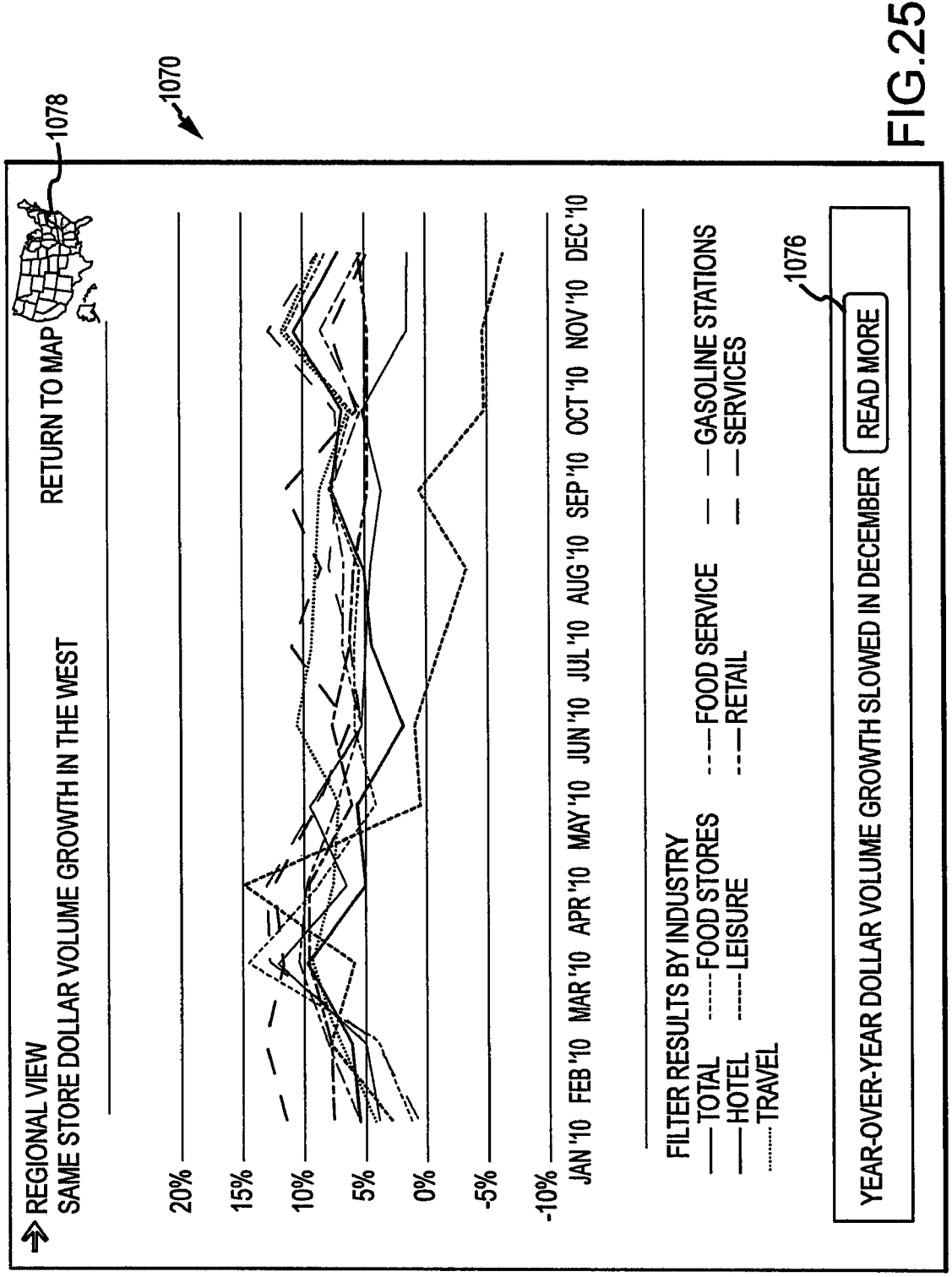
FIG. 25 illustrates the display screen that is produced when the regional icon of FIG. 24 is selected.

Display screen 1070 of FIG. 25 illustrates the same store dollar volume growth for the West region by industry. The various industries are listed at the bottom of display screen

Figure 26:
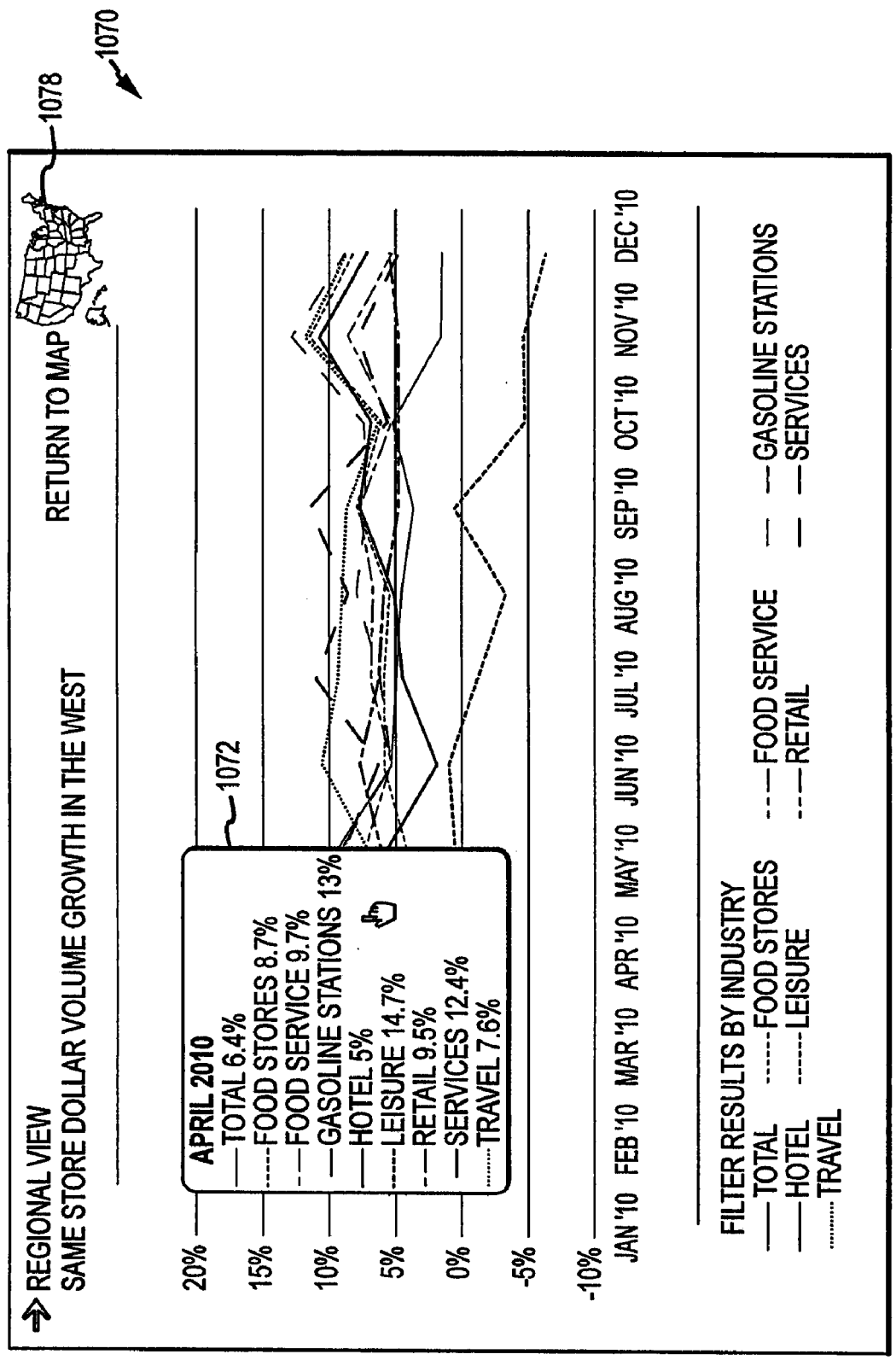
FIG. 26 illustrates the display screen of FIG. 25 and further showing a snapshot of certain percentages superimposed over the line graph.
Figure 27:
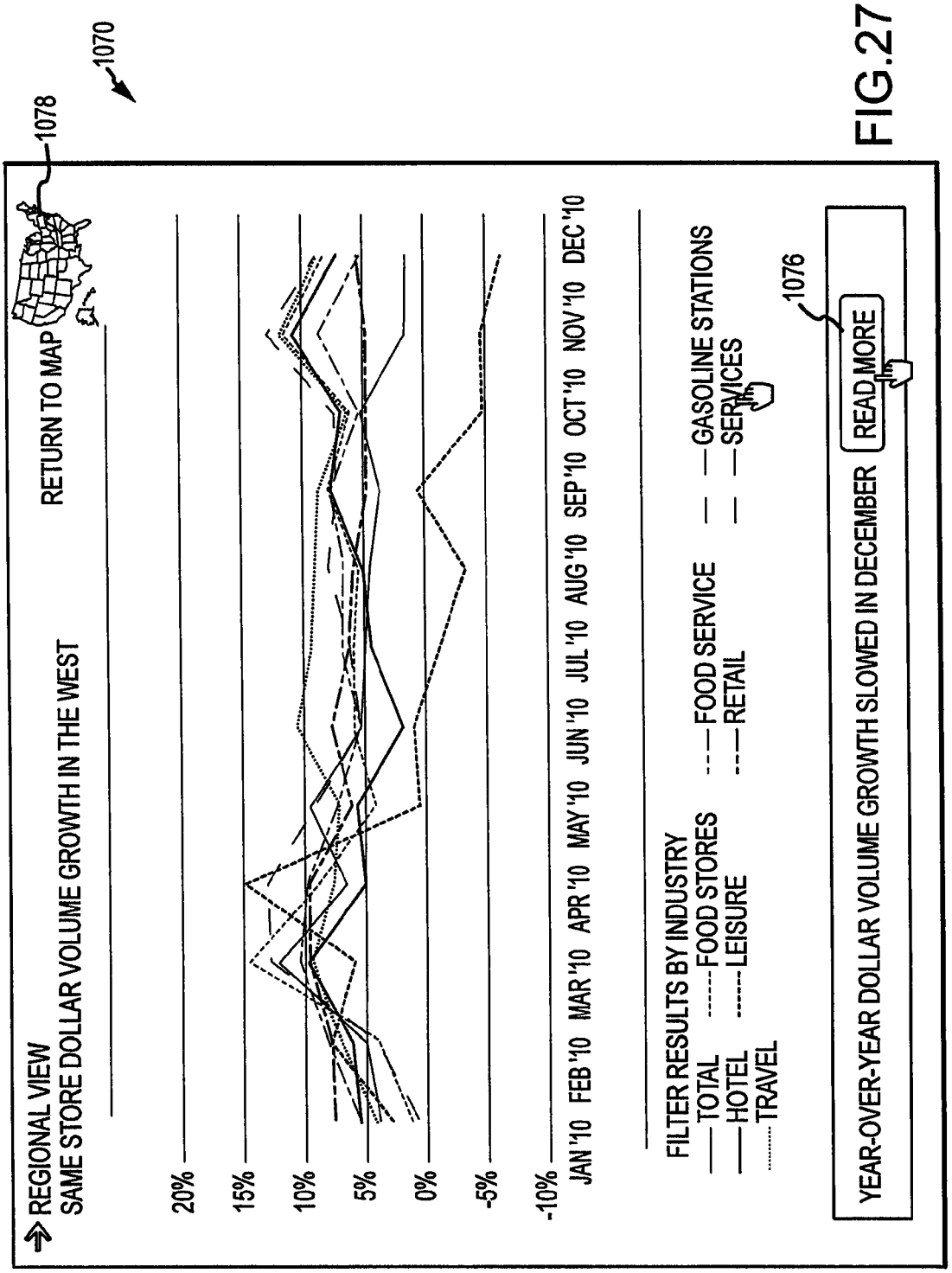
FIG. 27 illustrates the display screen of FIG. 25 when an industry has been filtered from the report.
Figure 28:
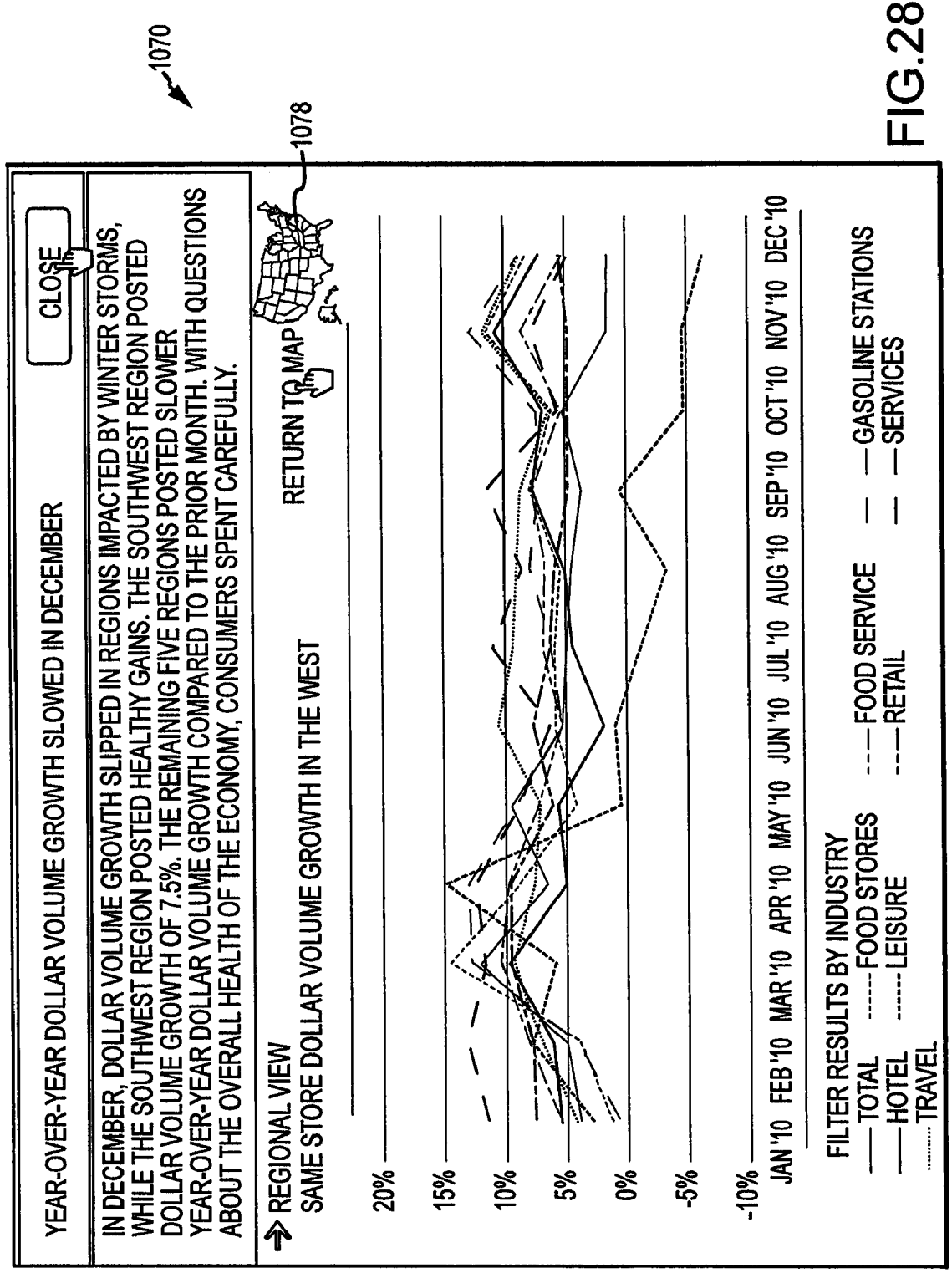
FIG. 28 illustrates the display screen of FIG. 27 when the "read more" icon is selected to show more information as to why volume growth slowed in December.

1070 similar to other embodiments described herein. For example, as illustrated in FIG. 26, the pointing device may be moved over the line graph to produce a display 1072 which shows a snapshot in time (corresponding to April 2010) of the same store dollar volume growth. The growth percentages are shown numerically for each of the industries as well as for a total of all of the industries combined. Similar to other embodiments, each of the industries may be filtered by moving the pointing device to one of the industry icons and selecting it or deselecting it. In FIG. 27, the services industry icon button has been selected to filter out the services industry from the line graph. Further, one or more "read more" icons may be selected to present additional information that explains the data. For example, FIG. 27 includes a read more button 1076 that may be selected to produce additional information as shown in FIG. 28. More specifically, an explanation is given as to why year-over-year dollar volume growth slowed in December. In this case, dollar volume growth slipped in regions impacted by winter storms while the Southwest region increased. Finally, a return to map button 1078 may be selected to return the user to display screen 1050 of FIG. 22.

Figure 29:
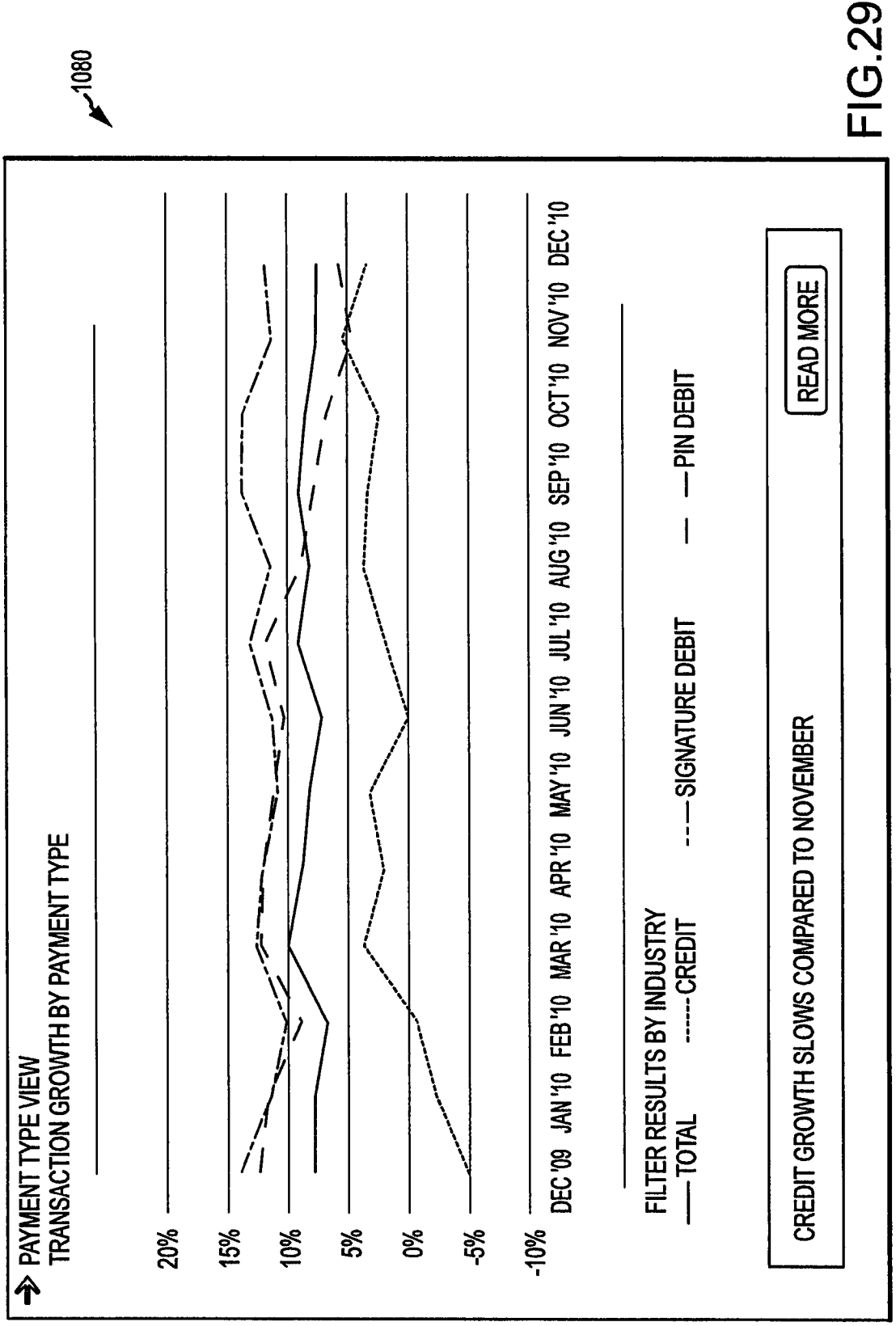
FIG. 29 illustrates a display screen showing transaction growth by payment type.
Figure 30:
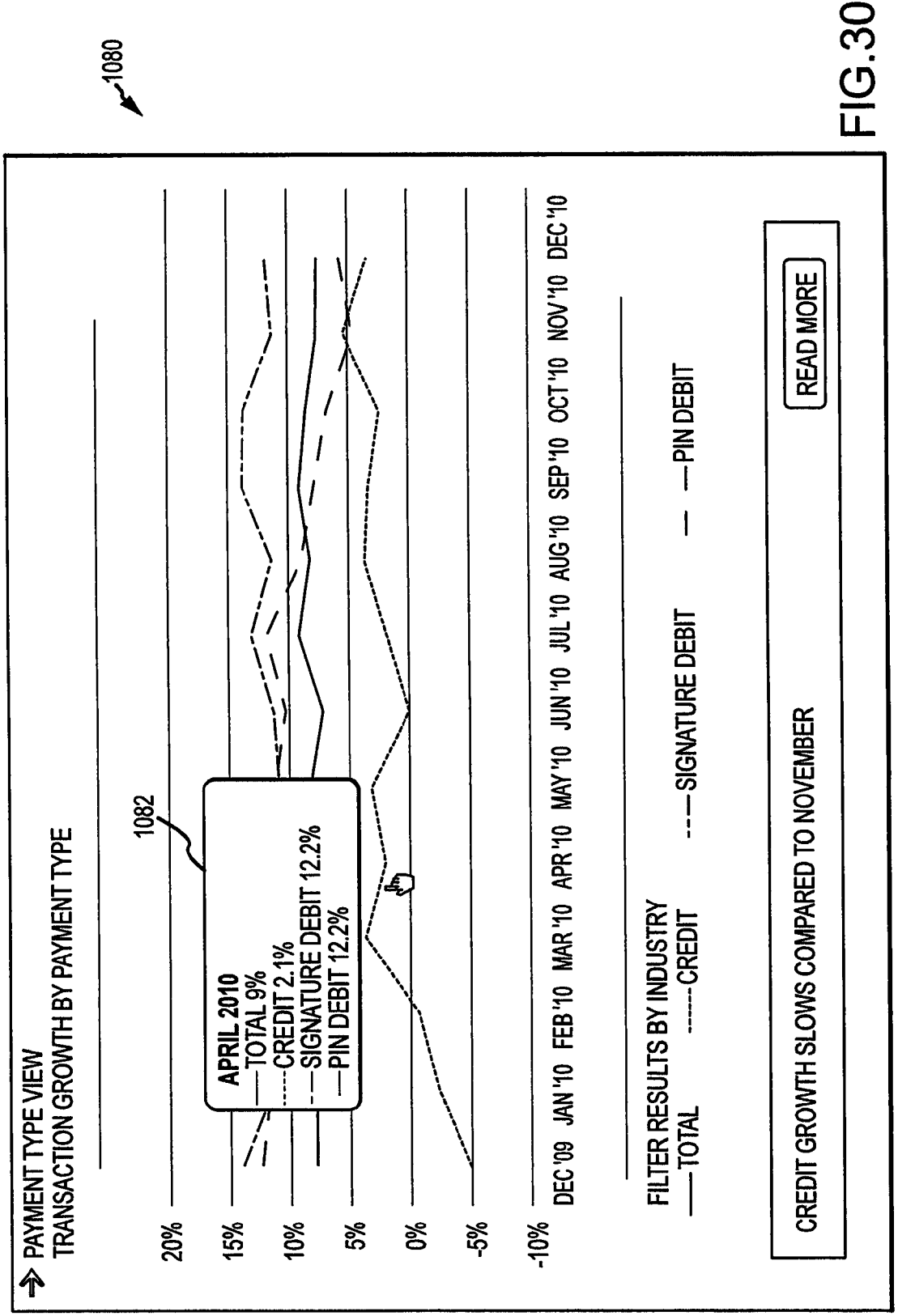
FIG. 30 illustrates the display screen of FIG. 29 with a snapshot of certain percentages superimposed over the line graph.

FIG. 29 illustrates a display screen 1080 that is produced when payment type view button 1006 of FIG. 11 is selected. Display screen 1080 illustrates the transaction growth by payment type. Further, the transaction growth is filtered by industry, e.g., payment instrument type. Although shown as transaction growth, it will be appreciated that similar display screens could be produced for dollar volume growth and average ticket growth by payment type. Similar to other embodiments, the pointing device may be moved over the line graph to produce a display 1082 which numerically displays the transaction growth for a given point in time. In FIG. 30, the transaction growth is shown for each of the payment types for Apr. 2010. As the pointing device is moved over the line graph, numeric displays will be shown for the other months. Further, similar to other reports, the growth is shown as compared to same store as compared to a previous point in time.

Figure 31:
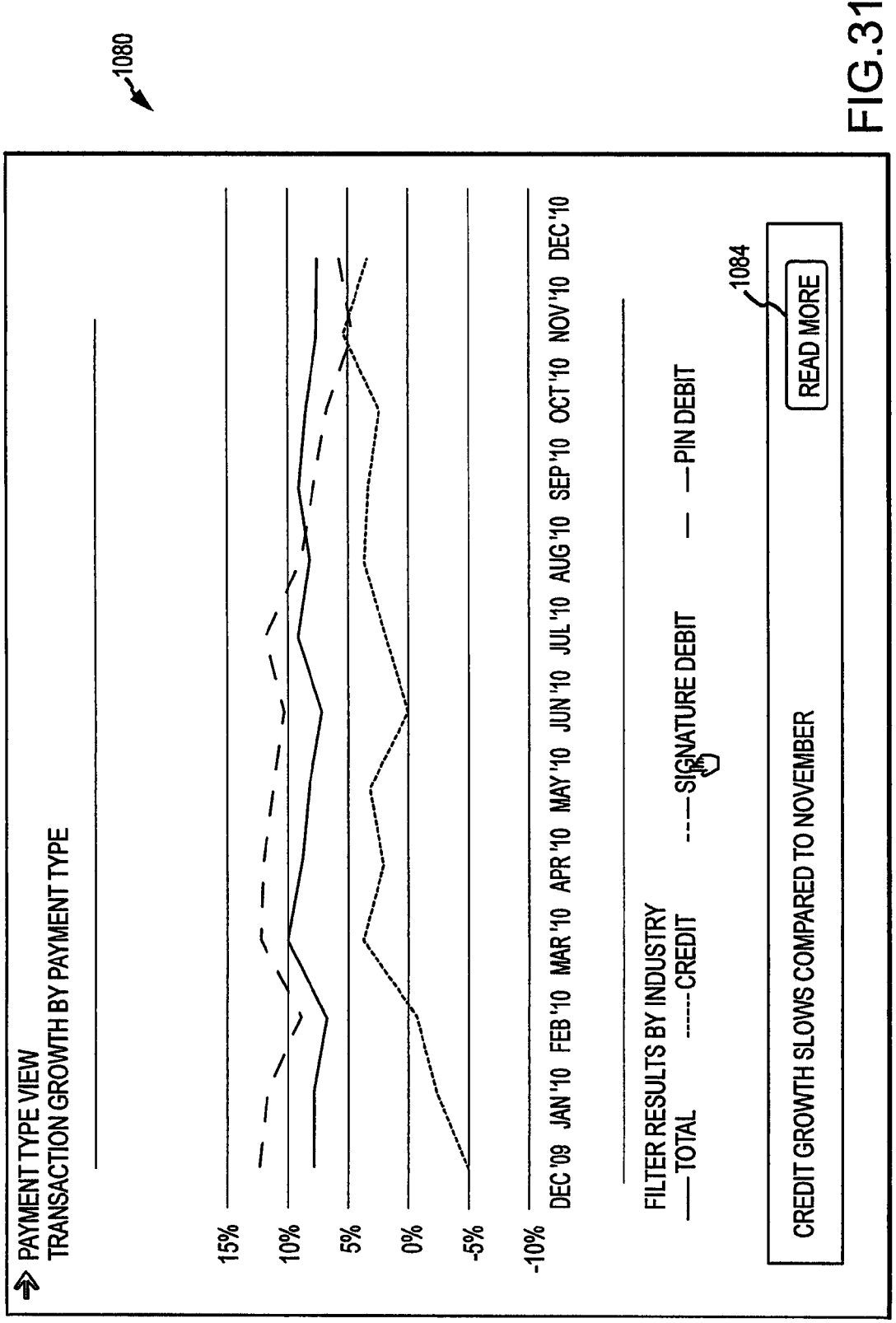
FIG. 31 illustrates the display screen of FIG. 29 when one of the payment types is filtered from the report.

As illustrated in FIG. 31, the display may be filtered by industry by using the pointing device to select or deselect one of the payment types. In FIG. 31, the signature debit payment type is selected to remove that data from the display screen. Also similar to other embodiments a "read more" button 1084 may be provided to give additional explanations regarding an explanation of the display data.

Figure 32:
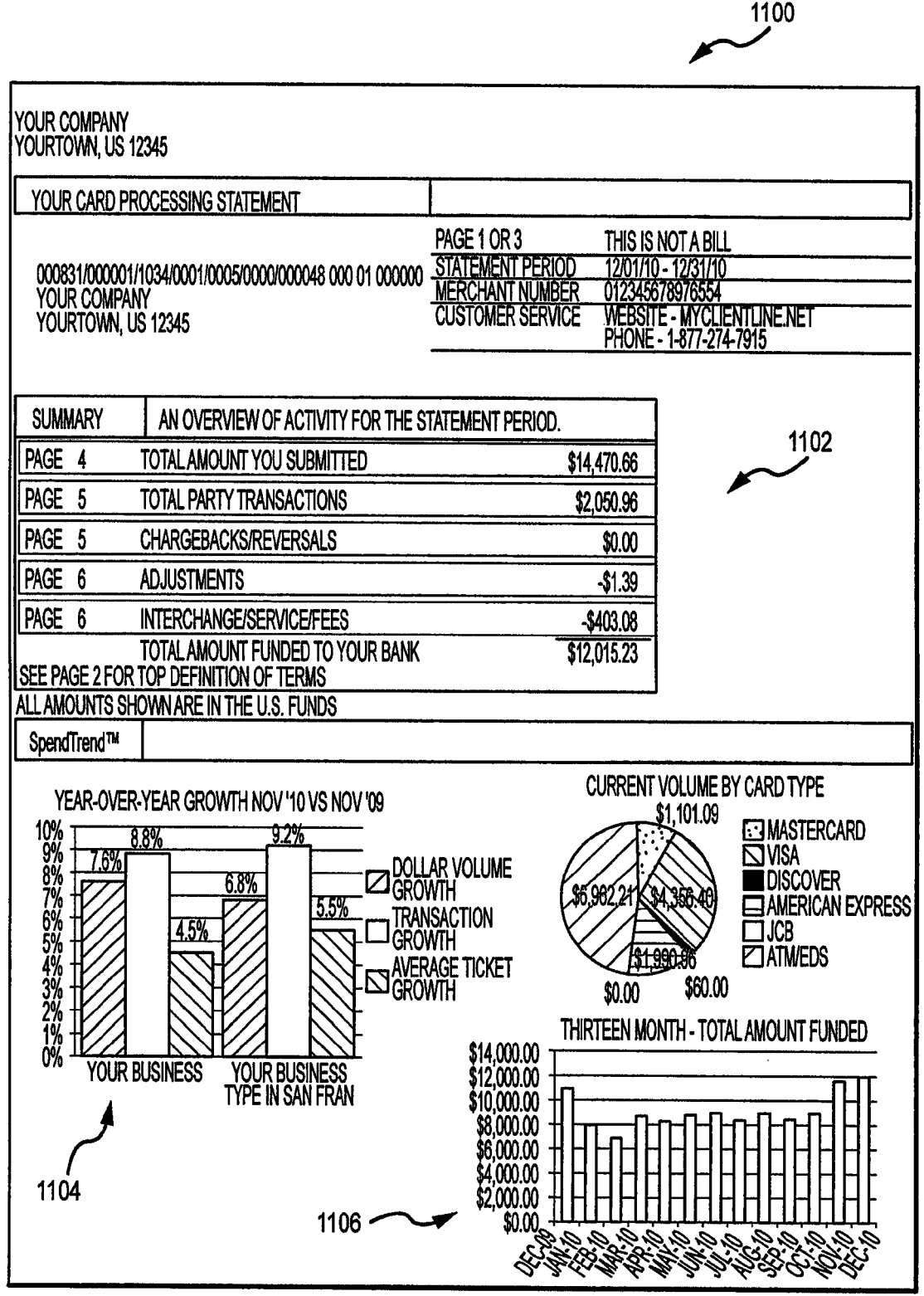
FIG. 32 illustrates a card processing statement that may be transmitted to a customer showing monthly activity as well as same store growth for the customer's business and how the customer performed relative to similarly situated merchants.

FIG. 32 illustrates a statement 1100 that may be produced by any of the systems or subsystems described herein. Statement 1100 is a type of statement that may be received by a merchant who accepts various types of payment instruments, such as credit cards, debit cards, prepaid cards, negotiable instruments or the like. In this example, the merchant is an Internet merchant who is receiving a card processing statement. Statement 1100 includes a summary region 1102 which shows the activity for the given month. The summary further shows various deductions for services provided in connection with processing cards presented to the merchant when making purchases. Statement 1100 further includes a market trend report 1104 that shows same store growth for the merchant's business compared to a previous point in time. In this example, the growth of the merchant's business is compared using data from Nov. 2009 and Nov. 2010. As shown, the merchant's business has grown 7.6 percent by dollar volume, 8.8 percent by transaction and 4.5 percent by average ticket. To the right of this graph is another graph showing the year-over-year growth of a group of merchants that are similarly situated to the merchant who is receiving the statement. For example, if the merchant is located in San Francisco, report 1104 may show how other merchants in the San Francisco area performed in a comparison between Nov. 2009 and Nov. 2010. Optionally, statement 1100 may include a report 1106 showing the total amount funded to the merchant's account over time.

FIGS. 11-31 illustrate various market trend reports that may be produced from point of sale terminal data. Similar reports could also be produced for the specific category of closed loop prepaid cards. Such cards are commonly referred to as gift cards and are typically usable only with merchants associated with the gift card. For example, a Wal-Mart gift card can generally only be redeemed at Wal-Mart locations or when purchasing goods from the Wal-Mart Internet site. Typical transactions that occur with such closed loop prepaid cards include activations where money is funded to an account associated with the gift card, redemptions where purchases are made using funds associated with the card, and reloads where funds are reloaded into an account of an existing prepaid card. Using POS terminal data captured when performing transactions with such closed loop prepaid cards, any of the reports described herein may be produced. Some specific examples of reports that may be produced are illustrated in FIGS. 33-36. These may be produced by any of the systems or subsystems described herein and provided to the merchant. Also similar to other embodiments, these reports or custom reports may be produced through a web portal by having the merchant login to a website and generating the reports.

Figure 33:
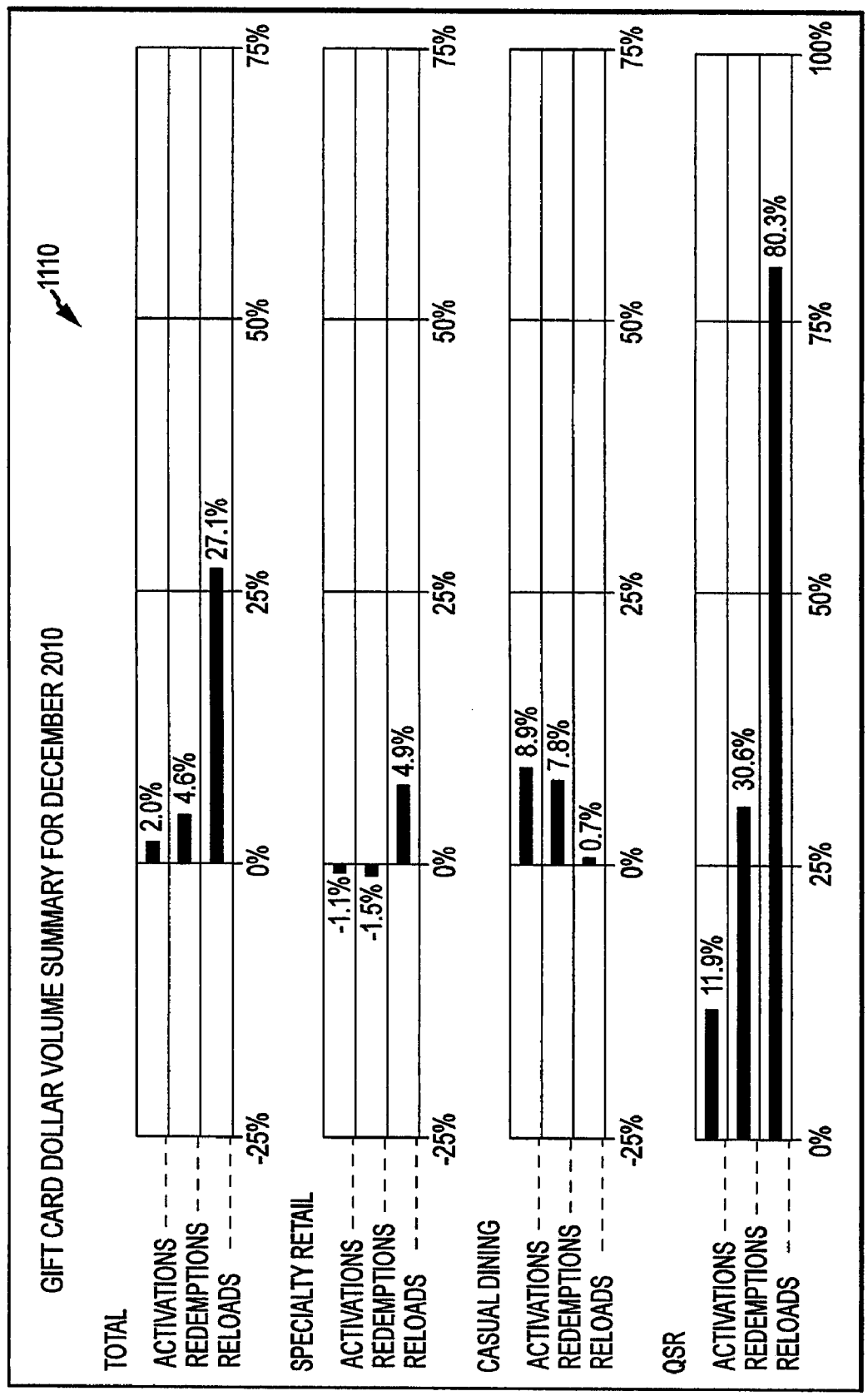
FIG. 33 illustrates a report showing dollar volume growth for closed loop prepaid payment instruments.

In FIG. 33, a market trend report 1110 is shown and illustrates a summary for Dec. 2010 of gift card dollar volume. This is further broken down by transaction type (activations, redemptions and reloads) as well as by industry (specialty retail, casual dining and QSR). These are year-over-year growth numbers where Dec. 2010 data is compared with Dec. 2009 data. As shown, in Dec. 2010, year-over-year dollar volume growth of activations was 2 percent while redemptions increase 4.6 percent and reloads increased 27.1 percent. Similar to other embodiments, explanations may be provided. Further, as illustrated in FIGS. 34-36, this data may be further expanded over a timeline to produce line graphs showing activations, redemptions and reloads by industry over a certain time frame. For example, FIG. 34 illustrates a market report 1120 showing activations by industry. The activations are shown in terms of dollar volume growth in gift card activations, transaction growth in gift card activations and average ticket growth in gift card activations. Numeric tables may also be provided showing the growth by a given quarter or by a specific month. These may be similar to the displays of other embodiments described herein where a pointing device is moved over the line graphs. Further, filtering by industry may also occur similar to other embodiments described herein. Finally, as illustrated in FIG. 34, various explanations may be provided, particularly as to how macro economic data may be used to help explain some of the results.

FIG. 35 illustrates a market report 1130 showing gift card redemptions by industry. This may be by dollar volume growth, transaction growth and average ticket growth. Further, snapshots may be provided showing numeric values of the growth rates for specific times. Similar to the activations market report, these reports may be shown in a format similar to those previously described in connection with other embodiments. Further, filtering of any of the industries may be performed similar to other embodiments.

FIG. 36 illustrates a market trend report 1140 showing reloads by industry. Line graphs are also shown for dollar volume growth, transaction growth and average ticket growth. Further, tables are provided showing snapshots for growth percentages at specific times. Similar to the reports of FIGS. 34 and 35, these reports may be shown on a website where the snapshots may be superimposed on the line graphs and various filtering by industry may occur. Further, the explanations provided may be produced by selecting "read more" buttons to produce such displays.

Although not shown in the reports of FIGS. 11-36, it will be appreciated that the payment types could be expanded to include payment types such as those originating from mobile transactions or ecommerce transactions. These could be displayed by industry or geographic region. Further, various filtering of the payment transaction types could occur similar to other embodiments.

Another type of report that may be generated using POS data is a report showing the growth in a specified region. The report may further be based on a certain industry within the geographical region. Such reports may be beneficial to a merchant who is thinking of entering into a geographical region, or expanding business within the region. For example, such reports may provide information such as the number of merchants within the specified geographical region, including those in the specified industry or industries, the growth over a certain time, and/or the average dollar volume over a specified time. Growth numbers may include dollar volume growth, transaction growth, average ticket growth and the like. By using this information, a merchant is better informed as to whether to proceed or expand within a given region.

Figure 37:
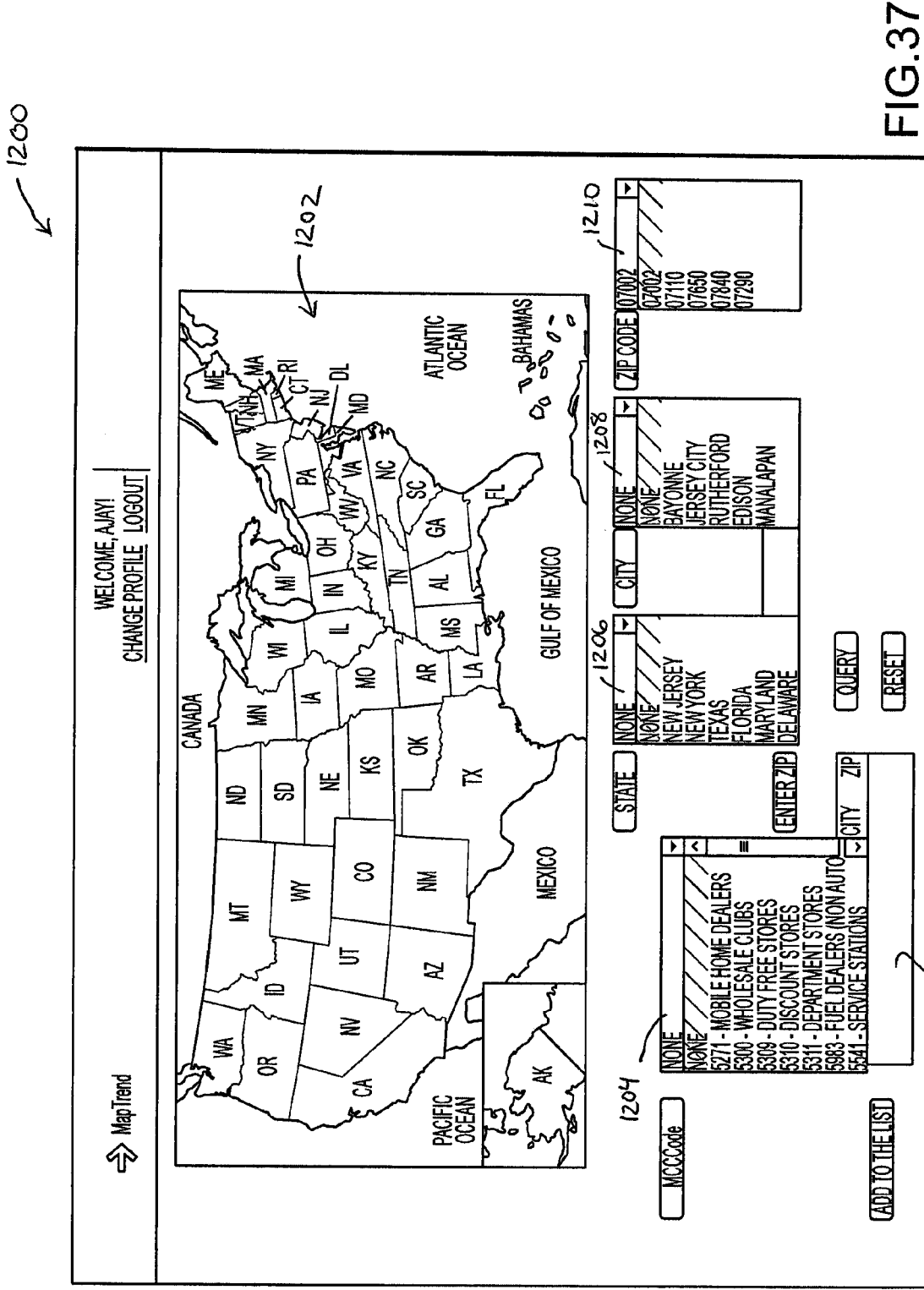
FIG. 37 illustrates a screen display that may be used to request a report showing growth data within a specified industry located within a certain geographical region according to the invention.

FIG. 37 illustrates a screen display 1200 that may be displayed on a computer display screen and used to elicit information used to generate a report showing growth of a certain industry within a given region. Screen display 1200 illustrates a map 1202 containing geographical regions where the user may request to obtain a growth report. Also, a variety of fields that may optionally include drop down lists are provided to facilitate data input. For instance, a MCC Code field 1204 is used to input a MCC code representing a certain industry. In this way, a user may narrow the search to a given industry, such as wholesale clubs, discount stores, department stores, fuel dealers, and the like. A State field 1206 is used to enter the desired state, a City field 1208 is used to enter the desired city, and a Zip Code field 1210 is used to enter the zip code. Some, parts, or all of these fields may be populated by the user depending on the desired report. For example, if no geographic fields are entered, the report would show growth rates across the United States for the selected MCC code. If no MCC code is selected, the all industries within the given region will be shown. A customizable field 1212 may be used to enter other state, city and/or zip code information.

Figure 38:
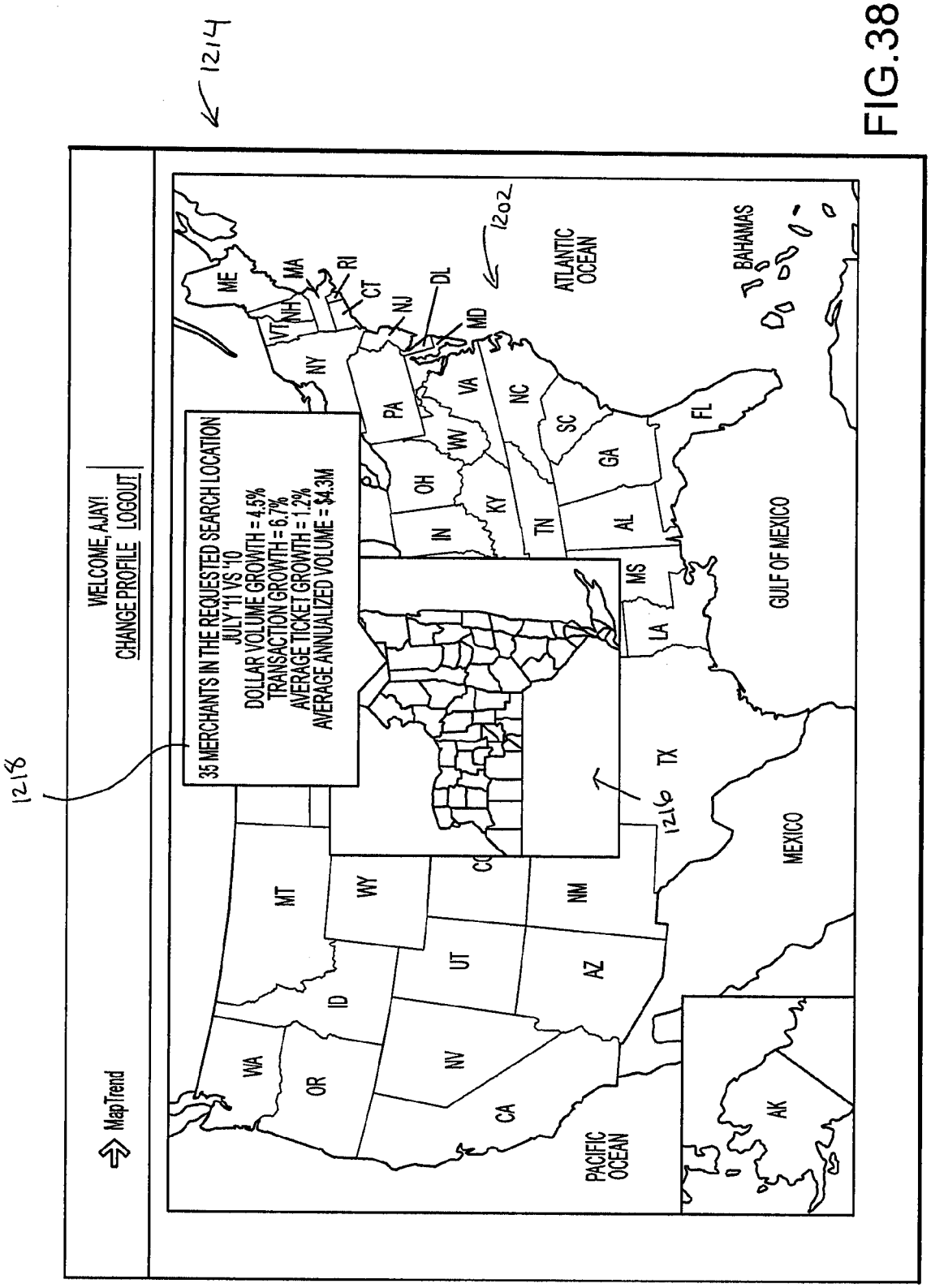
FIG. 38 illustrates a screen display showing a report produced using the information input into the display screen of FIG. 37.

Once the desired information is entered, the computer system generates a report from the POS data and renders a graphical display on a display screen 1214 as shown in FIG. 38. Display screen 1214 shows map 1202 along with an enhanced view of the geographical region 1216 of interest. A report 1218 displays growth and other information. For example, report 1218 shows the number of merchants in the desired region (which could include the number of merchants in the selected industry), the time period for the comparison, the dollar volume growth, the transaction growth, the average ticket growth, and the average annualized volume.

Another embodiment of the invention permits a requestor to focus the type of merchant when generating any of the reports described herein. For example, instead of simply identifying a merchant code that is to be used to determine market trend data for a given market, the user may request market trend data for specific merchants, such as competing merchants. In such cases, the user specifies specific merchants, rather than just merchant categories. The POS data for these merchants is aggregated and any of the reports described herein may be generated for the specified merchants, including the number of merchants in the desired region (which could simply be a subset of those specified in the request), the time period for the comparison, the dollar volume growth for these merchants, the transaction growth for these merchants, the average ticket growth for these merchants, and the average annualized volume for these merchants.

In some cases, the requester may be required to specify a certain number of merchants, and those merchants may be required to be similarly situated (such as having a similar size in terms of annual revenue, number of stores, and the like). This may be required so that the data relating to any specific merchant may not be identifiable in the report. In other words, each merchant's data is kept in confidence because the generated reports are an aggregation of data from multiple similarly situated merchants.

As an example, the requester may be required to specify a minimum of 10 merchants, and in some cases at least 15 merchants. These merchants must have an equivalent size in terms of sales volume. The POS datasets for all of these merchants may then be aggregated and market trend data may be calculated as described herein. Further, any of the reports described herein may also be calculated.

In some embodiments, any of the geographical reports described herein may be further segmented based on other criteria. For example, within a given region, various demographic data may be displayed, such as, for example, average household income for the region, average household size for the region, average age for the region, and the like. As an example, with the report shown in FIG. 8, a separate table could be provided illustrating the various demographic data. The demographic data may be stored in a database along with address information. In this way, when a given region is selected, the demographic data corresponding to the selected region may be searched from the database and included in a display within the report of FIG. 38.

In another feature, more detailed information for a given geographical region may be mined. In this way, once a given region is selected, more detailed reports for that region may be produced. For example, a merchant may be able to enter a request to see a graphical depiction of all similarly situation merchants within the region. For instance, a merchant may own a grocery store within a particular city that has good sales growth. The merchant may request to see all other grocery store merchants within the same city, and to have this information visually depicted on a map. In this way, the merchant can quickly see where the competing grocery stores are location and whether it would be worthwhile to add another grocery store within the city. The data on all merchants located within a given region may be stored in a database and categorized based on merchant codes so that when the merchant selects to see what other merchants are within the region, the database may be searched for all other merchants that are similarly classified. Also, address information may be stored in the database so that the location of each competing merchant may be graphically displayed on a map.

Instead of similarly situated or competing merchants, the merchant may request a report showing complementary businesses to be displayed on a map. Complementary businesses are those business which enhance the sales of another business by virtue of selling goods that complement those of a merchant. For example, the merchant may sell children's shoes. A merchant who sells children's clothes would complement the children's shoe store because when a customer purchases children's clothes, that may also wish to purchase a matching pair of shoes, and would thus look to a children's shoe store. A database of complementary businesses may be stored in a database so that when a merchant wishes to see a report showing the location of complementary businesses, the database may be searched and the identified businesses displayed on the map.

In one particular embodiment, the invention provides a way for merchants to determine how their customers' shopping patterns, such as, for example, where the customers shop immediately before or after shopping with the merchant. For example, a hardware merchant may wish to know whether its customers shop at other stores carrying items that could be carried in the merchant's hardware store. In some cases, merchants are also able to determine the extent of their customer's loyalty. In other words, merchants are able to see whether their customers shop at competing merchants. For example, a hardware store merchant may wish to know how many of its customers also make purchases at another competing hardware store. In cases where permitted by law, this could be performed at the customer level, or could be done on an aggregate level where all customers are evaluated as a whole.

Tracking of customer's shopping locations may be performed by gathering and storing purchase data from POS devices in a manner similar to other embodiments described herein. The POS data may include information such as merchant ID, purchase amount, time of purchase, consumer account number, and the like. From this data, a computer system may calculate a variety of reports relating to where its customers shop just before or just after shopping with the merchant. Also, this data permits the production of reports showing how loyal a customer is to a given merchant, or whether the customer also shops at a competitor merchant. Merely by way of example, customers may be tracked over time (usually in the aggregate) to produce reports showing over time how where customers shopped immediately before or after shopping with the merchant, or how many customers who shopped at the merchant shop at a competing merchant. For instance, a report may show by day how many customers shop at a competing location, this may be in terms of the total number of customers who shopped elsewhere, the percentage of customers who shopped elsewhere, and the like. Also, other shopping data may also be included in the reports similar to other reports described herein. For instance, the report may also show the average amount spent both at the merchant location and when shopping at a competing location. Other variables include distance from the merchant, time of day when purchases were made, and the like.

The calculations and reports may be generated using any of the computer systems described herein. For example, a host system may collect the POS data from POS devices that is transmitted over a network. This POS data may include information on the customer, the merchant and the time of day. Using this data, each customer account may be evaluated to see if purchases were made at other merchants, including competing merchants. This may be done, for example, by evaluating the MCC code for each merchant. If an account holder shops at two merchants having the same MCC code, those transactions may be flagged and used in the reports. Also, the time of purchases may be considered so that reports can also track how many days have passed since a shopper who purchased at one location made a purchase at a competitor location.

Figure 39:
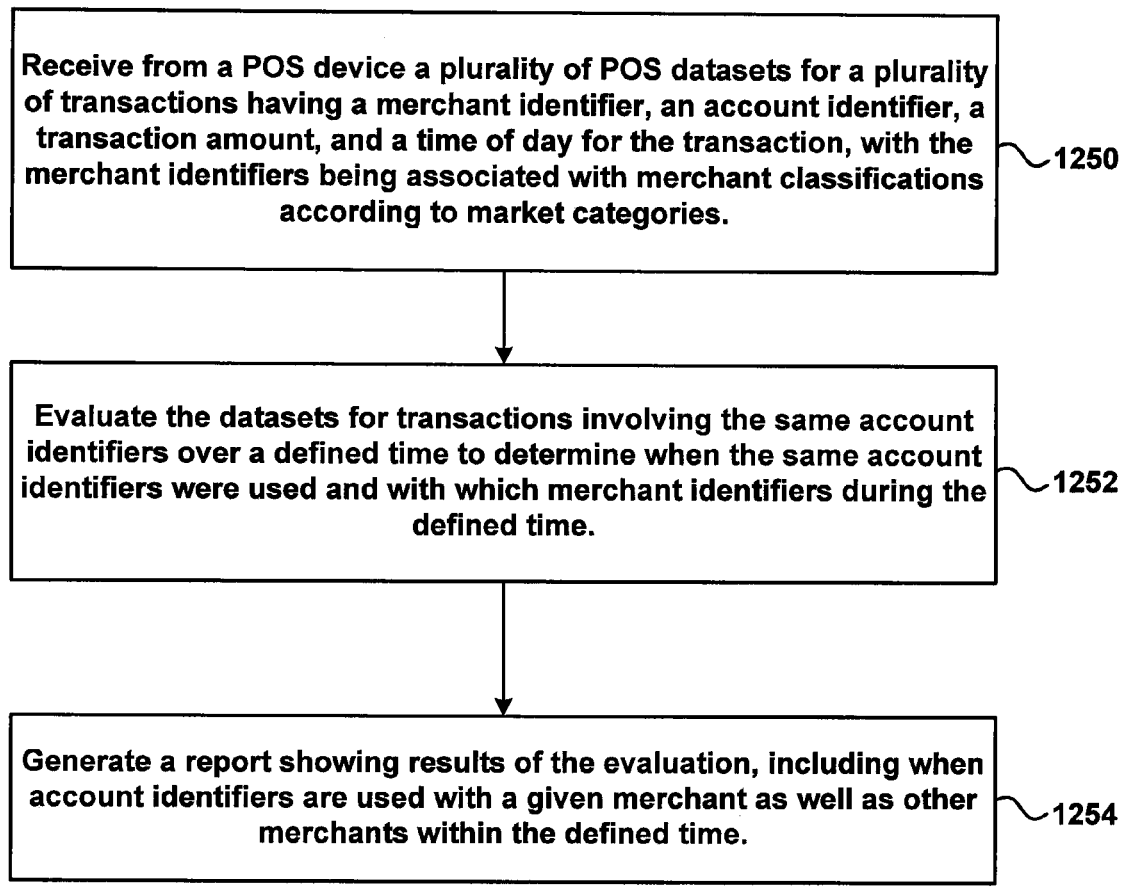
FIG. 39 is a flow chart illustrating one method for determining the likelihood that customers shop at certain merchants immediately before or after shopping with the merchant.

FIG. 39 illustrates one method for determining shopping patterns, including shopping locations. As shown in step 1250, the process utilizes data received from POS devices for a plurality of transactions having a merchant identifier, an account identifier, a transaction amount, and a time of day for the transaction. The merchant identifiers are associated with merchant classifications according to market categories.

In step 1252, the datasets are evaluated for transactions involving the same account identifiers over a defined time to determine when the same account identifiers were used and with which merchant identifiers during the defined time. In one specific example, a specific merchant may be selected for the analysis. This is done using the merchant identifiers. For the given time, such as every day, the POS datasets are separated into the groups. The first group is for transaction identifiers that have transactions at the selected merchant, while the second group is for transaction identifiers that have transactions other than with the selected merchant. Also, the second group includes transaction identifiers that have been used with other merchants during the defined time period. In other words, the two groups define account holders who shopped at the merchant, and those that did not shop at the merchant, but did shop at other merchants during the defined time. For those transactions other than with the selected merchant (the second group), the POS datasets are aggregated or classified by industry level. This may be done using the merchant classifiers, such as industry recognized codes. A Naïve Bayes technique may be used to determine the industries that are most strongly associative with shopping at the selected merchant.

In step 1254, a report may be generated showing the results of the evaluation, including when account identifiers are used with a given merchant as well as other merchants within the defined time. The report may further be defined in terms of merchant classifications. For example the report may show, based on industry, where shoppers are shopping before or following shopping with the selected merchant.

Figure 40:
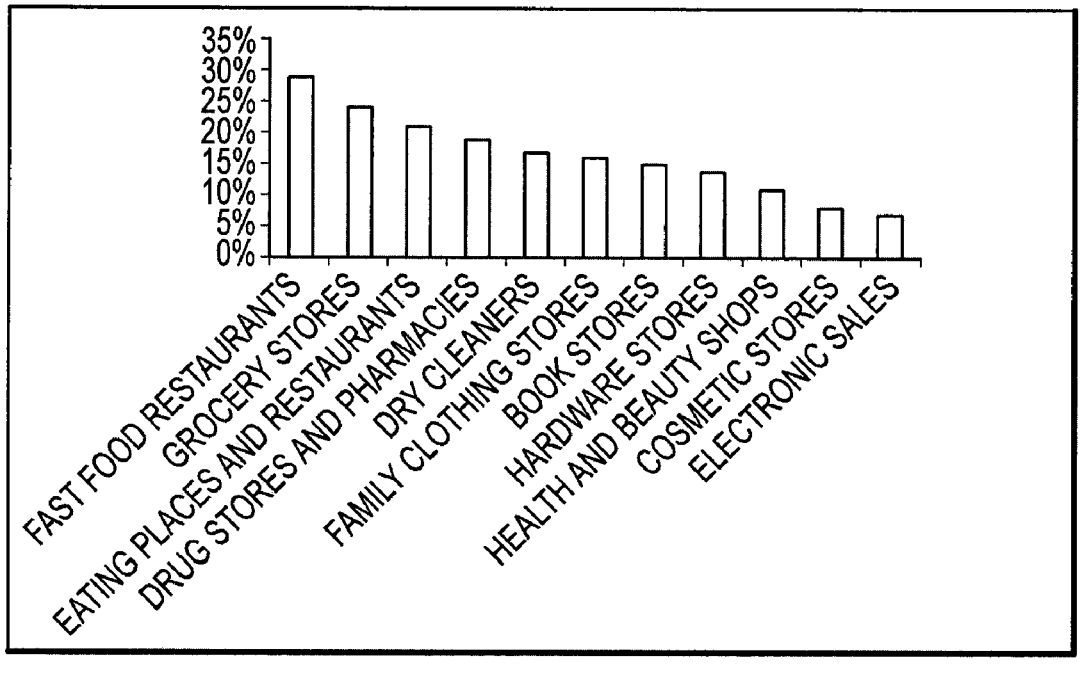
FIG. 40 illustrates a graphical report showing a report of how customers shop immediately before shopping with the given merchant.
Figure 41:
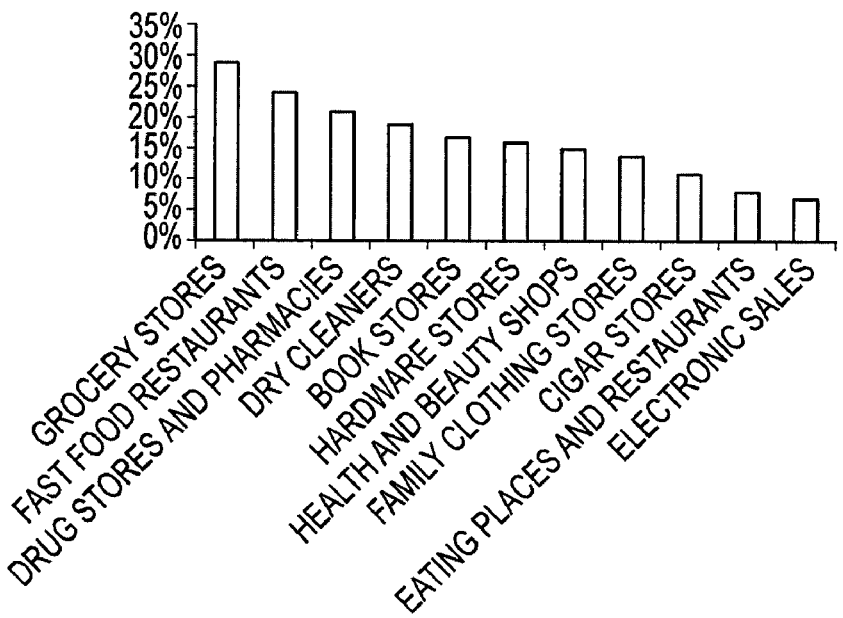
FIG. 41 illustrates a graphical report of how customers shop immediately after shopping with the given merchant.
Figure 42:
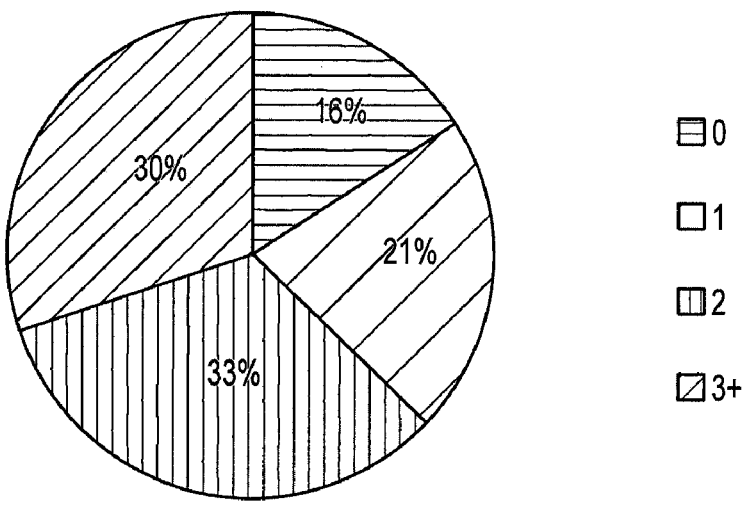
FIG. 42 illustrates a graphical report showing the number of purchases made before and after shopping with the given merchant.

FIGS. 40-42 are examples of reports that may be produced showing shopping patterns relative to a give merchant. Such reports may be produced on displays screens of computers, in other electronic formats or in printed form similar to other embodiments. In FIG. 40, a report 1260 illustrates for a given month, such as September, how a merchant's customers are likely to shop immediately before shopping with the merchant. The merchant is categorized as a "discount store" merchant, although the invention may be used with any type of merchant. The time period selected is two hours before shopping with the merchant, and the purchases are broken down by industry. As shown, in the two hours before shopping at the merchant's location, 30% of the merchant's customers were likely to shop at fast food restaurants, 25% were likely to shop at grocery stores, etc.

FIG. 41 is similar to FIG. 40 except that is shows a report 1270 that illustrates how the merchant's customers are likely to shop immediately after shopping with the merchant. In this case, 30% of customers shopping with the merchant are likely to next shop at a grocery store within the following two hours.

FIG. 42 shows a report 1280 illustrating the number of purchases made before and after a purchase with the identified merchant. Report 1280 shows the likelihood that customers will make a purchase with another merchant within a given time window of shopping with the merchant. For example, about 84% of the merchant's customers are likely to shop elsewhere within a four hour window of shopping with the merchant.

Figure 43:
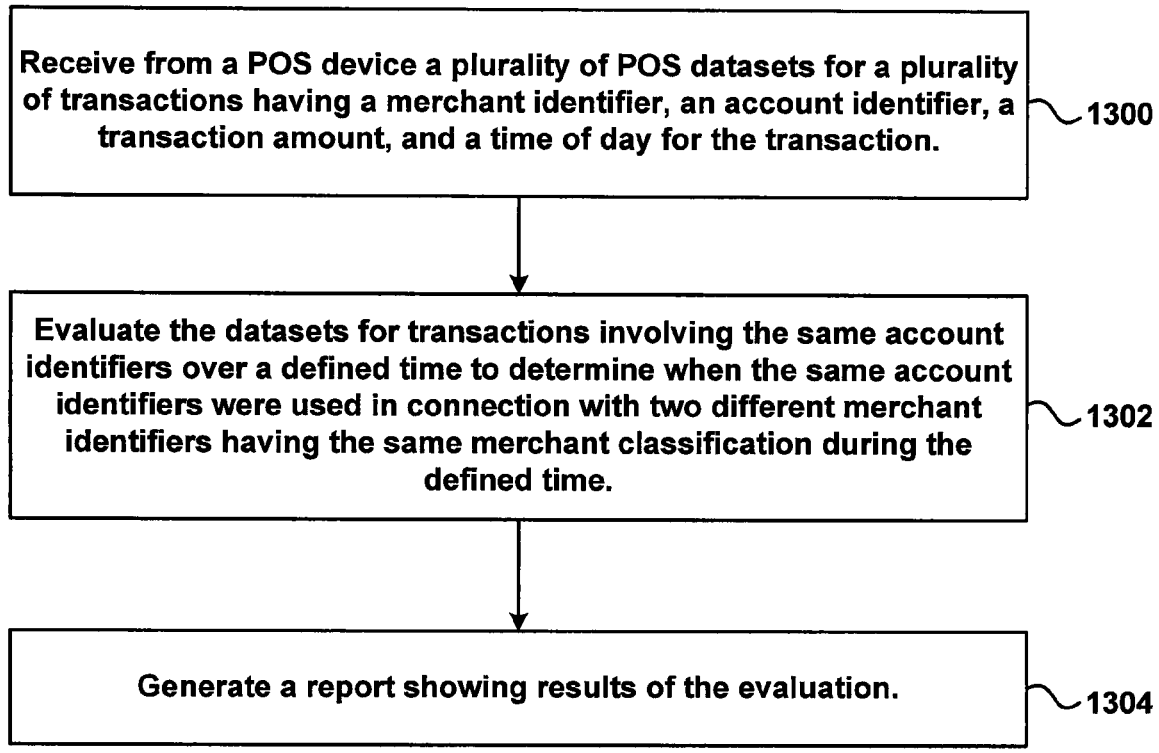
FIG. 43 is a flow chart illustrating one method for determining customers who shop at competing merchants.

Referring now to FIG. 43, one method for determining and reporting customer loyalty will be described. As shown in step 1300, the process involves receiving from a POS device a plurality of POS datasets for a plurality of transactions. These transactions have a merchant identifier, an account identifier, a transaction amount, and a time of day for the transaction. In step 1302, the datasets are evaluated for transactions involving the same account identifiers over a defined time to determine when the same account identifiers were used in connection with two different merchant identifiers having the same merchant classification during the defined time. A report is then generated showing the results of the evaluation as shown in step 1304.

Figure 44:
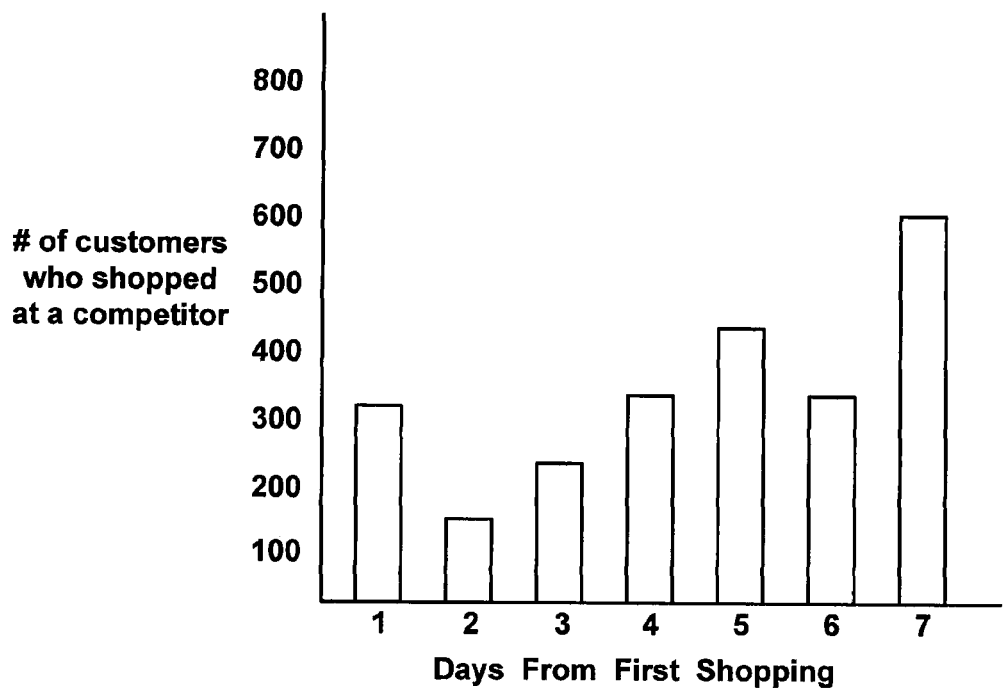
FIG. 44 illustrates a screen display showing information on customers shopping at competing merchants.

FIG. 44 illustrates an example of a display screen 1305 that may be used by a merchant to generate a report showing whether the merchant's customers shop at a competitor merchant. Optionally, the merchant may enter a desired time frame for analysis into a box 1306. For this given time frame, a number of statistics are displayed. For instance, the report may show the total number of customers that have shopped at a competitor within the selected time. For example, if the merchant selects two days, then the report would show the number of customers who made a purchase within two days of shopping at the merchant's store. The report may also show the percentage of the merchant's customers who have shopped at a competitor merchant within the time frame. For instance, in the above example, the report would show the total percentage of the merchant's customers who shopped at another merchant's store within two days of shopping at the merchant's stores. Further, the report may show the average amount spent both at the merchant's store and at the merchant's competitor.

Figure 45:
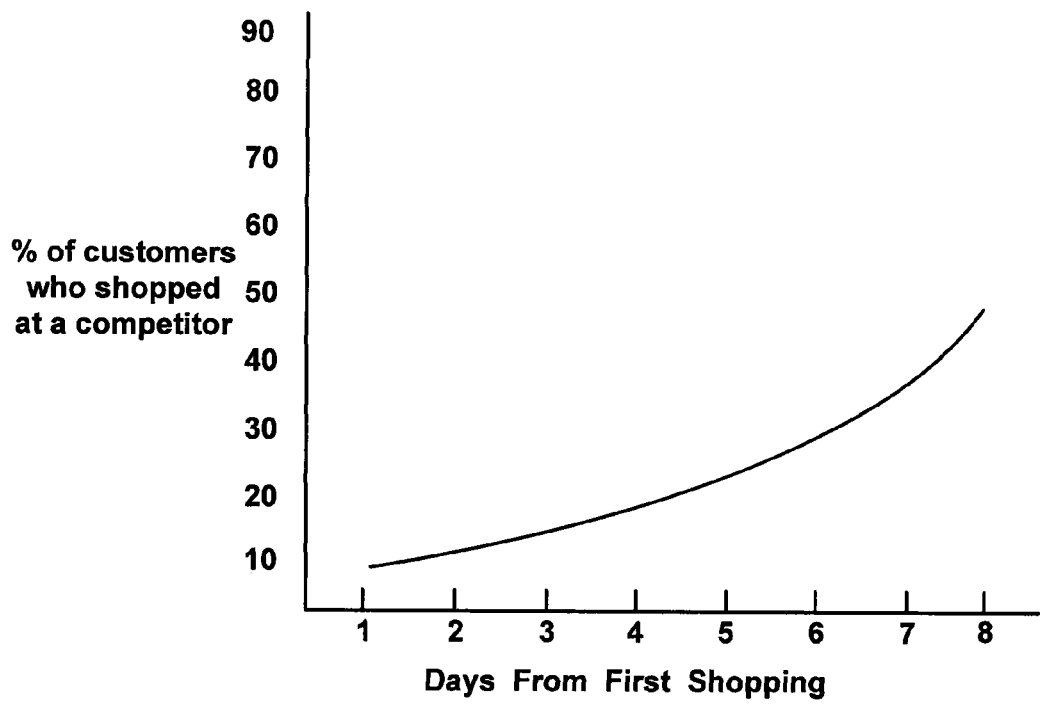
FIG. 45 illustrates a graphical report showing the number of customers shop at competing merchants over time.

Another type of report that may be produced is shown in FIG. 45. This report shows by day the number of customers who shopped at a competitor's store. For example, on the first day, 300 customers went to a competitor while on the second day another 150 customers went to a competitor. As one option, the cumulative number of customers who went to a competitor may be shown overlaid on each day.

FIG. 46 illustrates a report where the percentage of customers who shopped at a competitor is shown over time. The values are cumulative such that over time the total percentage of customers who shopped at a competing merchant are shown.

In a further embodiment, the invention provides a way for merchants to evaluate how close their customers live or work relative to their stores. This permits a merchant to see how many of their customers are local, or whether they travel significant distances to shop at the merchant's store. To track whether purchases are made by local customers or those who have traveled, the POS data may be used. This POS data may be similar to that described in connection with other embodiments. For example, merchant locations may be determined from a merchant identifier in the POS data. Also, systems similar to those previously described may be used.

To determine the residential address of each customer, the account numbers and/or account holder's names that are within the POS data may be used. This data may be mapped to other stored data having residential addresses for each account holder. By knowing the residential address, the distance from the customer to the merchant's store may be calculated. Various reports may then be generated showing a merchant's customer base in terms of distance from the merchant.

In cases where the customer's residential or work addresses are not known, these can be predicted based on their shopping patterns. Hence, in one embodiment, the invention provides a way to predict how close customers live or work relative to a merchant based on shopping patterns, rather than using actual data on a customer's residence or work address.

Figure 47:
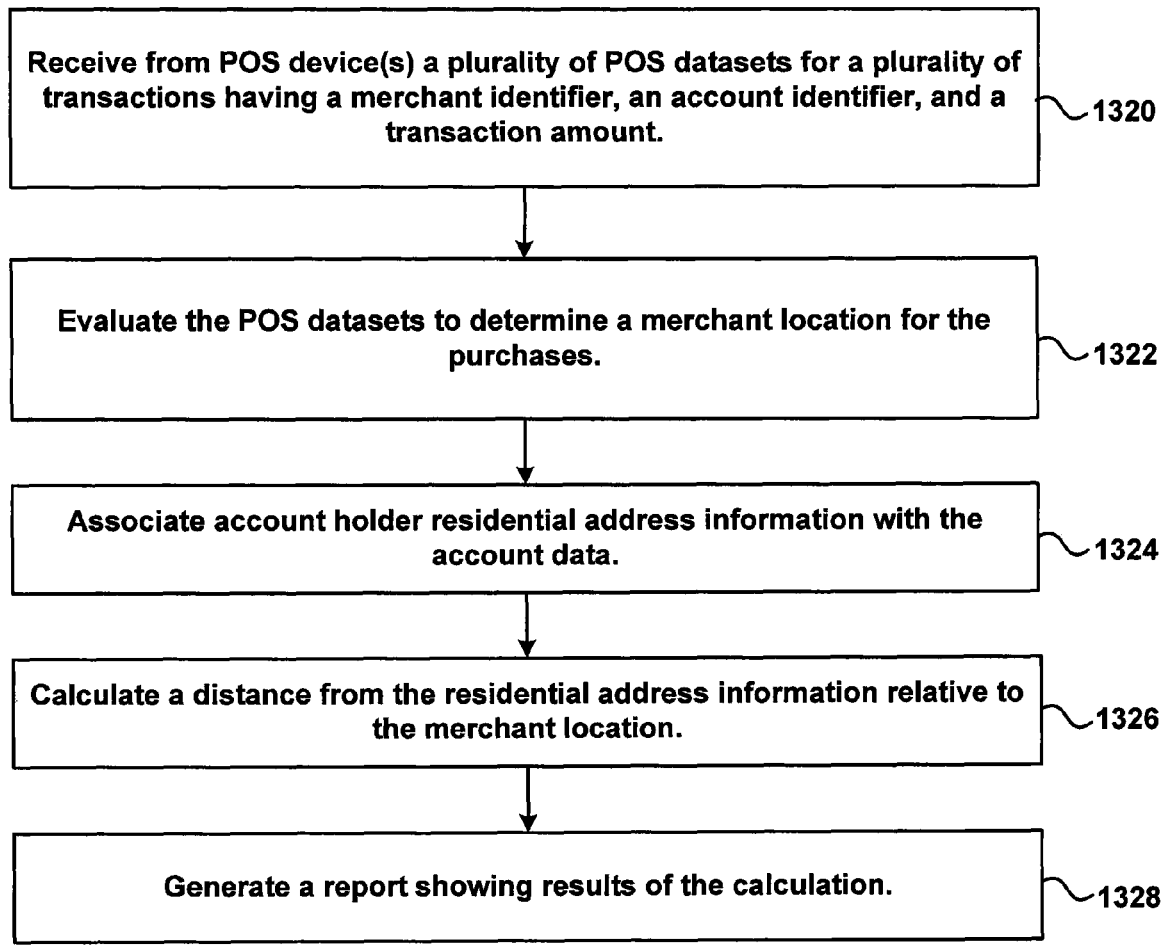
FIG. 47 is a flow chart illustrating one method for determining the distance of customers' residences relative to the merchant's store.

FIG. 47 illustrates one method for determining the distances of its customer base relative to the merchant's store. In step 1320, the method receives from POS device(s) a plurality of POS datasets for a plurality of transactions. The POS datasets may include a merchant identifier, an account identifier, and a transaction amount. In step 1322 these POS datasets are evaluated to determine a merchant location for the purchases. This may be determined based on the merchant identifier. Further, as shown in step 1324, account holder residential address information is associated with the account data. This may be done by looking up the account holder's address that is tied to their account numbers. For example, the residential address may be where the account holder typically receives his monthly statement. A distance from the residential address information is calculated relative to the merchant location as shown in step 1326. Also, in step 1328 a report is generated showing the results of the calculation.

FIG. 48 illustrates a screen display 1330 that may be used by a merchant in order to input information needed to present data on its customer base in terms of distance from the merchant's store. The screen display 1330 includes a region 1332 for entering the merchant's name, and a region 1334 for entering an address. Optionally, a map 1336 of the merchant's store may be shown. A region 1338 is optionally provided to permit the merchant to enter a threshold distance that may be used in generating statistics.

FIG. 49 illustrates a report that may be produced following the input of data into screen display 1330 of FIG. 48. As shown, a variety of statistics may be shown. For example, the following information may be presented:

The percentage of shoppers that live within ten miles is 85%.

The percentage of shoppers that live from ten to twenty miles is 10%.

The percentage of shoppers that live more than twenty miles is 5%.

The average purchase for shoppers that live within ten miles is $54.34.

The average distance from your store for those that live within ten miles is 2.6 miles.

The average distance from your store for all shoppers is 5.9 miles.

The top ten percentage of shoppers by frequency live at an average distance of 0.9 miles.

The top ten percentage of shoppers by purchase amount live at an average distance of 6.5 miles.

Figure 50:
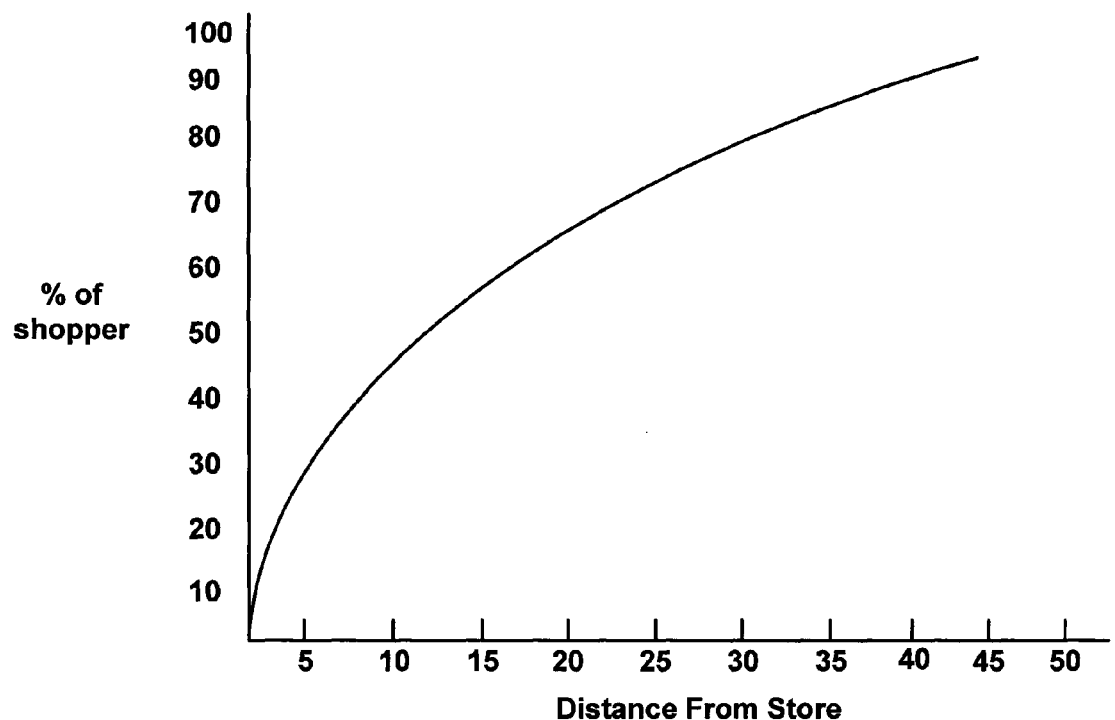
FIG. 50 illustrates a graphical report showing the percentage of shoppers versus distance from the store.
Figure 51:
FIG. 51 illustrates a graphical report showing the average purchase amount versus customer distance from the store.

FIG. 50 illustrates another type of report showing the percentage of shoppers versus distance from the merchant's store. FIG. 51 illustrates the average purchase amount versus distance from the store.

As an alternative to determining the distance, of a customer for a merchant's store, other reports showing location relative to other locations may be provided as well. For example, a report could be produced showing how close merchant locations are relative to other points of interest. For instance, some may wish to know how close certain merchants are to a commuter stop, such as a bus or railway station, or an airport.

To produce such a report, the desired point of interest is identified and an address obtained. To determine what merchants are near that location, merchant addresses are obtained. This can be from a database of addresses, and may be tied to a merchant identifier. Distances between the merchant addresses and the point of interest may then be calculated and produced in various types of reports.

By knowing merchant locations relative to the point of interest, other reports could also be generated. For example, reports could be generated showing how many of a certain merchant's customers live near the same commuter stop. As an example, the report may say that a certain number of people who have shopped at a certain merchant within the last year live within a certain distance of a commuter stop. Other information may also be provided, such as income levels, spending habits or the like.

Figure 52:
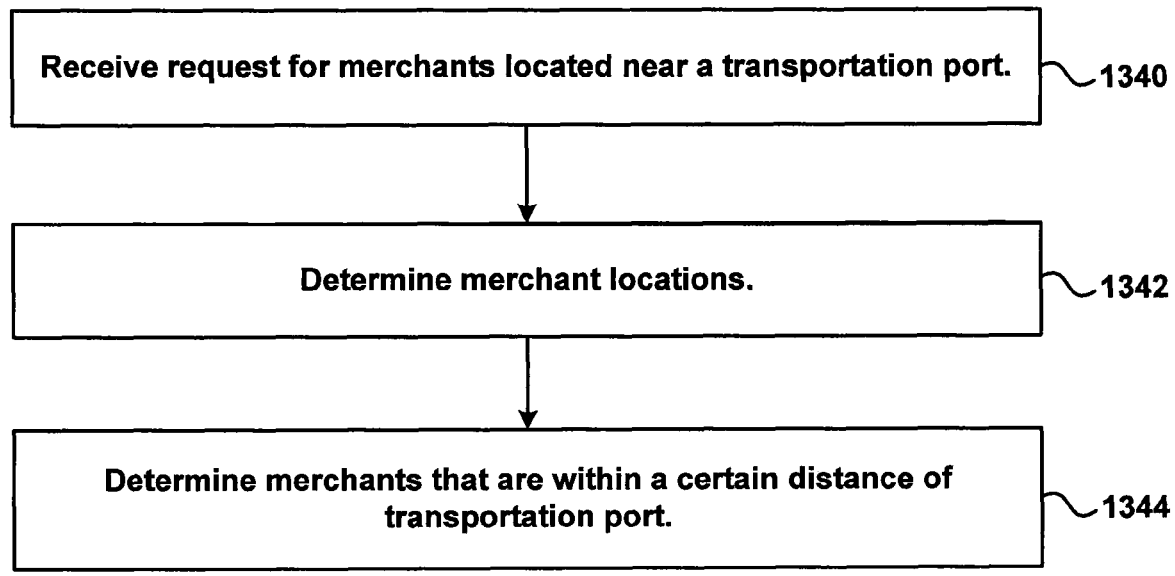
FIG. 52 illustrates one method for determining merchants located near a commuter stop.

Such a process is illustrated in FIG. 52. As shown in step 1340, a request is received for a report showing merchants located near a transportation port. In step 1342, merchant locations are determined. Further, in step 1344, merchants are determined that are within a certain distance of transportation port.

Figure 53:
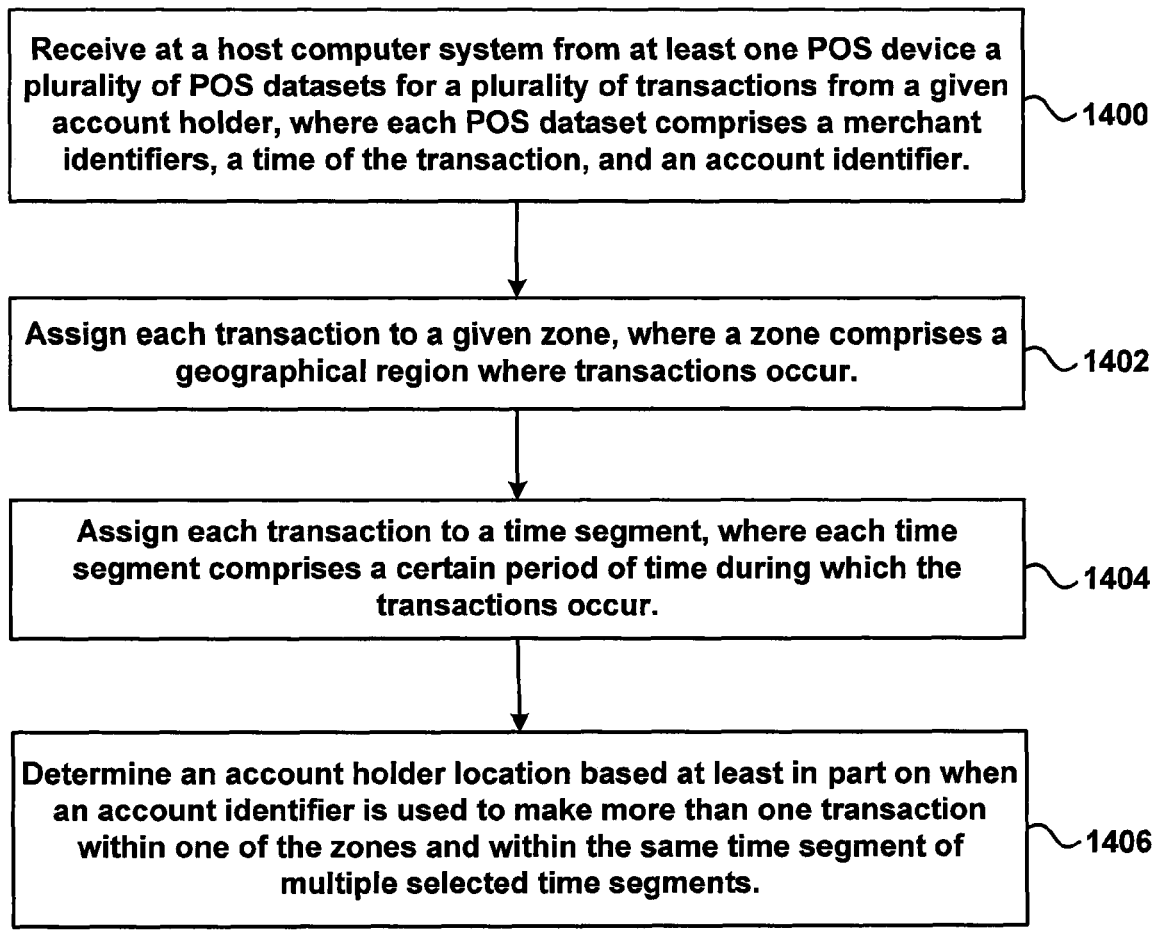
FIG. 53 illustrates a method for predicting an account holder's location.

Instead of using actual data on an account holder's home or work address to produce reports such as those shown in FIGS. 48-51, transaction data can be analyzed to predict or estimate an account holder's location, such as residential location, work location, or the like. One such example is illustrated in FIG. 53. As shown in step 1400, a host computer system receives from at least one POS device a plurality of POS datasets for a plurality of transactions from a given account holder. Each POS dataset may comprise a merchant identifier, a time of the transaction, and an account identifier. Other data similar to that described in other embodiments may also be collected.

In step 1402, each transaction performed by the account holder is assigned to a given zone. Each zone comprises a geographical region where transactions occur. The zones are assigned based on where clusters of transaction occur. One way to define the zones is by using a clustering technique using the transactions. For example, a k-means clustering algorithm may be used where n observations are partitioned into k clusters in which each observation belongs to the cluster with the nearest mean. This provides for a partitioning of the data space into Voronoi cells.

In one specific embodiment, given an initial set of k means $m_1^{(1)}, \ldots, m_k^{(1)}$, two alternating steps may be used. First is an assignment step where each observation is assigned to the cluster with the closest mean.

$$S_i^{(t)} = \{x_j : \|x_j - m_i^{(t)}\| \leq \|x_j - m_{i^*}^{(t)}\| \text{ for all } i^* = 1, \ldots, k\}$$

The second step is an update step where the new means is calculated to be the centroid of the observations in the cluster.

$$m_i^{(t+1)} = \frac{1}{|S_i^{(t)}|} \sum_{x_j \in S_i^{(t)}} x_j$$

The algorithm converges when the assignments no longer change.

In step 1404, each transaction is assigned to a time segment, where each time segment comprises a certain period of time during which the transactions occur. For example, a morning time segment could be during morning hours, say from 7 am to noon, an afternoon segment could be from 1 pm to 5 pm, and an evening time segment could be from 6 pm to 11 pm. Further, the transaction may be categorized according to the type of day, such as, for example, a working day or a non-working day.

As shown in step 1406, the zone for a given account holder transaction may be assigned to one of the zones based at least in part on when an account identifier is used to make more than one transaction within one of the zones and within the same time segment or multiple selected time segments. For example, a home zone may be predicted based on repeat occurrences of transactions for a given account holder that occur during mornings and/or evenings that occur within the same zone. A work zone may be predicted may be predicted based on repeat occurrences of transaction for a given account holder that occur during afternoons within the same zone.

After the account holder's transactions are assigned to appropriate zones, residential and work addresses may be estimated. Based on this, a distance from the account holder's home and/or work relative to the merchant's location can be predicted and displayed in appropriate reports.

This same procedure may be performed for multiple account holders so that the transaction data may be analyzed in the aggregate. In this way, any of the reports described herein, such as, for example, the reports in FIGS. 48-51, may be produced. This may all be done without knowing actual home or work address for account holders. Rather, these addresses are predicted based on shopping patterns.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for evaluating transaction data to determine point of location usage, the method comprising:
    receiving and storing at a host computer system from multiple POS devices located within a specified region a plurality of POS datasets for a plurality of transactions, wherein each POS dataset comprises a merchant identifier, an account identifier, a transaction amount, and a time of day for the transaction, wherein the merchant identifiers are associated with merchant classifications according to market categories;
    storing at the host computer system residential address information that is associated with the account identifiers;
    with a processor of the host computer system, evaluating the datasets for transactions involving the same account identifiers over a defined time to determine when the same account identifiers were used during the defined time and with which merchant identifiers;

grouping the evaluated datasets into a first group and a second group, wherein the first group comprises transactions with a given merchant of interest and the second group comprises transactions with other than the given merchant but involving transactions that occurred immediately before or immediately after transactions with the given merchant;

categorizing the transactions within the second group according to the market categories, wherein the market categories are selected from a group consisting of: fast food restaurants, grocery stores, eating places and restaurants, drug stores and pharmacies, dry cleaners, family clothing stores, book stores, hardware stores, health and beauty stores, cosmetic stores and electrical stores;

for each of the market categories, identifying where transactions occurred immediately before or immediately after performing a transaction with the given merchant of interest;

identifying at least one competing merchant in the same merchant category that competes with the given merchant of interest;

determining transactions in the second group that occurred with the competing merchant; and generating a first report showing at least two of the market categories and how many transactions occurred within each market category immediately before or immediately after performing a transaction with the given merchant;

generating a second report showing a summary of transactions occurring with the competing merchant;

wherein the second report shows the total number of transactions that occurred with the competing merchant or the percentage of shoppers who performed transactions with the competing merchant;

generating a third report showing an average of the number of purchases made by shoppers before and after a transaction made at one of the market categories during a specified time;

determining a merchant location for the purchases based on the merchant identifier; and generating a fourth report showing a percentage or number of shoppers within a certain distance of the given merchant and an average purchase amount for the transactions occurring within the certain distance, wherein the certain distance is calculated using the stored residential address information and the merchant location.

2. A method as in claim 1, further comprising evaluating the datasets to categorize by merchant classifications, and wherein the report shows, for the other merchants, where account identifiers were used according to merchant classifications.

3. A method as in claim 1, further comprising evaluating the datasets for transactions that were used in connection with two different merchant identifiers having the same merchant classification, and wherein the report shows when customers shop at both the given merchant as well as one or more competing merchants within the defined time.

4. A method as in claim 1, further comprising calculating an average amount spent at each merchant on a per transaction basis for all transactions in the report where account numbers that were used with two different merchant identifiers having the same merchant classification occurred during the defined time.

5. A method as in claim 1, wherein the report indicates for each merchant a total number of instances where account numbers that were used in connection with two different merchant identifiers having the same merchant classification occurred during the defined time.

6. A method as in claim 1, wherein the first report shows a percentage of the transactions in the second group that occurred within each of the market categories.

7. A method as in claim 1, wherein the defined time is a calendar month.

8. A method as in claim 1, wherein the second report shows how many days have passed since a customer who made a transaction with the given merchant made a transaction with the competing merchant.

9. A system for evaluating transaction data to determine point of location usage, the system comprising:

a host computer system having a memory and at least one processor for performing a set of instructions comprising:

evaluating a plurality of POS datasets for a plurality of transactions received from multiple POS devices, wherein each POS dataset comprises a merchant identifier, an account identifier, a transaction amount, and a time of day for the transaction, wherein the merchant identifiers are associated with merchant classifications according to market categories;

storing residential address information that is associated with the account identifiers;

evaluating the datasets for transactions involving the same account identifiers over a defined time to determine when the same account identifiers were used during the defined time and with which of the merchant identifiers;

grouping the evaluated datasets into a first group and a second group, wherein the first group comprises transactions with a given merchant of interest and the second group comprises transactions with other than the given merchant but involving transactions that occurred immediately before or immediately after transactions with the given merchant;

categorizing the transactions within the second group according to the market categories, wherein the market categories are selected from a group consisting of: fast food restaurants, grocery stores, eating places and restaurants, drug stores and pharmacies, dry cleaners, family clothing stores, book stores, hardware stores, health and beauty stores, cosmetic stores and electrical stores;

for each of the market categories, identifying where transactions occurred immediately before or immediately after performing a transaction with the given merchant of interest;

identifying at least one competing merchant in the same merchant category that competes with the given merchant of interest;

determining transactions in the second group that occurred with the competing merchant; and generating a first report showing at least two of the market categories and how many transactions occurred within each market category immediately before or immediately after performing a transaction with the given merchant;

generating a second report showing a summary of transactions occurring with the competing merchant;

wherein the second report shows the total number of transactions that occurred with the competing merchant or the percentage of shoppers who performed transactions with the competing merchant;

generating a third report showing an average of the number of purchases made by shoppers before and after a transaction made at one of the market categories during a specified time;

determining a merchant location for the purchases based on the merchant identifier; and generating a fourth report showing a percentage or number of shoppers within a certain distance of the given merchant and an average purchase amount for the transactions occurring within the certain distance, wherein the certain distance is calculated using the stored residential address information and the merchant location.

10. A system as in claim 9, wherein the set of instructions further comprises evaluating the datasets to categorize by merchant classifications, and wherein the report shows, for the other merchants, where account identifiers were used according to merchant classifications.

11. A system as in claim 9, wherein the set of instructions further comprise evaluating the datasets for transactions that were used in connection with two different merchant identifiers having the same merchant classification, and wherein the report shows when customers shop at both the given merchant as well as one or more competing merchants within the defined time.

12. A method for evaluating transaction data to determine point of location usage, the method comprising:

receiving and storing at a host computer system from multiple POS devices a plurality of POS datasets for a plurality of transactions, wherein each POS dataset comprises a merchant identifier, an account identifier, a transaction amount, and a time of day for the transaction, wherein the merchant identifiers are associated with merchant classifications according to market categories;

storing at the host computer system residential address information that is associated with the account identifiers;

with a processor of the host computer system, evaluating the datasets for transactions involving the same account identifiers over a first timeframe to determine when the same account identifiers were used during the first timeframe and with which merchant identifiers;

grouping the evaluated datasets into a first group and a second group, wherein the first group comprises transactions with a given merchant of interest and the second group comprises transactions with other than the given merchant but involving transactions that occurred within a second timeframe of when a transaction was performed with the given merchant of interest, wherein the second timeframe is less than the first timeframe;

categorizing the transactions within the second group according to the market categories, wherein the market categories are selected from a group consisting of: fast food restaurants, grocery stores, eating places and restaurants, drug stores and pharmacies, dry cleaners, family clothing stores, book stores, hardware stores, health and beauty stores, cosmetic stores and electrical stores;

for each of the market categories, identifying how many transactions occurred;

generating a first report showing at least two of the market categories and how many transactions occurred within each market category;

generating a second report showing a summary of transactions occurring with the competing merchant;

wherein the second report shows the total number of transactions that occurred with the competing merchant or the percentage of shoppers who performed transactions with the competing merchant;

generating a third report showing an average of the number of purchases made by shoppers before and after a transaction made at one of the market categories during a specified time;

determining a merchant location for the purchases based on the merchant identifier; and generating a fourth report showing a percentage or number of shoppers within a certain distance of the given merchant and an average purchase amount for the transactions occurring within the certain distance, wherein the certain distance is calculated using the stored residential address information and the merchant location.

13. A method as in claim 12, wherein the report shows a percentage of the transactions in the second group that occurred within each of the market categories.

14. A method as in claim 12, wherein the first timeframe is a calendar month, and the second timeframe is two hours.

15. A method as in claim 12, wherein the distance is shown in terms of a number of customers that live within a certain distance in terms of a percent of total customers.

* * * * *